US00RE43847E

(19) United States
(12) Reissued Patent
Le Gette et al.

(10) Patent Number: US RE43,847 E
(45) Date of Reissued Patent: Dec. 11, 2012

(54) COLLAPSIBLE SUPPORT AND METHODS OF USING THE SAME

(75) Inventors: Brian Edward Le Gette, Baltimore, MD (US); David Reeb, Columbia, MD (US); Alan Tipp, Bennington, NE (US); Justin Saul Werner, Millersville, MD (US); Inna Alesina, Owings Mills, MD (US)

(73) Assignee: Kelsyus, LLC, Virginia Beach, VA (US)

(21) Appl. No.: 12/417,425

(22) Filed: Apr. 2, 2009

Related U.S. Patent Documents

Reissue of:
(64) Patent No.: 7,198,324
Issued: Apr. 3, 2007
Appl. No.: 11/199,136
Filed: Aug. 9, 2005

U.S. Applications:
(63) Continuation of application No. 10/367,796, filed on Feb. 19, 2003, now Pat. No. 6,926,355, which is a continuation-in-part of application No. 10/233,784, filed on Sep. 4, 2002, now Pat. No. 6,820,927, which is a continuation-in-part of application No. PCT/US02/06695, filed on Mar. 5, 2002, which is a continuation-in-part of application No. 09/797,948, filed on Mar. 5, 2001, now Pat. No. 6,698,827.

(51) Int. Cl.
*A47C 4/30* (2006.01)
*A47C 7/66* (2006.01)

(52) U.S. Cl. ..... 297/16.2; 297/17; 297/45; 297/129; 297/184.1; 297/184.11; 297/184.15

(58) Field of Classification Search ..... 297/184.1, 297/184.11, 184.15, 220, 397
See application file for complete search history.

(56) References Cited

U.S. PATENT DOCUMENTS

| | | | |
|---|---|---|---|
| 180,610 | A | 8/1876 | Lungren |
| 244,216 | A | 7/1881 | Fenby |
| 291,062 | A | 1/1884 | Latour |
| 900,572 | A | 10/1908 | Morton |
| 1,035,823 | A | 8/1912 | Hay |
| 1,256,902 | A | 2/1918 | Howe |

(Continued)

FOREIGN PATENT DOCUMENTS

| | | | |
|---|---|---|---|
| AU | 15170/92 | A | 12/1993 |

(Continued)

OTHER PUBLICATIONS

Shakespeare Deluxe High Back Lounge Chair, Outdoor World of California [online], 1 page. Retrieved from the internet: Jun. 1, 2002, <URL: http://www.outdoorworldca.com/products/specs/dlxhilou.htm.>.

(Continued)

*Primary Examiner* — Rodney B White
(74) *Attorney, Agent, or Firm* — Cooley LLP

(57) ABSTRACT

A support including a frame having a tension member coupled to the frame is disclosed. The frame has a collapsed configuration and an expanded configuration. The tension member is disposable in a first position to provide support for an arm of a user and a second position to be carried on a shoulder of the user.

46 Claims, 64 Drawing Sheets

U.S. PATENT DOCUMENTS

| | | | | |
|---|---|---|---|---|
| 1,341,225 | A | | 5/1920 | Clough |
| 1,429,043 | A | | 9/1922 | Martin |
| 1,443,921 | A | | 1/1923 | Mackenzie |
| 1,605,679 | A | | 11/1926 | McGrail |
| 1,639,074 | A | | 8/1927 | Blackwood |
| 1,763,455 | A | | 6/1930 | De Bruijn |
| 1,789,090 | A | | 1/1931 | Wawrunek |
| 1,979,278 | A | | 11/1934 | McMurtry |
| 2,001,252 | A | | 5/1935 | Johnson |
| 2,137,427 | A | | 11/1938 | Thomson |
| 2,166,832 | A | | 7/1939 | Wenker |
| 2,243,984 | A | | 6/1941 | Singewald |
| 2,429,763 | A | | 10/1947 | Lindabury |
| 2,473,090 | A | | 6/1949 | Becker |
| 2,490,367 | A | | 12/1949 | Maddocks |
| 2,545,968 | A | | 3/1951 | Newstead |
| 2,561,886 | A | | 7/1951 | Rikelman |
| 2,658,562 | A | | 11/1953 | Androsiglio |
| 2,690,792 | A | | 10/1954 | Moss |
| 2,691,410 | A | | 10/1954 | Boucher |
| 2,729,276 | A | | 1/1956 | Volney |
| 2,747,653 | A | | 5/1956 | Obradovich |
| 2,819,776 | A | | 1/1958 | Balsam |
| 2,915,154 | A | | 12/1959 | Holder |
| 2,926,724 | A | | 3/1960 | Rittenberg |
| 2,973,888 | A | | 3/1961 | Beardsley |
| 3,034,523 | A | | 5/1962 | De Shano |
| 3,092,224 | A | | 6/1963 | O'Neil |
| 3,124,387 | A | | 3/1964 | MacLaren |
| 3,179,465 | A | | 4/1965 | Roberts |
| 3,214,217 | A | | 10/1965 | Jente |
| 3,243,230 | A | | 3/1966 | Otto |
| 3,307,758 | A | | 3/1967 | Platt |
| 3,309,134 | A | | 3/1967 | Robert |
| 3,404,915 | A | | 10/1968 | De Souza |
| 3,580,633 | A | | 5/1971 | Du Priest |
| 3,662,932 | A | | 5/1972 | Kerschner |
| 3,838,883 | A | | 10/1974 | Machen |
| 3,879,086 | A | | 4/1975 | Moceri |
| 3,909,061 | A | | 9/1975 | Johnson |
| 3,918,109 | A | | 11/1975 | Barraclough |
| 3,931,918 | A | | 1/1976 | Smith et al. |
| 3,947,903 | A | | 4/1976 | Menke |
| 4,014,591 | A | | 3/1977 | Gittings |
| 4,030,748 | A | * | 6/1977 | Brock ..... 297/184.1 |
| 4,047,753 | A | | 9/1977 | Uchida |
| 4,063,318 | A | | 12/1977 | Nicholson |
| 4,082,102 | A | * | 4/1978 | Heuer ..... 297/184.1 X |
| 4,148,520 | A | | 4/1979 | Miller |
| 4,201,416 | A | * | 5/1980 | Vanderminden ..... 297/184.15 |
| 4,230,363 | A | * | 10/1980 | Borichevsky ..... 297/184.15 |
| 4,245,849 | A | | 1/1981 | Thiboutot |
| 4,258,951 | A | * | 3/1981 | Groom ..... 297/16.2 |
| 4,295,481 | A | | 10/1981 | Gee |
| 4,300,707 | A | | 11/1981 | Kjaer |
| 4,359,244 | A | | 11/1982 | Koehm |
| 4,487,345 | A | | 12/1984 | Pierce et al. |
| 4,530,451 | A | | 7/1985 | Hamilton |
| 4,577,901 | A | | 3/1986 | Phillips |
| 4,595,232 | A | | 6/1986 | Glenn et al. |
| 4,605,261 | A | | 8/1986 | Lee |
| 4,635,667 | A | | 1/1987 | Harn |
| 4,639,036 | A | | 1/1987 | Nichols |
| 4,671,566 | A | | 6/1987 | Knapp et al. |
| 4,673,211 | A | | 6/1987 | Hoffman |
| 4,676,548 | A | | 6/1987 | Bradbury |
| 4,687,248 | A | | 8/1987 | Ross et al. |
| 4,687,249 | A | | 8/1987 | Mills |
| 4,715,650 | A | | 12/1987 | Berman et al. |
| 4,717,201 | A | | 1/1988 | Barras |
| 4,736,825 | A | | 4/1988 | Belfi |
| 4,773,708 | A | | 9/1988 | Nastu |
| 4,795,068 | A | | 1/1989 | Blean |
| 4,796,734 | A | | 1/1989 | Distasio |
| 4,807,930 | A | | 2/1989 | Helfrich |
| 4,824,171 | A | | 4/1989 | Hollingsworth |
| 4,826,241 | A | | 5/1989 | Barras |
| 4,826,242 | A | | 5/1989 | Trethewey |
| 4,836,601 | A | | 6/1989 | Cone |
| 4,836,938 | A | | 6/1989 | Kobasic |
| 4,865,381 | A | | 9/1989 | Van Rogue |
| 4,885,812 | A | | 12/1989 | Lindner |
| 4,889,383 | A | | 12/1989 | Jones |
| 4,890,882 | A | | 1/1990 | Harrington |
| 4,924,896 | A | | 5/1990 | Carter |
| 4,925,239 | A | | 5/1990 | Powers |
| D310,605 | S | | 9/1990 | Kwon |
| 4,971,089 | A | | 11/1990 | Braman |
| 5,000,210 | A | | 3/1991 | Worthington, Jr. |
| 5,016,792 | A | | 5/1991 | Jay |
| 5,022,420 | A | | 6/1991 | Brim |
| 5,042,874 | A | | 8/1991 | Williams |
| 5,054,849 | A | | 10/1991 | Hoff |
| 5,080,432 | A | | 1/1992 | Connell |
| 5,096,257 | A | | 3/1992 | Clark |
| 5,139,308 | A | | 8/1992 | Ziman |
| 5,150,945 | A | | 9/1992 | Aupperlee et al. |
| 5,154,473 | A | | 10/1992 | Joranco |
| 5,203,363 | A | | 4/1993 | Kidwell et al. |
| 5,205,308 | A | | 4/1993 | Kendall et al. |
| 5,205,610 | A | | 4/1993 | Reninger |
| 5,209,381 | A | | 5/1993 | Jay |
| 5,240,020 | A | | 8/1993 | Byers |
| 5,244,250 | A | | 9/1993 | Nordmeyer |
| 5,289,958 | A | | 3/1994 | Jay |
| 5,299,337 | A | | 4/1994 | Venza |
| 5,320,405 | A | | 6/1994 | Foster et al. |
| 5,332,283 | A | | 7/1994 | Gray |
| 5,362,130 | A | | 11/1994 | Hoffman |
| 5,385,390 | A | | 1/1995 | Freeman et al. |
| 5,409,291 | A | | 4/1995 | Lamb et al. |
| 5,429,413 | A | | 7/1995 | Levy et al. |
| 5,441,067 | A | * | 8/1995 | James et al. ..... 297/184.15 X |
| 5,449,014 | A | | 9/1995 | Yan-ho |
| 5,499,760 | A | | 3/1996 | Pielocik |
| 5,499,857 | A | | 3/1996 | Lynch, Jr. |
| 5,527,088 | A | | 6/1996 | MacLean |
| 5,536,064 | A | | 7/1996 | MacLean |
| 5,544,793 | A | | 8/1996 | Harrop |
| 5,547,246 | A | | 8/1996 | Lambert |
| 5,551,110 | A | | 9/1996 | Armstrong et al. |
| 5,579,797 | A | | 12/1996 | Rogers |
| 5,582,458 | A | | 12/1996 | Wildt |
| 5,588,696 | A | | 12/1996 | Jay et al. |
| 5,593,205 | A | | 1/1997 | Vanderminden, Sr. et al. |
| 5,628,437 | A | | 5/1997 | Kober |
| D380,306 | S | | 7/1997 | Lin |
| D382,126 | S | | 8/1997 | Lee |
| D382,414 | S | | 8/1997 | Lee |
| 5,695,100 | A | | 12/1997 | O'Brien |
| 5,718,473 | A | | 2/1998 | Lynch, Jr. |
| 5,797,650 | A | | 8/1998 | Gonzalez et al. |
| 5,819,999 | A | | 10/1998 | Tennant |
| 5,829,832 | A | * | 11/1998 | Molee et al. ..... 297/397 |
| 5,833,310 | A | | 11/1998 | Labelle |
| 5,873,625 | A | | 2/1999 | Uchtman |
| 5,893,605 | A | | 4/1999 | Chang |
| D411,387 | S | | 6/1999 | Zheng |
| 5,921,258 | A | | 7/1999 | Francois |
| 5,944,384 | A | | 8/1999 | Patterson |
| 5,967,601 | A | * | 10/1999 | Gillins ..... 297/184.15 |
| 5,984,406 | A | | 11/1999 | Lee |
| 5,984,409 | A | | 11/1999 | Eakin et al. |
| 6,015,189 | A | | 1/2000 | Broadhead et al. |
| 6,030,034 | A | | 2/2000 | Plohetski |
| 6,045,177 | A | | 4/2000 | Grace |
| 6,048,023 | A | | 4/2000 | Lampton |
| 6,056,172 | A | | 5/2000 | Welsh |
| 6,082,813 | A | | 7/2000 | Chen |
| 6,095,172 | A | | 8/2000 | Trapp et al. |
| 6,095,599 | A | * | 8/2000 | Lambert ..... 297/129 |
| D430,976 | S | | 9/2000 | Tow |
| D433,244 | S | | 11/2000 | Zheng |
| D433,574 | S | | 11/2000 | Zheng |
| 6,145,716 | A | | 11/2000 | Caicedo |
| 6,152,156 | A | | 11/2000 | Tung |
| 6,164,726 | A | | 12/2000 | Reeves et al. |

| | | | | |
|---|---|---|---|---|
| 6,179,374 | B1 | 1/2001 | Tang | |
| 6,206,463 | B1 | 3/2001 | Whigham | |
| 6,217,113 | B1 | 4/2001 | Knatz | |
| 6,231,119 | B1 | 5/2001 | Zheng | |
| 6,237,993 | B1 | 5/2001 | Zheng | |
| 6,241,311 | B1 | 6/2001 | Zheng | |
| 6,247,748 | B1 | 6/2001 | Zheng | |
| 6,247,749 | B1 | 6/2001 | Yu | |
| 6,247,750 | B1 | 6/2001 | Tsai | |
| 6,250,712 | B1 | 6/2001 | Livington et al. | |
| 6,264,271 | B1 | 7/2001 | Munn et al. | |
| 6,296,002 | B1 | 10/2001 | Tashchyan | |
| 6,296,304 | B1 | 10/2001 | Zheng | |
| 6,302,479 | B1 | 10/2001 | Zheng | |
| 6,322,138 | B1 | 11/2001 | Tang | |
| 6,354,044 | B1 | 3/2002 | Lagace, Jr. | |
| 6,371,553 | B1 | 4/2002 | Tang | |
| 6,402,230 | B1 * | 6/2002 | Tang | 297/16.2 |
| 6,405,742 | B1 | 6/2002 | Driscoll | |
| 6,425,590 | B1 | 7/2002 | Whiteside et al. | |
| 6,520,574 | B1 | 2/2003 | Huang | |
| 6,655,736 | B1 | 12/2003 | Arenas | |
| D487,297 | S | 3/2004 | Tyler et al. | |
| 6,698,827 | B2 | 3/2004 | Le Gette et al. | |
| 6,764,132 | B1 | 7/2004 | Gaertner | |
| 6,789,557 | B1 | 9/2004 | Wahl, Jr. | |
| 6,820,927 | B2 | 11/2004 | Isom et al. | |
| 6,823,883 | B1 | 11/2004 | Sears | |
| 6,824,210 | B2 | 11/2004 | Zheng | |
| 6,845,780 | B2 | 1/2005 | Bishirjian | |
| 6,854,797 | B1 | 2/2005 | Thomas | |
| 6,899,383 | B2 | 5/2005 | Hwang | |
| 6,926,355 | B2 | 8/2005 | Le Gette et al. | |
| 7,048,331 | B2 * | 5/2006 | Saakyan | 297/16.2 X |
| 7,048,333 | B2 | 5/2006 | Martinez | |
| 7,198,324 | B2 | 4/2007 | Le Gette et al. | |
| 2002/0112752 | A1 | 8/2002 | Blakney | |
| 2004/0178665 | A1 | 9/2004 | May | |
| 2004/0222678 | A1 | 11/2004 | Hansen | |
| 2004/0232740 | A1 | 11/2004 | Enge | |
| 2006/0061146 | A1 * | 3/2006 | Grace | 297/16.2 X |
| 2007/0040422 | A1 | 2/2007 | Reeb et al. | |

FOREIGN PATENT DOCUMENTS

| | | | | |
|---|---|---|---|---|
| DE | 26 55 028 | A1 | 6/1978 | |
| DE | 31 31 166 | A1 | 2/1983 | |
| DE | 42 01 743 | A1 | 10/1992 | |
| EP | 172266 | A1 * | 1/1986 | 297/16.2 |
| EP | 172 266 | A1 | 2/1986 | |
| GB | 2 042 960 | A | 1/1980 | |
| GB | 2 052 960 | A | 6/1980 | |
| GB | 2 074 853 | | 11/1981 | |
| GB | 2074853 | A * | 11/1981 | 297/16.2 |
| GB | 2 091 648 | A | 8/1982 | |
| JP | 7-207962 | | 8/1995 | |
| WO | WO 82/01984 | A1 | 6/1982 | |
| WO | WO 91/14386 | A1 | 10/1991 | |
| WO | WO 96/39066 | A1 | 12/1996 | |
| WO | WO 02/38009 | | 5/2002 | |
| WO | WO 02/38009 | A1 | 5/2002 | |

OTHER PUBLICATIONS

Sand Chair, The Crate and Barrel 1993 Spring and Summer Catalogue, 1993, 1 page.

Portable Chair, MotorHome, Sep. 1994, pp. 106.

Lafuma Sport/Travel Chair, Campmor ,Late Spring 1994, 1 page.

Pamphlet for Werland's Handcrafted Rocking Chairs, Austin, Texas, 2 pages.

Product label for "Undercover the Sunshade" manufactured by Della USA, 1 page.

* cited by examiner

FIG. 49
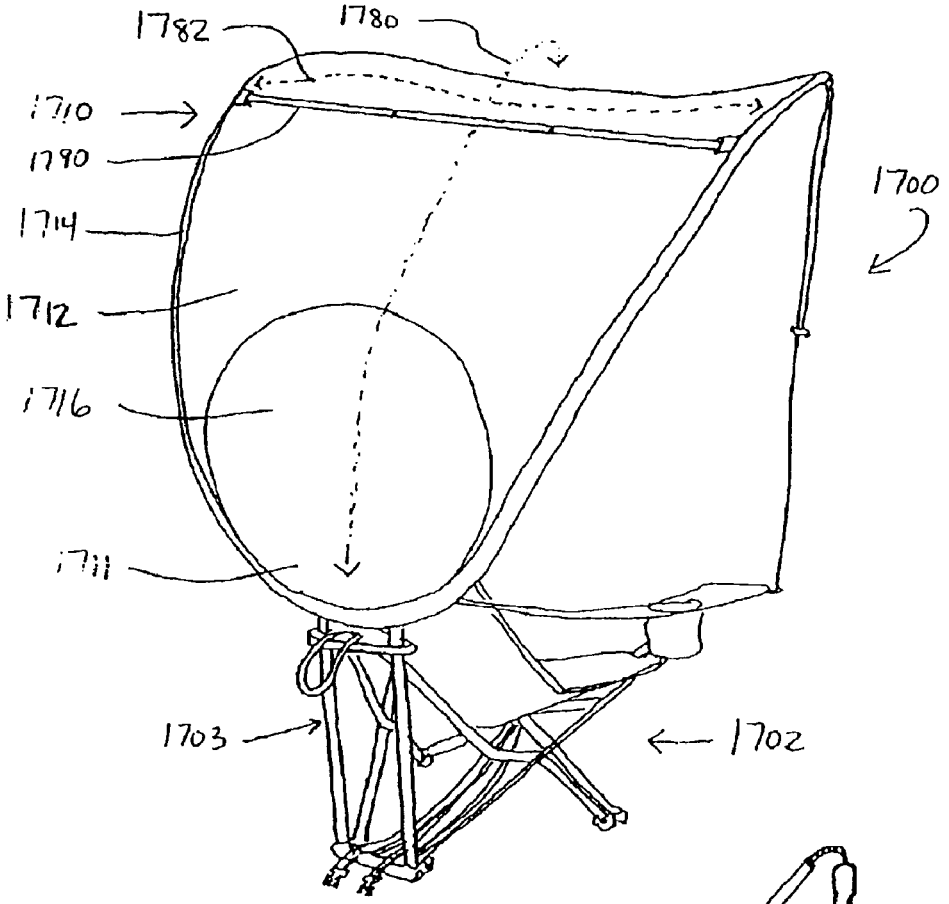
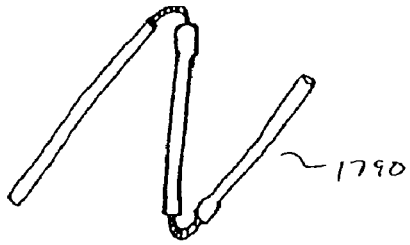
FIG. 50

COLLAPSIBLE SUPPORT AND METHODS OF USING THE SAME

Matter enclosed in heavy brackets [ ] appears in the original patent but forms no part of this reissue specification; matter printed in italics indicates the additions made by reissue.

RELATED APPLICATIONS

This application is a continuation application of application Ser. No. 10/367,796, filed Feb. 19, 2003, titled "Collapsible Support and Methods of Using the Same," now U.S. Pat. No. 6,926,355, the entire content of which is hereby incorporated by reference, which is a continuation-in-part of U.S. patent application Ser. No. 10/233,784, entitled "Collapsible Support and Methods of Using the Same," filed Sep. 4, 2002, now U.S. Pat. No. 6,820,927, which is a continuation-in-part of International Application Serial No. PCT/US02/06695, entitled "Collapsible Support and Methods of Using the Same," filed Mar. 5, 2002, which is a continuation-in-part of U.S. patent application Ser. No. 09/797,948, entitled "Collapsible Support and Methods of Using the Same," filed Mar. 5, 2001, which is now U.S. Pat. No. 6,698,827, all of which are hereby incorporated by reference in their entirety.

BACKGROUND OF THE INVENTION

This invention relates generally to a support having multiple configurations, and in particular, to a support that can be positioned in an expanded configuration and a collapsed configuration.

Some conventional supports can be used as chairs to support a user. Such chairs are often transported and used in various outdoor settings. Difficulty exists in transporting a chair. For example, conventional chairs cannot be easily collapsed and transported due to the shape and weight of the chairs.

The need exists for a collapsible support that can be easily transported to various locations.

SUMMARY OF THE INVENTION

A support includes a frame and a tension member. The support can be positioned in a collapsed configuration and an expanded configuration. In one embodiment, the support can be used with a cover that can be positioned around a portion of the frame.

In one embodiment, the support includes a seat portion coupled to the frame. In the open or expanded configuration, a user can sit on the support and the frame is self-supporting.

When the frame is in its expanded configuration, the tension member is coupled to the frame to provide support for an arm of the user. When the frame is in its collapsed configuration, a cover can be placed over a portion of the frame or support. In this configuration, the tension member is not contained by and extends from the cover, thereby enabling a user to place the tension member over the user's shoulder for transporting the support.

BRIEF DESCRIPTION OF THE DRAWINGS

FIG. 49 illustrates a rear perspective view of the combination of FIG. 48.

FIG. 50 illustrates a front view of the support member in a collapsed configuration, according to the embodiment shown in FIG. 49.

DETAILED DESCRIPTION OF THE INVENTION

A support includes a seat portion, a frame, and a tension member. The frame can be positioned in a collapsed configuration and an expanded configuration in which the frame is self-supporting. The tension member is disposable in a first position to provide support for an arm of a user and a second position to be carried on a shoulder of a user. When the frame is in its collapsed configuration, the tension member can be placed over a user's shoulder to transport the support. When the frame is in its expanded configuration, the tension member can be disposed in its first position to support an arm of a user.

Figure 1:
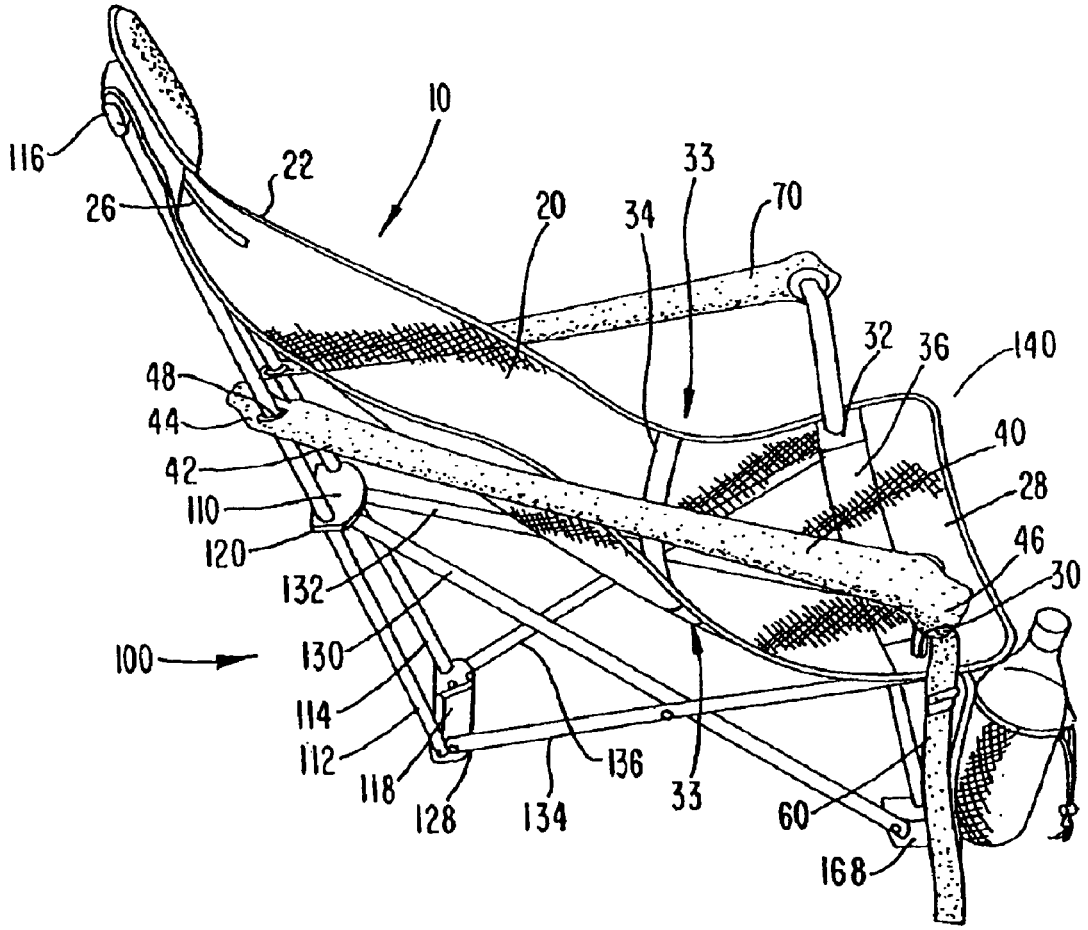
FIG. 1 illustrates a side view of a support according to an embodiment of the invention.

A support according to an embodiment of the invention is illustrated in FIGS. 1-5. FIG. 1 illustrates a side view of the support or support assembly 10 in a deployed or expanded configuration. In one embodiment, support 10 can be used as a chair in its expanded configuration.

In the illustrated embodiment, the support 10 includes a seat portion 20, tension members 40, 70, and a frame 100. The seat portion 20 and the tension members 40, 70 are coupled to the frame 100.

In the illustrated embodiment, the frame 100 includes a rear frame portion 110 and a front frame portion 140, which are coupled together by upper side support bars 130, 132 and lower side support bars 134, 136.

Each of the support members 130, 132, 134, 136 are pivotally coupled to the front and rear frame portions 110, 140. Upper side support member 130 is pivotally coupled to lower side support member 134 proximate their midpoints. Similarly, upper side support member 132 is pivotally coupled to lower side support member 136.

In one embodiment, the upper ends of lower side support members 134, 136 are bent with respect to the remainder of the support members 134, 136. The bent portions of the lower side support members 134, 136 are located proximate to the seat portion 20. When the frame 100 is in its expanded configuration, the upper ends of the lower side support members 134, 136 do not extend into the seat portion 20 and engage the user on the support 10.

In the illustrated embodiment, the rear frame portion 110 includes support members 112, 114, and a coupler 120. The support members 112, 114 are coupled together at their upper and lower ends by an upper coupler 116 and a lower coupler 118, respectively. Additionally, the lower coupler 118 is pivotally coupled to the ends of lower side support members 134, 136. The rear frame portion 110 has a bottom surface 128 proximate the lower coupler 118. The bottom surface 128 is adapted to rest on a supporting surface.

In the illustrated embodiment, the support members are hollow, metal tubes, such as steel tubes. Support members can be formed of any material and configured in any cross-sectional shape that provides sufficient structural strength to support a user. For example, the support members can be aluminum tubes, plastic tubes, solid metal or plastic bars, etc.

Figure 3:
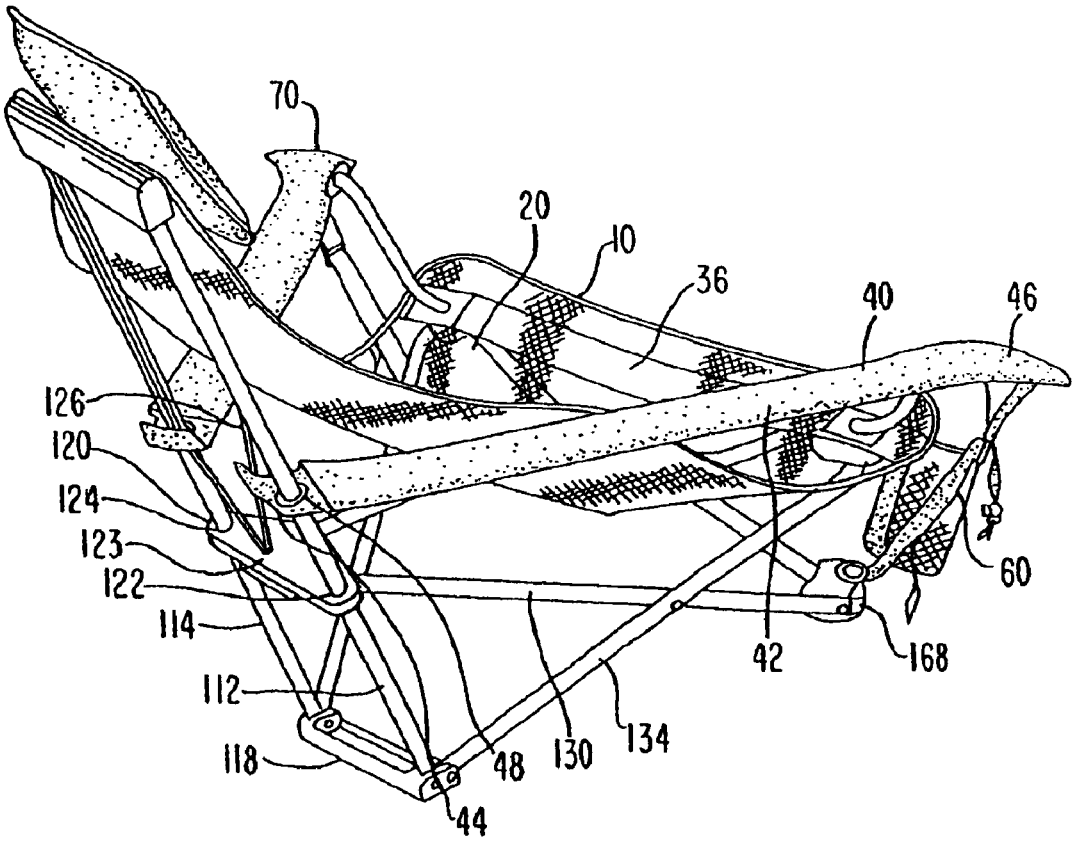
FIG. 3 illustrates a rear perspective view of the support of FIGS. 1 and 2.

In one embodiment, the coupler 120 is a plate that includes holes 122, 124 and is slidably mounted to support members 112, 114. As shown in FIG. 3, support members 112, 114 extend through holes 122, 124, respectively. The holes 122, 124 are sized to slide along the length of support members 112, 114. Slide plate 120 is pivotally coupled to the upper ends of the upper side support members 130, 132.

Figure 2:
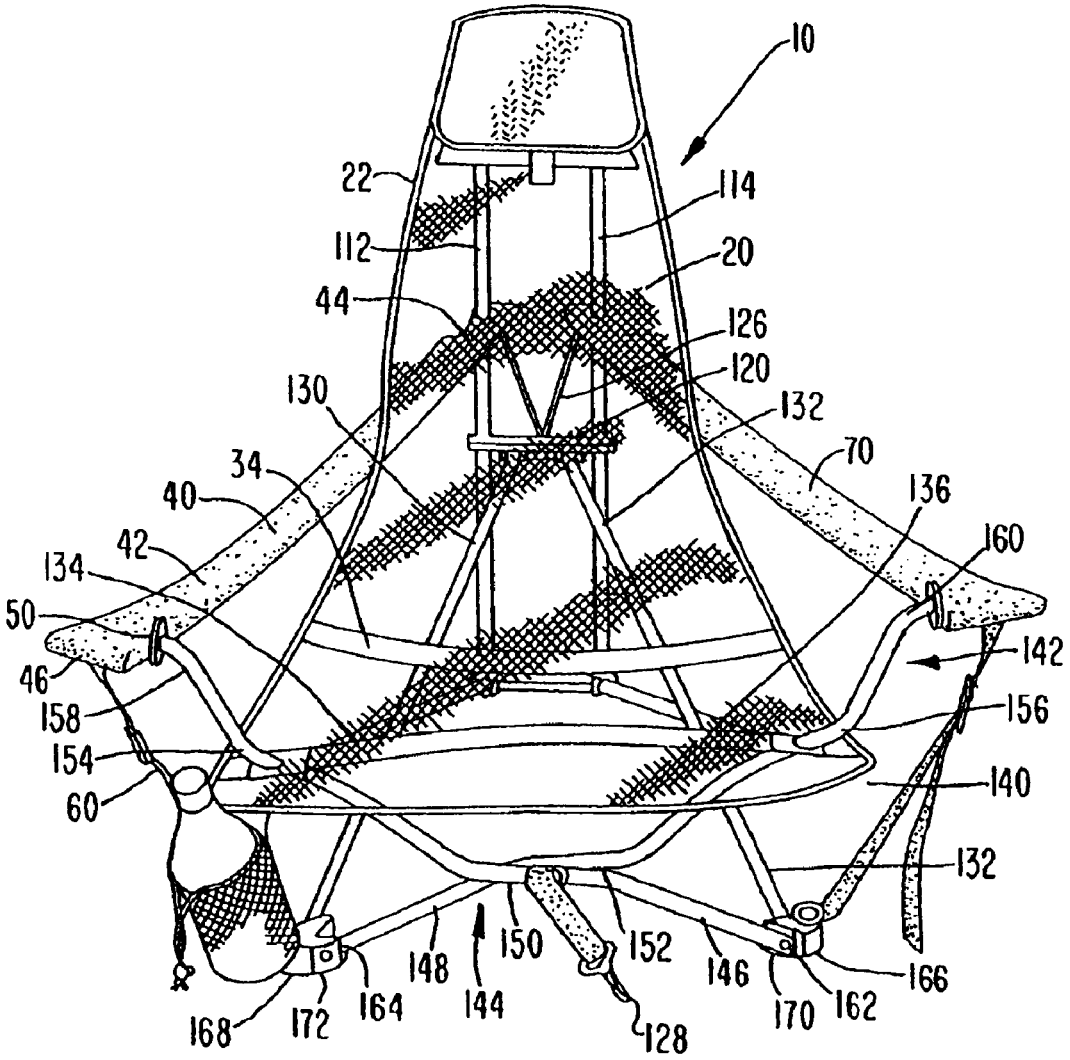
FIG. 2 illustrates a front view of the support of FIG. 1.

As shown in FIGS. 2 and 3, the support 10 includes an extension member 126 coupled to the slide plate 120. In one embodiment, the extension member 126 is a cord. The cord 126 is used to collapse the support 10 from its expanded configuration. The cord 126 is threaded through apertures (not shown) in the upper coupler 116 and connected to the plate 120. The function of the extension member is discussed in further detail below.

While the slide plate is formed of plastic in the disclosed embodiment, any suitable material may be used. Similarly the shape of the slide plate may be varied so long as the slide plate can move along the rear frame portion.

In the illustrated embodiment, the front frame portion 140 includes elongated support members or support members 146, 148 that are pivotally coupled to each other. Support members 146, 148 include upper ends 158, 160 and lower ends 162, 164 and form an "X" structure.

In one embodiment, support members 146, 148 include portions 154, 156 as illustrated in FIG. 2. Portions 154, 156 are substantially linear. When the frame 100 is in its expanded configuration, portions 154, 156 are oriented substantially horizontal and are positioned beneath the membrane 22 to provide support.

In one embodiment, support members 146, 148 include portions 150, 152 as illustrated in FIG. 2. Portions 150, 152 are substantially linear. In this embodiment, the support members 146, 148 are pivotally coupled together at portions 150, 152.

The lower ends 162, 164 of the support members 146, 148 are pivotally coupled to front feet 166, 168, respectively. Each of the front feet 166, 168 has a bottom surface 170, 172 that can engage the surface on which the support 10 is placed. Front feet 166, 168 are pivotally coupled to upper side support members 130, 132.

Support members 146, 148 are coupled to the seat portion 20 and to the lower side support members 134, 136. The seat portion 20 includes apertures or holes 30, 32 through which the support members 146, 148 can be inserted. The upper end of lower side support member 134 is pivotally coupled to the second planar portion 154 of support member 146. Similarly, lower side support member 136 is pivotally coupled to the second planar portion 156 of support member 148.

The front frame portion 140 has an upper portion 142 and a lower portion 144. The upper front frame portion 142 includes the front frame portion 140 located above the seat portion 20. The lower front frame portion 140 includes the front frame portion 140 located below the seat portion 20 in FIG. 2.

In the illustrated embodiment, the frame 100 is a self-supporting structure. When the frame 100 is in its expanded configuration, the weight of the components of the frame 100 hold the frame 100 in its expanded configuration. The frame 100 does not need the seat portion 20 or one of the tension members 40, 70 to remain in its expanded configuration.

In the illustrated embodiment, the seat or seat portion 20 includes a membrane 22 that is supported on the frame 100. The seat portion 20 includes a strip 24 along the perimeter of the membrane 22. The membrane 22 has ends 26, 28 and holes 30, 32 that are located proximate to end 28. End 26 of the membrane 22 is coupled to the rear frame portion 110. End 28 is releasably coupled to the front frame portion 140.

As shown in FIG. 2, the upper end 158 of the support member 146 is inserted through hole 30. Similarly, the upper end 160 of support member 148 is inserted through hole 32. Membrane 22 is supported on the second planar portions 154, 156 of each support member 146, 148.

In the illustrated embodiment, the membrane 22 is darted at regions 33 on either side of the seat portion 20. A triangular notch is cut in membrane 22 in each region 33. The membrane 22 is collected together to close the notch, thereby causing the membrane 22 to form a cup-like shape as illustrated in FIG. 1. The straps 34, 36 are secured to the membrane 22 in regions 33 to cover up the notch and to reinforce regions 33. The straps 34, 36 are also coupled to the membrane 22 to provide support to the seat portion 20. In the illustrated embodiment, strip 24 and straps 34, 36 are sewn to the membrane 22. However, the components of seat portion 20 can be coupled together using any known method of coupling items.

The term "membrane" is used herein to include, but is not limited to, a layer of material. For example, the membrane can be a piece of fabric such as nylon or neoprene.

In the illustrated embodiment, the support 10 includes tension members 40, 70 that are coupled to the frame 100. While the tension members 40, 70 are illustrated as substantially similar, the tension members do not have to be similar. Similarly, it is not necessary that the support has two tension members. Only one tension member will be discussed in detail below to simplify the description of the invention.

In the illustrated embodiment, the tension member is an elongated fabric strap. Alternatively, the strap can be a rope, cord, webbing, or any other structure that can provide a tensile force.

In the illustrated embodiment, the tension member includes a padded portion 42, and a strap portion 60. Tension member 40 is coupled to the rear frame portion 110 and the front frame portion 140.

Tension member can be coupled to the frame at any number of locations. Tension member 40 can be coupled to the rear frame portion 110 at one or more locations. Similarly, tension member 40 can be coupled to the front frame portion 140 at one or more locations. For example, tension member can be coupled to the rear frame portion at two locations and to the front frame portion at one location. In one embodiment, tension member can be coupled to the rear frame portion at one location and to the front frame portion at two locations. In another embodiment, tension member can be coupled to the rear frame portion at one location and to the front frame portion at one location. In another embodiment, tension member can be coupled to the rear frame portion at two locations and to the front frame portion at two locations. When the tension member is connected to the rear frame portion or to the front frame portion at multiple locations, each location can be at the same or different height relative to the other locations on the same frame portion.

Tension member 40 can be either removably or fixedly coupled to the rear frame portion 110 and/or the front frame portion 140 at each location. For example, tension member 40 can be removably coupled to the front frame portion at one location and fixedly coupled to the rear frame portion at two locations. Any combination of fixed and removable connections to the frame can be used to couple the frame and each tension member.

In alternative embodiments, tension member 40 can be coupled to the frame at locations other than on the rear frame portion and on the front frame portion.

The preceding discussion of the coupling of tension member to the rear frame portion and to the front frame portion can be applied to the various embodiments of tension members and supports described herein.

One end of tension member 40 includes a hole 48 through which support member 112 is inserted. Accordingly, the tension member 40 is slidably coupled to the support member 112 of the rear frame portion 110. The opposite end of the tension member 40 is connected to the front frame portion 140 at front foot 162.

Figure 4:
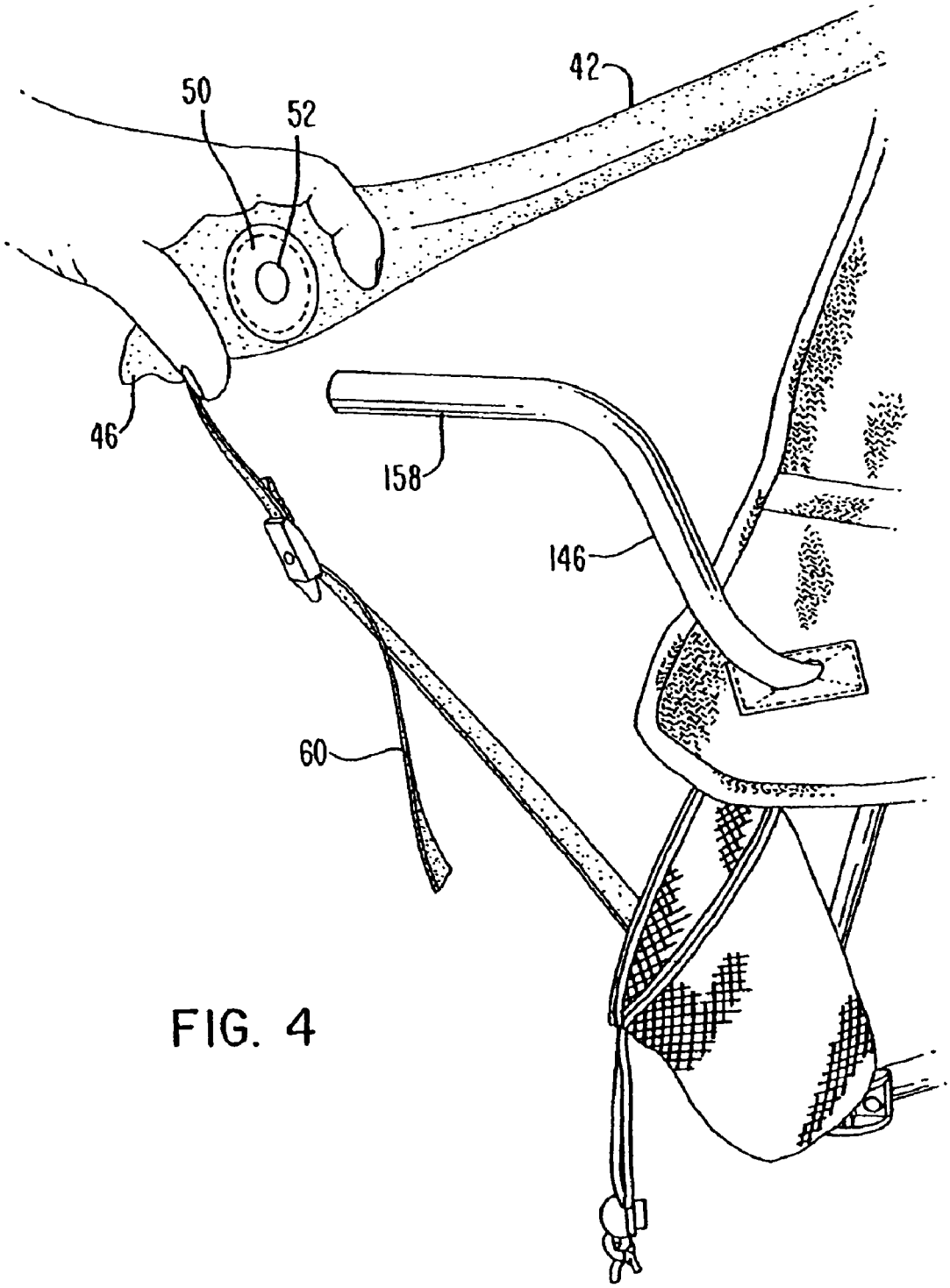
FIG. 4 illustrates a portion of a tension member of the support of FIG. 1.

In the illustrated embodiment, the tension member 40 is releasably coupleable to the front frame portion 140. As illustrated in FIG. 4, the padded portion 42 of the tension member 40 includes ends 44, 46 and a coupler 50 having an opening or hole 52 therein. Coupler 50 and hole 52 are located proximate end 46. The hole 52 is configured to receive a portion of the upper end 158 of the support member 146. Upper end 158 is inserted into and is seated in coupler 50.

Figure 5:
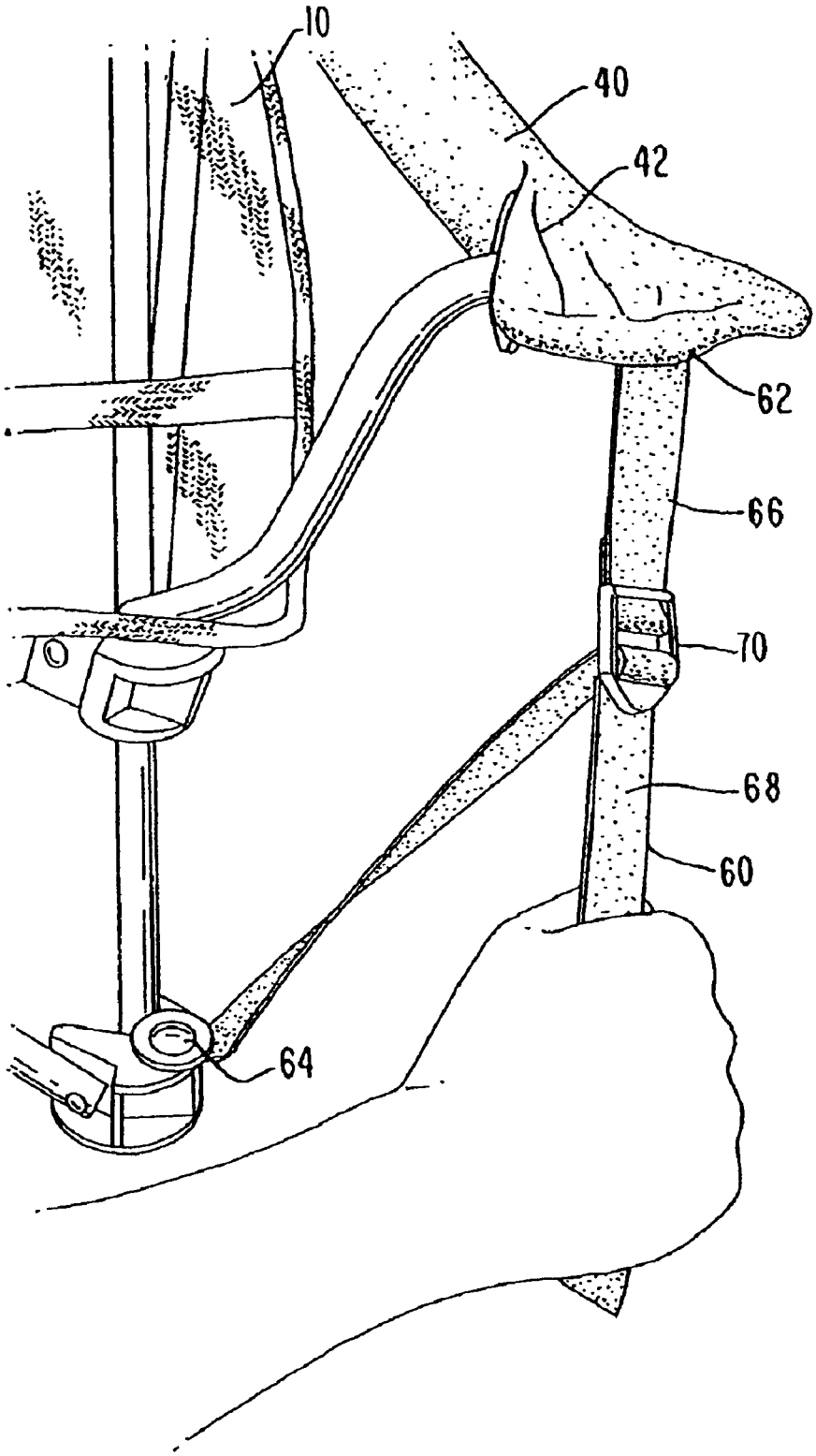
FIG. 5 illustrates a portion of a tension member of the support of FIG. 1.

As illustrated in FIG. 5, the strap portion 60 of tension member 40 includes ends 62, 64, a fixed portion 66, and an adjustable portion 68. One end 62 of the strap portion 60 is coupled to end 46 of the padded portion 42. The strap portion 60 also includes a tensioner 70 that couples the fixed portion 66 to the adjustable portion 68. Tensioner 70 can be adjusted to change the length of the strap portion 60.

In the illustrated embodiment, tensioner 70 is a buckle that is coupled to a free end of the fixed portion 66. Tensioner 70 can be any mechanism that can be used to retain two points on the strap portion together to vary the distance between the ends of the strap portion. For example, tensioner 70 can include a pair of buckles, a pair of clips, hook and loop fasteners, etc.

In an alternative embodiment, adjustment of the tension member can adjust the disposition of the frame. For example, the coupler can be sized to permit movement of the tension member relative to the upper end of the support member. Since the tension member is coupled to the rear frame portion, the tension member and the rear frame portion are pulled forwardly as the strap portion is shortened. When the rear frame portion is pulled forwardly, the angle that the rear frame portion is reclined relative to the supporting surface varies. Accordingly, the user can adjust the recline position of the support by adjusting the strap portion of the tension member.

Figure 6:
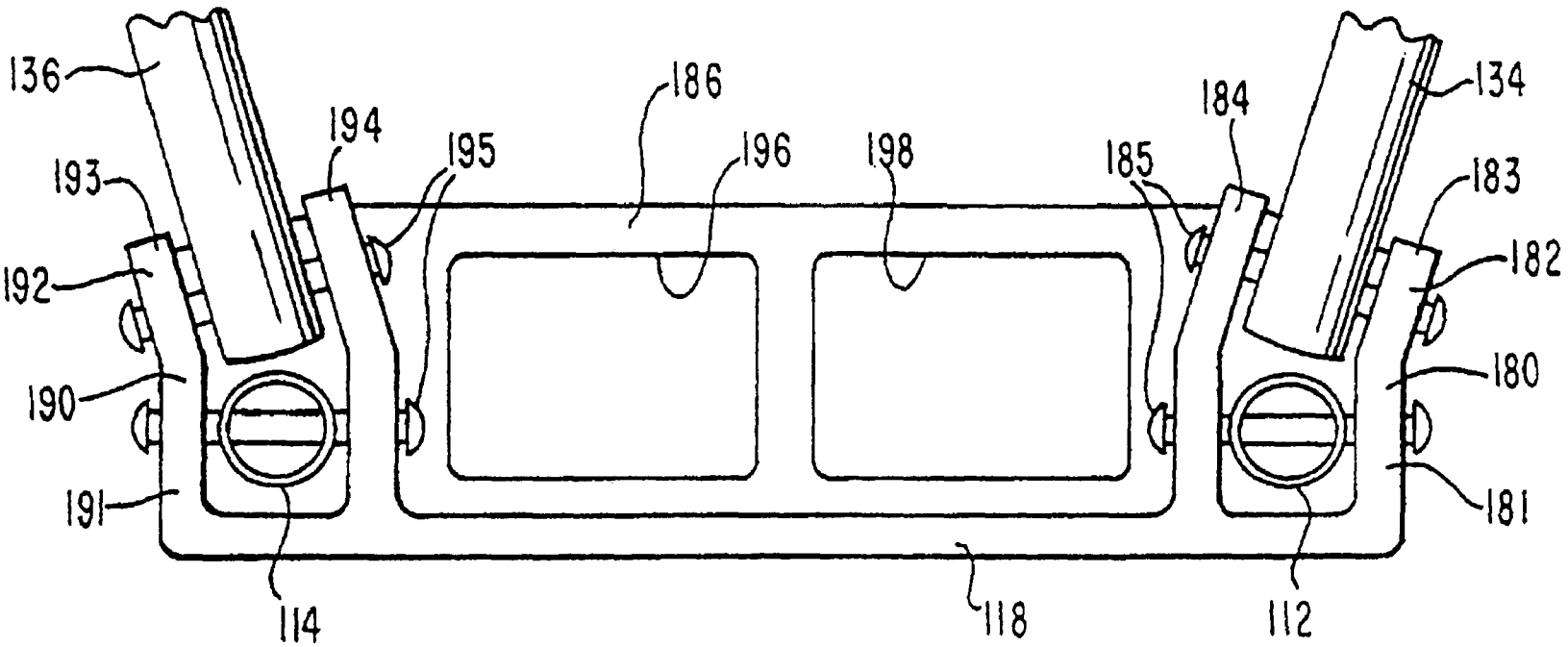
FIG. 6 illustrates a bottom coupler of the rear frame portion of the support of FIG. 1.

An embodiment of a lower coupler is illustrated in FIG. 6. Lower coupler 118 includes mounting portions 180, 190 and a bottom portion 186. In the illustrated embodiment, the mounting portions 180, 190 and the bottom portion 186 are integrally formed.

Mounting portions 180, 190 include side walls 183, 184 and 193, 194, respectively. Mounting portion 180 includes coupling portions 181, 182. Coupling portion 181 can be referred to as straight section or portion 181. Coupling portion 182 can be referred to as angled section or portion 182. As illustrated in FIG. 6, coupling portion 181 is oriented at an angle relative to coupling portion 182. Similarly, mounting portion 190 includes coupling portions or straight section 191 and angled section 192.

As illustrated in FIG. 6, rear support members 112, 114 are coupled to mounting portions 180, 190 by fasteners 185, 195, respectively. Fasteners 185, 195 can be any type of fastener that allows relative movement between the rear support members and the lower coupler.

Side support members 134, 136 are coupled to mounting portions 180, 190 by fasteners 185, 195. In the illustrated embodiment, the side support members 134, 136 are coupled to the angled sections 182, 192 of the mounting portions 180, 190. Rear support members 112, 114 are coupled to the straight sections 181, 191 of the mounting portions 180, 190.

When the frame is moved from its expanded configuration to its collapsed configuration, side support members 134, 136 pivot about fasteners 185, 195 in different planes. Since the angled sections 182, 192 are oriented at angles with respect to the coupler 118 as shown in FIG. 6, the planes in which the side support members 134, 136 move intersect each other.

Since the connections of the side support members 134, 136 to the lower coupler 118 are in front of and at angles to the connections of the rear support members 112, 114 to the lower coupler 118, the torque on the connections at the lower coupler 118 generated by the collapsing of the frame 100 is lower than the torque generated in conventional supports. Similarly, since the fasteners connecting a side support member and a rear support member to a particular mounting portion are not parallel, the torque generated in the fasteners during the collapsing or expanding of the frame is reduced.

The bottom portion 186 of the lower coupler 118 includes openings 196, 198. When the support 10 is placed on a surface with loose material, such as sand or dirt, the loose material can pass through openings 196, 198.

Figure 7:
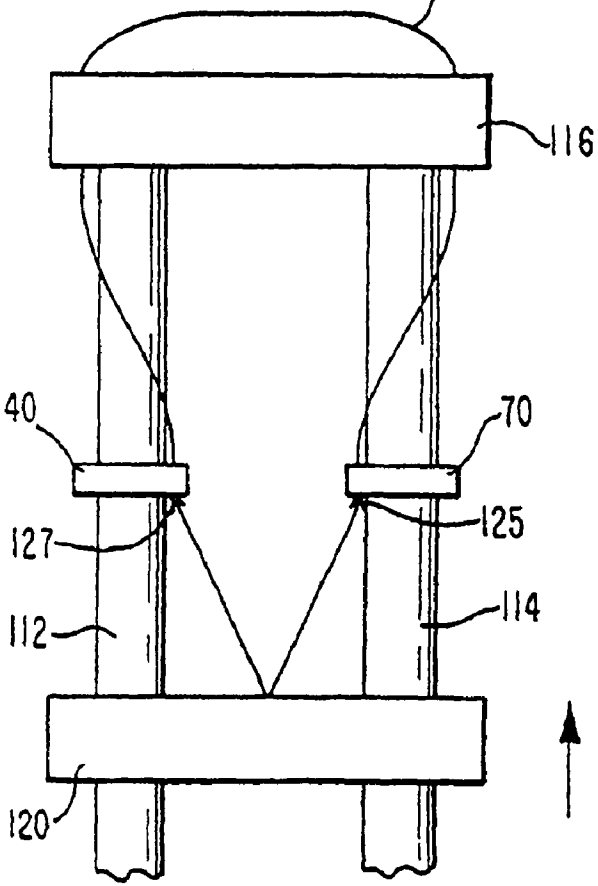
FIG. 7 illustrates a front view of a portion of the rear frame portion of the support of FIG. 1.

FIG. 7 illustrates a front view of an embodiment of the upper portion of the rear frame portion. The extension member 126 is coupled to the slide plate 120 and extends through openings in the upper coupler 116. The extension member 126 also passes through openings in the tension members 40, 70 behind the holes through which the rear support members 112, 114 extend.

In one embodiment, the extension member 126 includes two knots 125, 127. Each knot 125, 127 is positioned below and provides support for the end of one of the tension members 40, 70. Above the tension members 40, 70, the extension member 126 warps around each of the rear support members 112, 114 and passes through openings in the upper coupler 116 on the outside of the support members 112, 114. The operation of the extension member is discussed in greater detail below in FIGS. 16-18.

Figure 8:
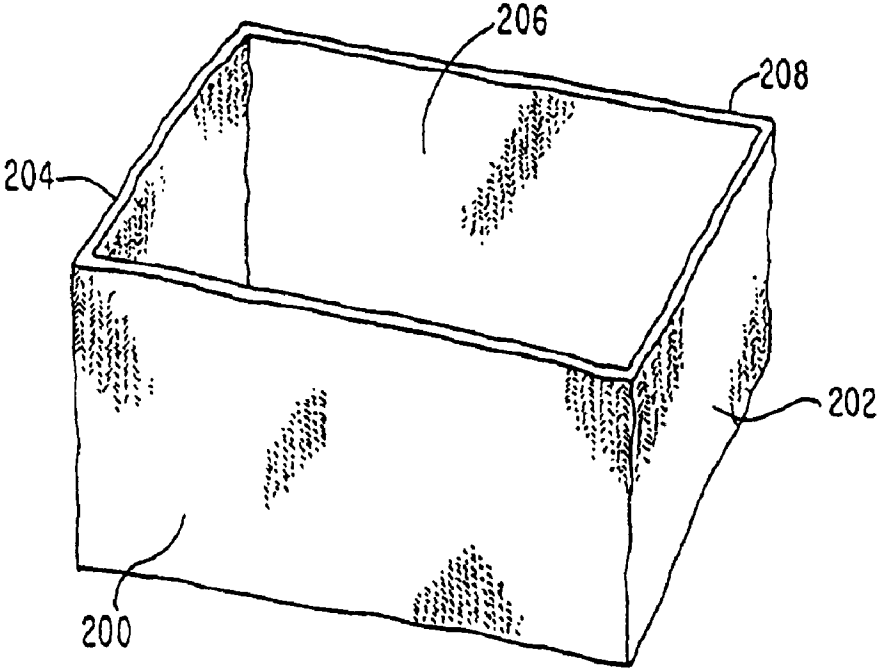
FIG. 8 illustrates a cover according to an embodiment of the invention.

An embodiment of a cover is illustrated in FIG. 8. Cover 200 includes a membrane 202 having an edge 204 that defines an opening 206. An elastic band 208 is sewn along edge 204. In the illustrated embodiment, the membrane is a nylon material.

FIGS. 9-15 illustrate a process, in ascending order, according to an embodiment of the present invention, by which a collapsible support can be changed or transformed from an expanded configuration to a collapsed configuration. It should be understood that the process can be reversed to transform the support from its collapsed configuration to its expanded configuration by following FIGS. 9-15 in reverse order.

Figure 9:
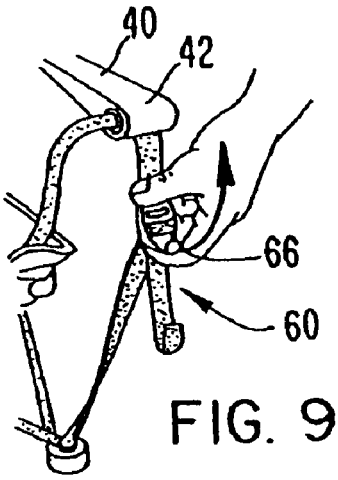
FIGS. 9-15 illustrate a process, according to an embodiment of the present invention, by which the support can be transformed from an expanded configuration to a collapsed configuration.
Figure 10:
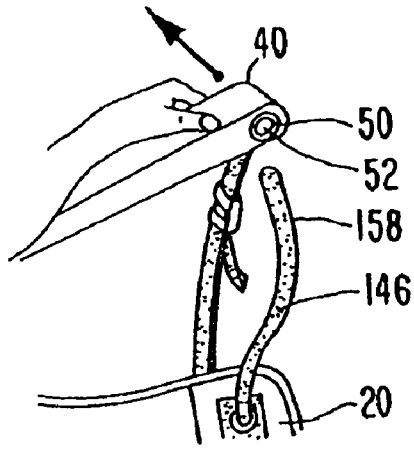

As shown in FIG. 9, the user releases the tension in the tension member 40 by increasing the length of the strap portion 60. The user then removes or decouples the upper end 158 of the support member 146 from the tension member 40 as illustrated in FIG. 10. These steps, releasing the tension and removing the tension member 40, are repeated for the second tension member 70.

Figure 11:
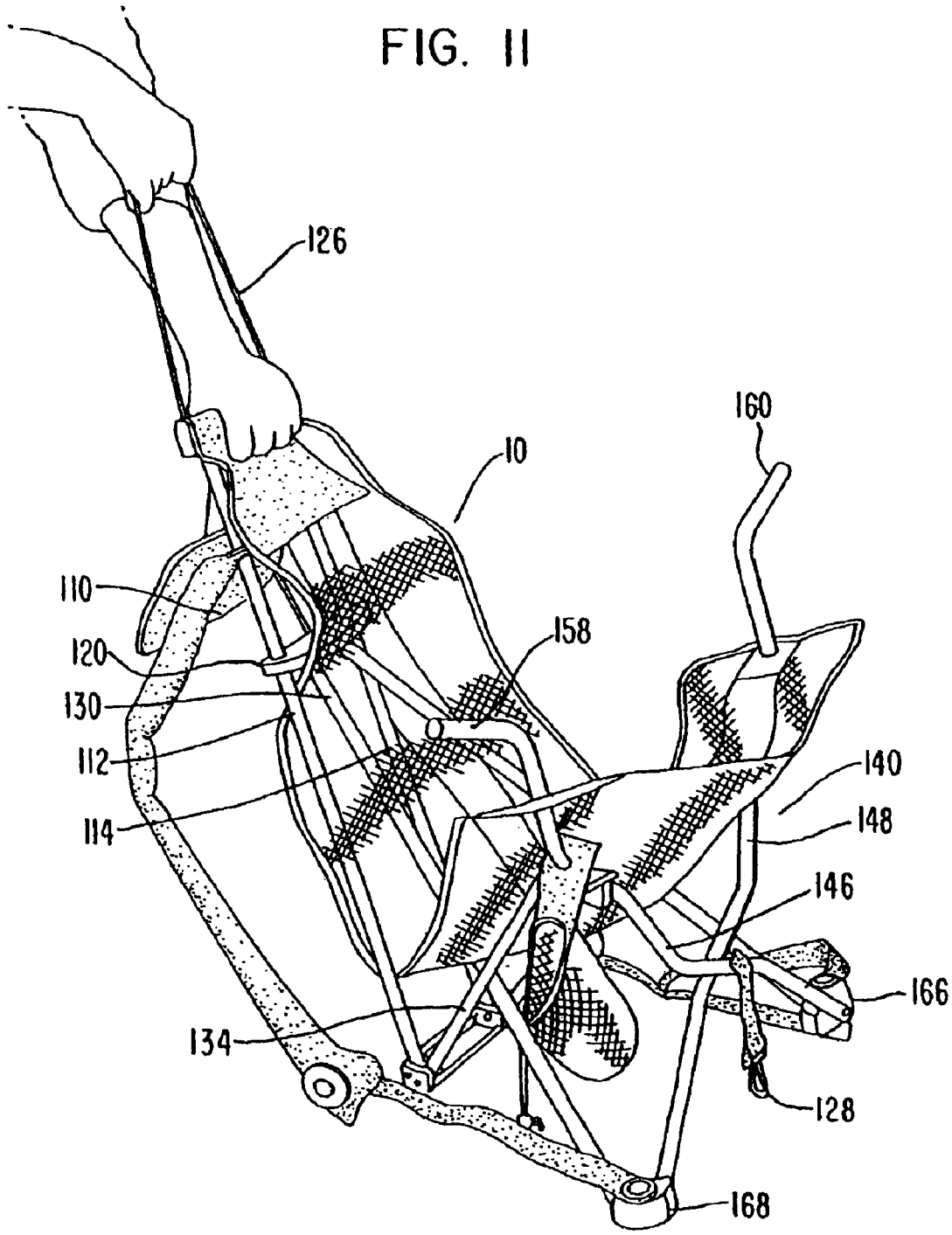
Figure 12:
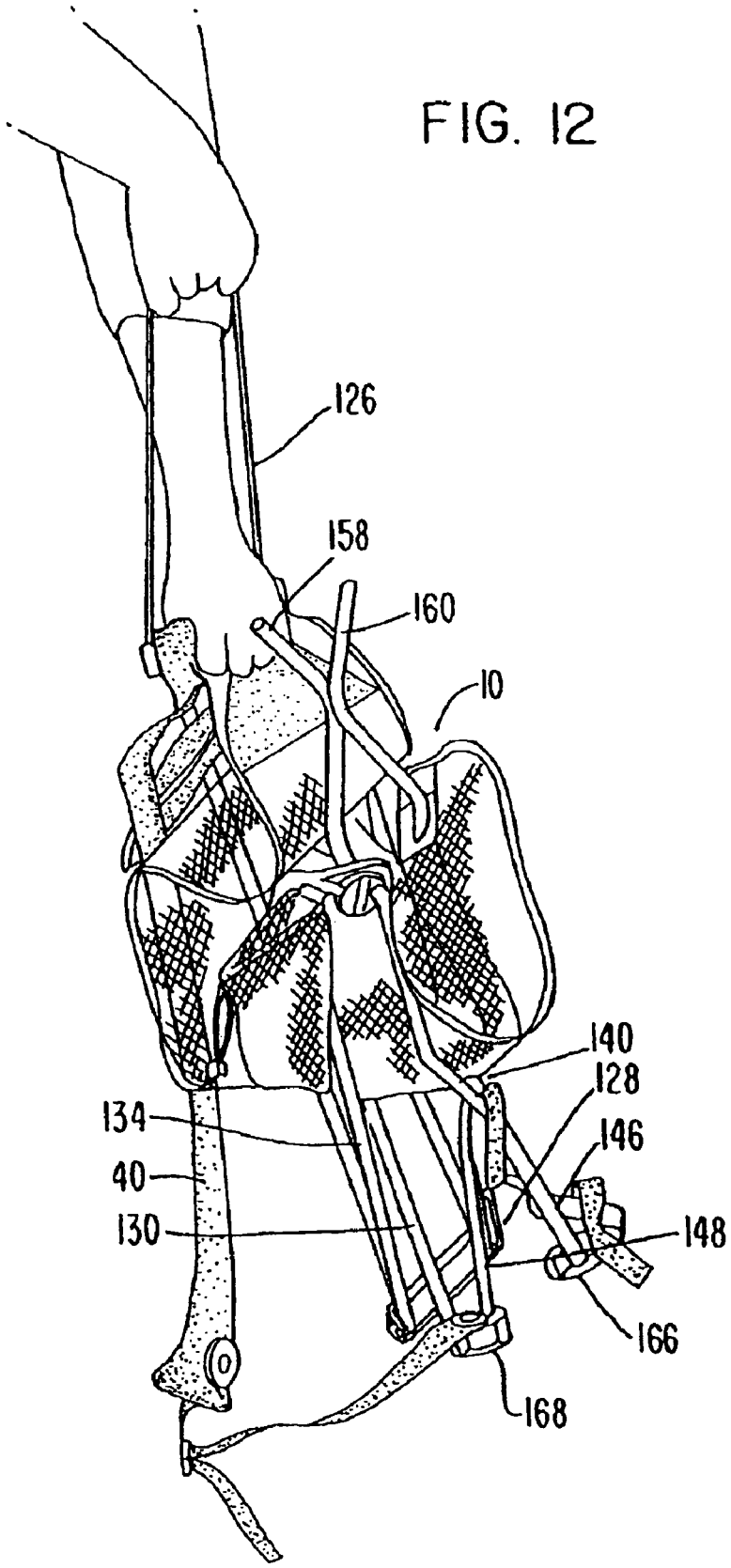

As shown in FIGS. 11-12, the user grasps and pulls upwardly on the cord 126 while holding onto the upper coupler 116. When the user pulls the cord 126, the slide plate 120 slides upwardly along support members 112, 114. As the slide plate 120 moves upwardly, the ends of the support members 130, 132 connected to the slide plate 120 move upwardly. As a result, the lower ends of the upper side support members 130, 132 are drawn toward the rear frame portion 110 and the lower side support members 134, 136 pivot about their lower ends. The scissor-like movement of the side support members 130, 132, 134, 136 draws the front frame portion 140 towards the rear frame portion 110. The movement also causes the front feet 162, 164 to move together and the upper ends 158, 160 to move together.

Figure 13:
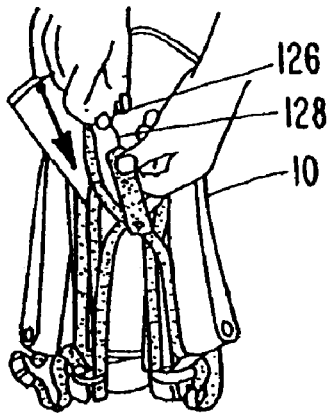

Once the frame 100 is collapsed, the user then secures the support 10 in its collapsed configuration by fastening the clip 128 that is coupled to the front frame portion 140 to cord 126 as illustrated in FIG. 13.

Figure 14:
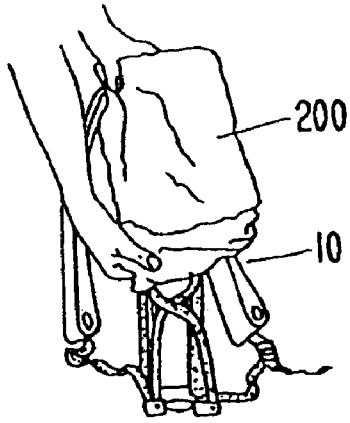
Figure 15:
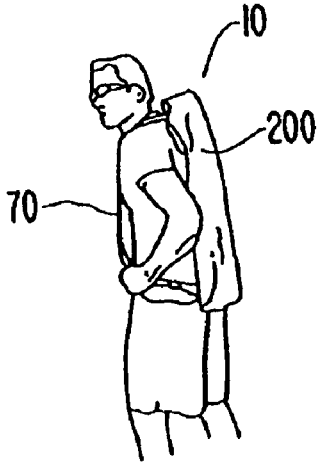
Figure 16:
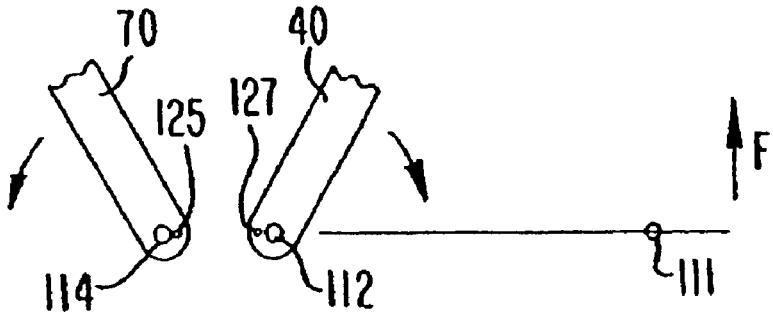
FIGS. 16-18 illustrate the movement of the tension members relative to the rear frame portion.
Figure 17:
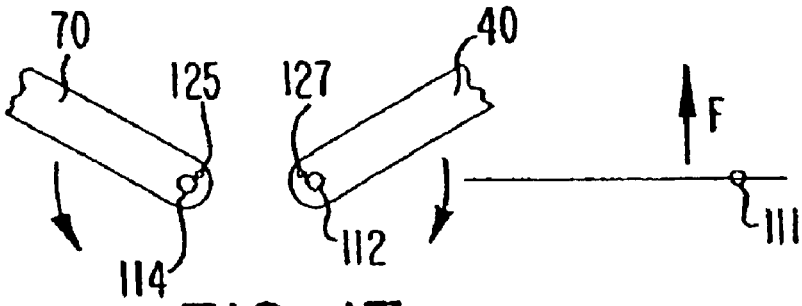
Figure 18:
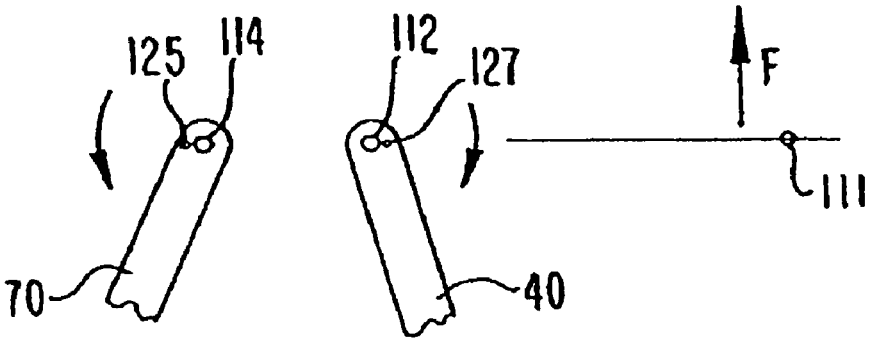

Cover 200 can be placed over the collapsed support 10 as illustrated in FIGS. 13-14. The cover 200 is configured to receive a portion of the collapsed support 10. In particular, the cover 200 encloses a portion of the frame 100. The tension members 40, 70, however, are not enclosed by and extend from the cover 200. As illustrated in FIG. 15, the tension members 40, 70 can be supported on the shoulders of the user. FIGS. 16-18 illustrate the rotation of the tension members during the collapsing of the frame. Line 111 represents a plane defined by the rear support members 112, 114. The direction in which the support 10 is facing is illustrated by the arrow F.

In FIG. 16, the support 10 is illustrated in its expanded configuration. As the user grasps the extension member 126 and pulls it upwardly, the tension members 40, 70 and the location of the knots 125, 127 rotate around the rear frame member 110. As illustrated in FIGS. 17 and 18, tension member 40 rotates around rear support member 112. Tension member 70 rotates in an opposite direction about rear support member 114. The rotation of the tension members 40, 70 is caused by the wrapping of the extension member 126 around each rear support member 112, 114.

Referring to FIG. 7, as the extension member 126 is pulled higher and advances upwardly along the rear frame portion 110, the relative positions of the knots 125, 127 move around the rear support members 112, 114. The wrapping movement of the extension member 126 around members 112, 114 causes the tension members 40, 70 to move between a position in which they provide support to a user's arm and a position on the rear of the frame 100 in which they can be carried on the shoulders of a user. The positions of the tension members 40, 70 relative to the frame 110 during the collapsing process are illustrated in FIGS. 11 and 12.

Figure 19:
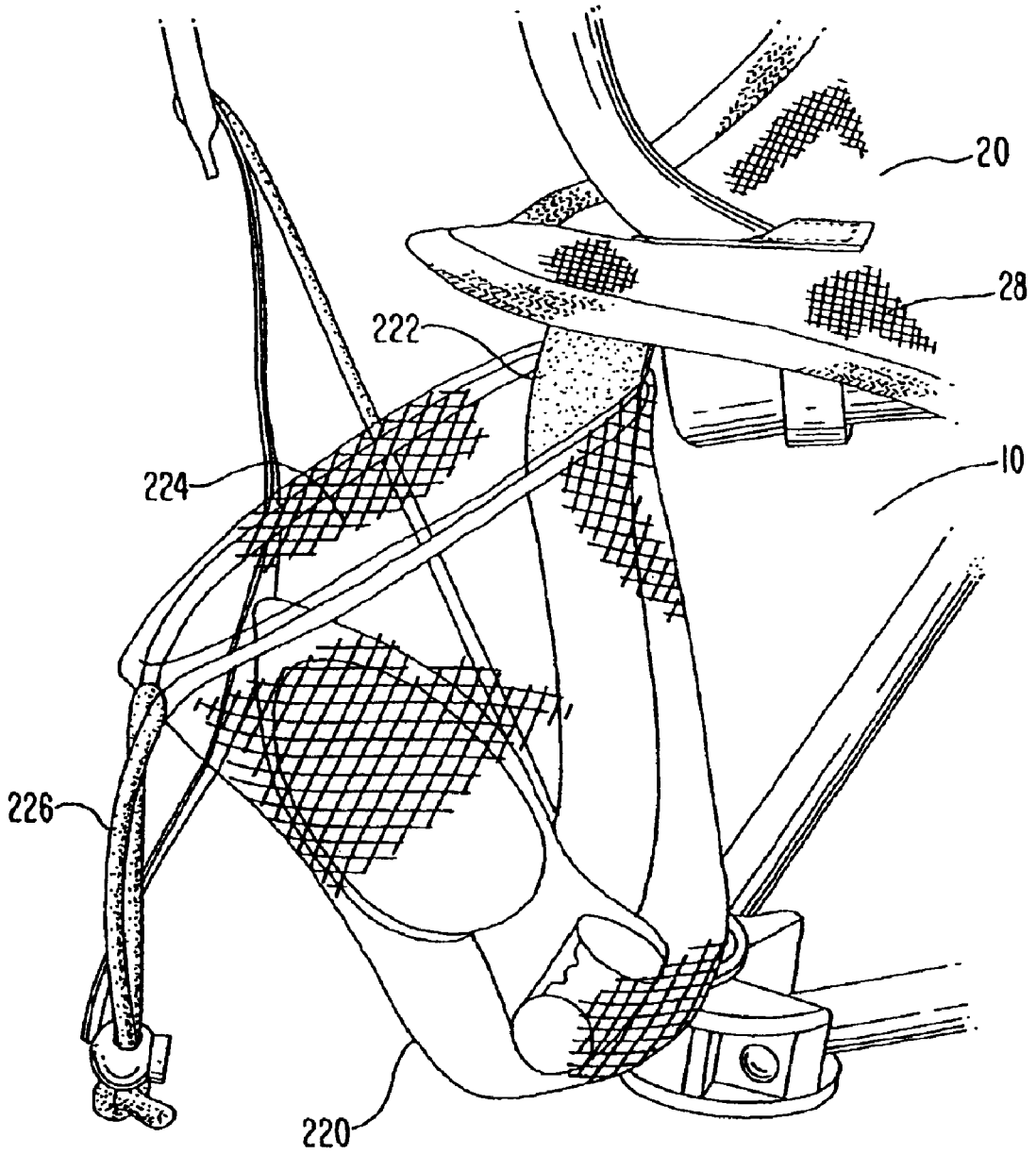
FIG. 19 illustrates a storage bag of the support of FIG. 1.

In one embodiment, the support 10 can include a pouch 220 as illustrated in FIG. 19. The pouch 220 is coupled proximate to the end 28 of the seat portion 20. The pouch 220 includes an attachment strap 222, a fabric portion 224, and a draw string 226. The attachment strap 222 is coupled to the seat portion 20 and supports the fabric portion 224 of the pouch 220. A draw string 226 is provided at the upper surface of the fabric portion 224 to close the opening 228.

While the illustrated fabric portion is made from a mesh material, the fabric portion can be any material that can be used to support and retain an article. Similarly, the fabric portion can be any size or shape that enables the pouch to hold articles.

Figure 20:
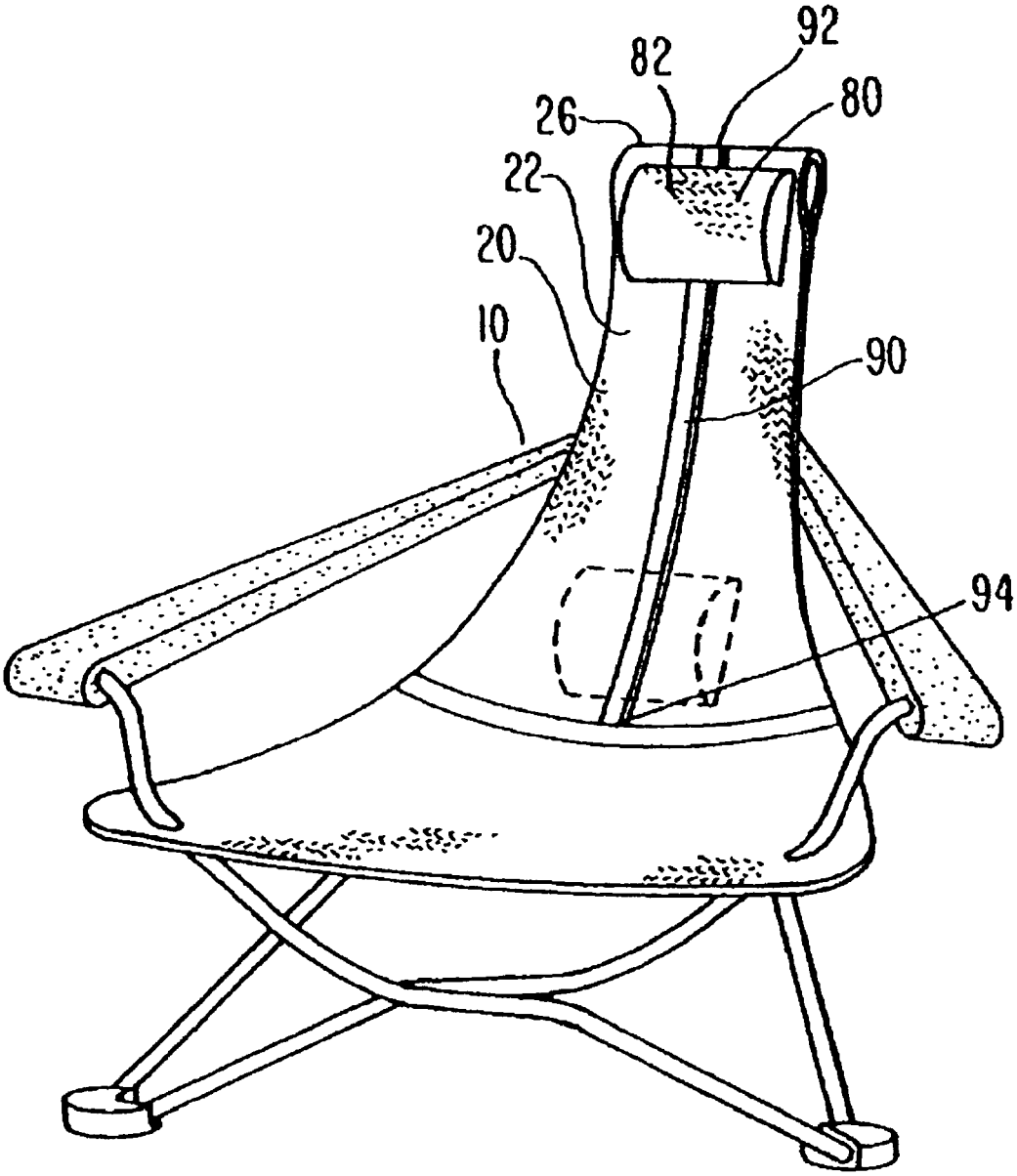
FIGS. 20-21 illustrate a support and a pillow according to an embodiment of the invention.
Figure 21:
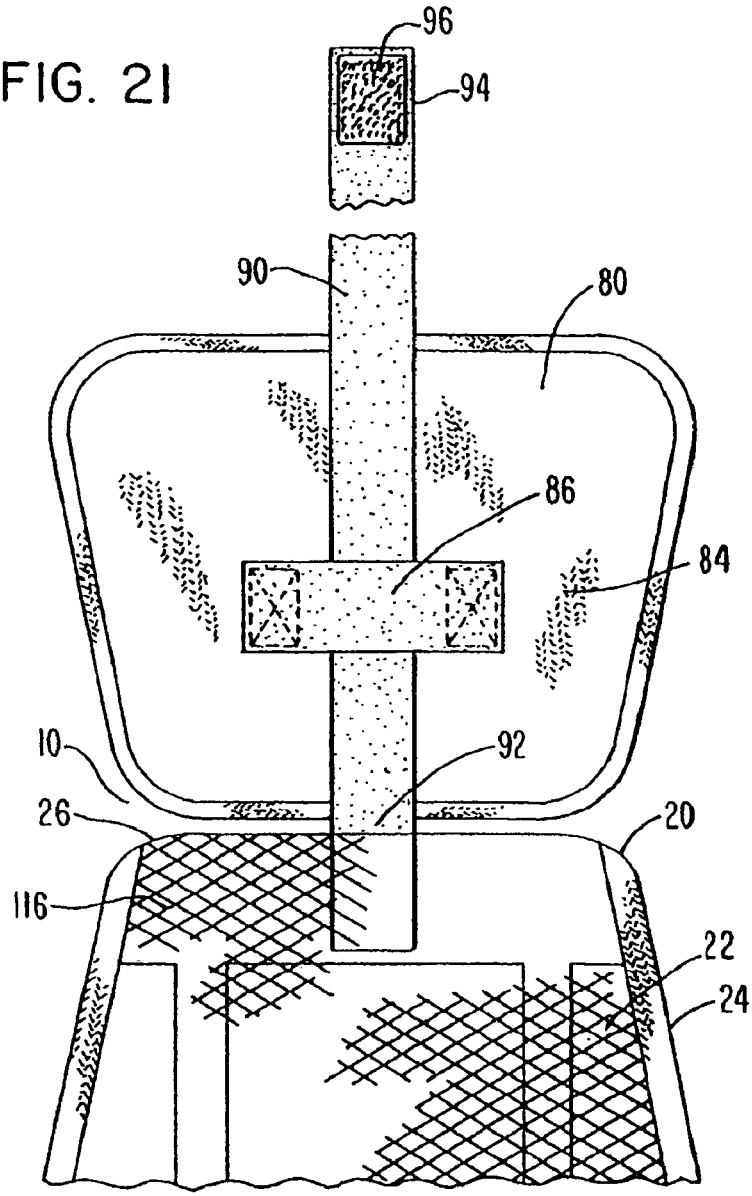

In one embodiment, the support 10 includes a pillow 80. As illustrated in FIGS. 20-21, the pillow 80 includes a body with a front surface 82 and a rear surface 84. The front surface 82 of the pillow 80 can be used to support a portion of a user's body, such as a head, neck, or back. The pillow 80 includes a fabric loop 86 mounted on its rear surface 84.

The pillow 80 is slidably coupled to an elongated strap 90 that extends along the back portion of the seat portion 20. Strap 90 is inserted into loop 86, thereby allowing the pillow 80 to slide along strap 90. The pillow 80 can slide between upper and lower position as illustrated in FIG. 20. In the upper position, the pillow 80 is a head cushion for the support 10.

The strap 90 includes ends 92, 94. End 92 is coupled to end 26 of the membrane 22. The other end 94 of the strap 90 includes a fastener 96 and can be selectively attached to the membrane 22. In the illustrated embodiment, fastener 96 is a hook fastener that can be coupled to the membrane 22 of the seat portion. Thus, the pillow 80 can be disposed in a plurality of positions on the membrane 22 as determined by the strap 90.

In one embodiment, the strap 90 can be flipped over the upper coupler 116 and rest against or be secured to the back of the support 10. When the support 10 is collapsed, the pillow 80 can be positioned along strap 90 so that it is positioned between the frame 100 and the user when the support 10 is carried on the user's back.

Figure 22:
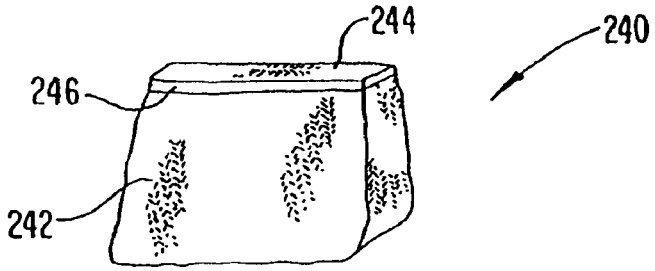
FIG. 22 illustrates an alternative embodiment of a pillow according to the present invention.

In the illustrated embodiment, the pillow is filled with a stuffing material. In an alternative embodiment, the pillow can be a pouch with a sealable opening into which material can be inserted. As illustrated in FIG. 22, pillow 240 may include a flexible membrane 242 that defines an opening 244. The pillow 240 can include a closing mechanism 246, such as a zipper or a hook and loop fastener, to close the opening 244. When the support 10 is in its expanded configuration, the cover 200 can be stuffed into the pillow 240 to enable the pillow 240 to be used as a support.

FIGS. 23-28 illustrate several alternative embodiments of shades that can be used with a support according to the present invention. Shades can be utilized with any type of support, including the support illustrated in FIGS. 1-3.

In the illustrated embodiments, each of the shades is releasably coupled to a support with tethering lines 314 and coupling elements 316. Coupling mechanisms other than tethering lines and coupling elements can be used to secure the shades to the supports. For example, straps with buckles, clips, or slide on pockets can be used. Alternatively, a shade can utilize sand anchors to position the shade relative to a chair, instead of coupling the shade to the chair.

Also, while the tethering lines are illustrated as secured to the shades via holes, the coupling mechanisms can be clipped, adhered, sewn, or connected to the shades using any other method of coupling items. The arrangement of the coupling mechanisms, including the holes on the shades, can vary depending on the desired arrangement.

Figure 23:
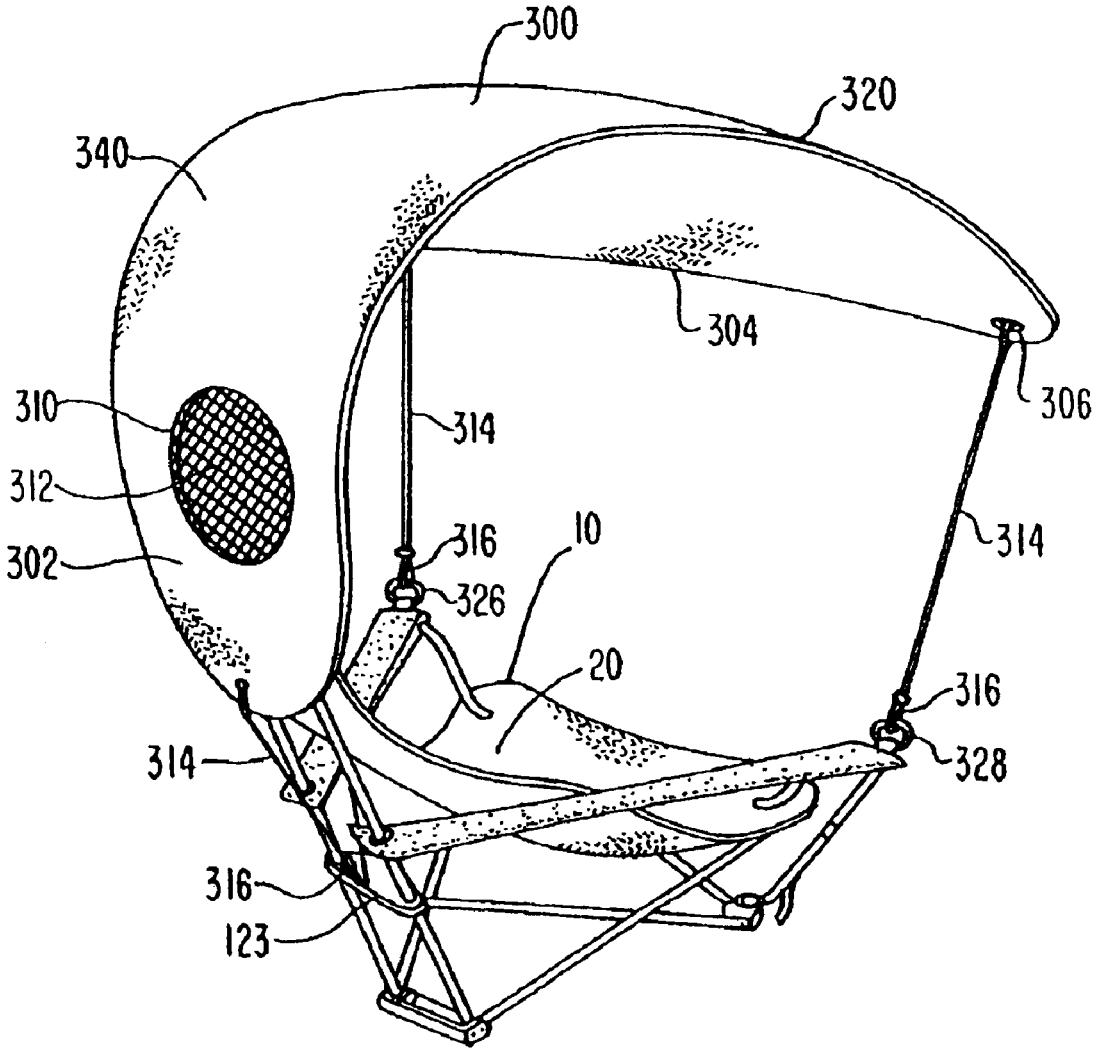
FIG. 23 illustrates a combination of a support and a shade according to the present invention.

In one embodiment, a support can include a shade 300 coupled thereto. In FIG. 23, shade 300 is coupled to the support 10 at three locations. Shade includes a membrane 340, a frame 320, and ends 302, 304. An opening 310 is formed in membrane 340 proximate to end 302. A fabric material 312, such as mesh, covers opening 310, which provides ventilation.

The membrane 340 is coupled to the frame 320 that provides support for the shade. In the illustrated embodiment, the frame 320 is a flexible band, such as a thin metal band. An example of a shade is disclosed in U.S. patent application Ser. No. 09/764,059, entitled "Collapsible Sunshade and Methods of Using the Same", filed Jan. 19, 2001, the disclosure of which is incorporated by reference herein.

The coupling mechanisms 316 are releasably secured to mounting elements that are connected to the support as illustrated. In one embodiment, the support 10 can include mounting elements 326, 328 located on the front frame portion 140.

Figure 24:
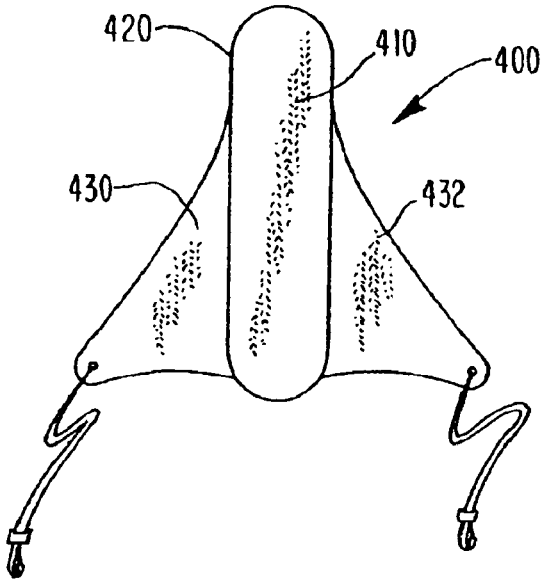
FIGS. 24-28 illustrate alternative embodiments of a shade according to the present invention.

As shown in FIGS. 23-28, the shape and features of the shade embodiments can vary. In FIG. 24, shade 400 includes a membrane 410, a frame member 420, and flaps 430, 432. The frame member 420 is a flexible metal band that provides support to the membrane 410. In this embodiment, the frame member 420 does not extend around the perimeter of the shade 400. The flaps 430, 432 are provided on the side of the center portion of the membrane 410.

Figure 25:
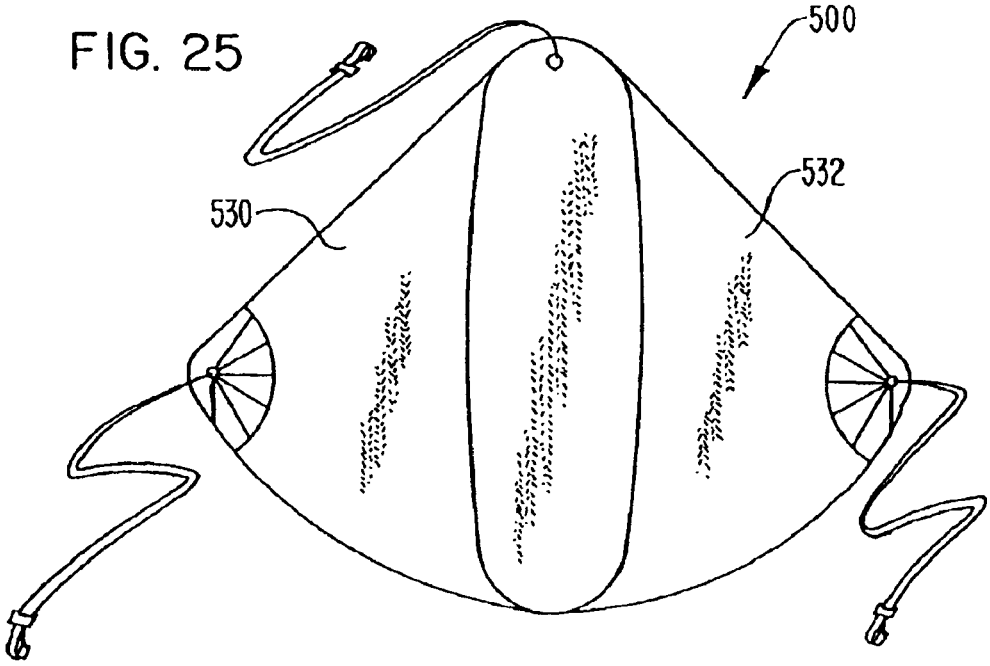
Figure 26:
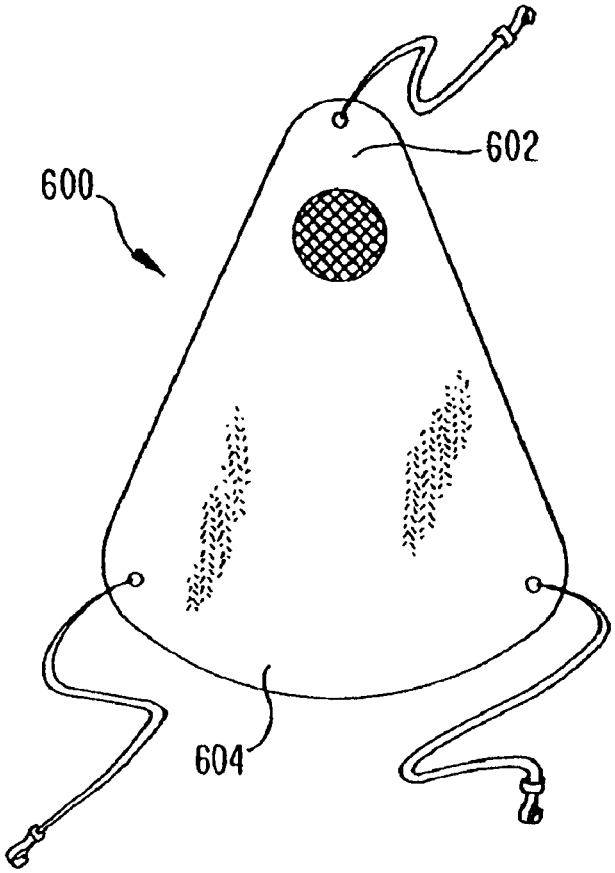
Figure 27:
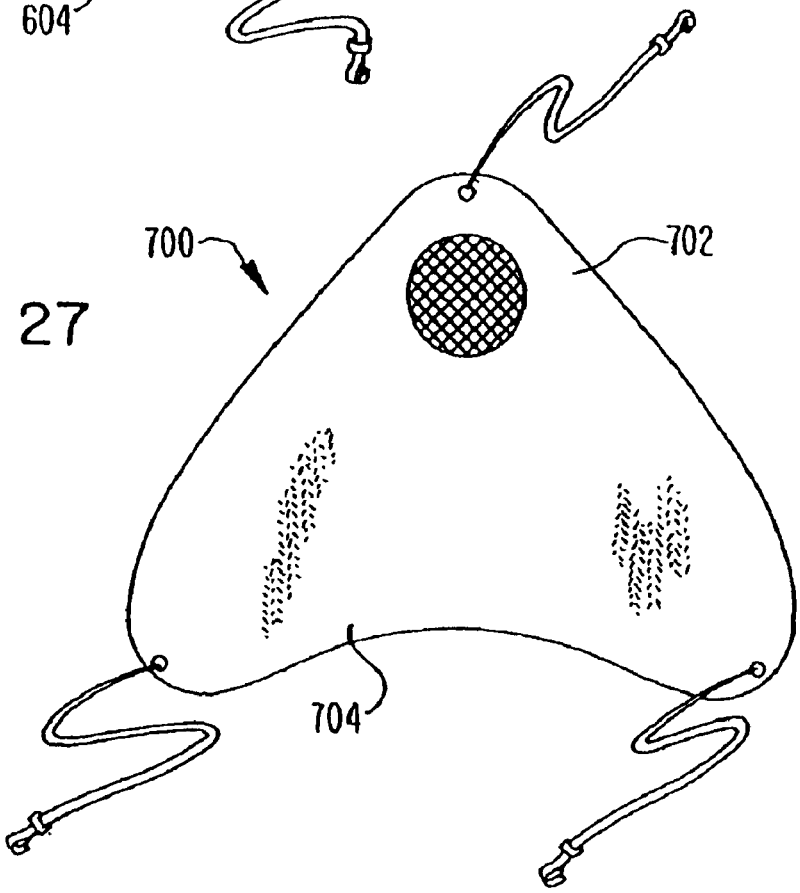

Additional embodiments of a shade are illustrated in FIGS. 25-28. In FIG. 25, shade 500 includes flaps 530, 532. Shade 500 is substantially similar to shade 400, which is shown in FIG. 19, with the exception of the shapes of the flaps. In FIG. 26, shade 600 includes ends 602, 604, one of which has an inwardly curved shape. In FIG. 27, shade 700 includes ends 702, 704, one of which has an outwardly curved shape.

Figure 28:
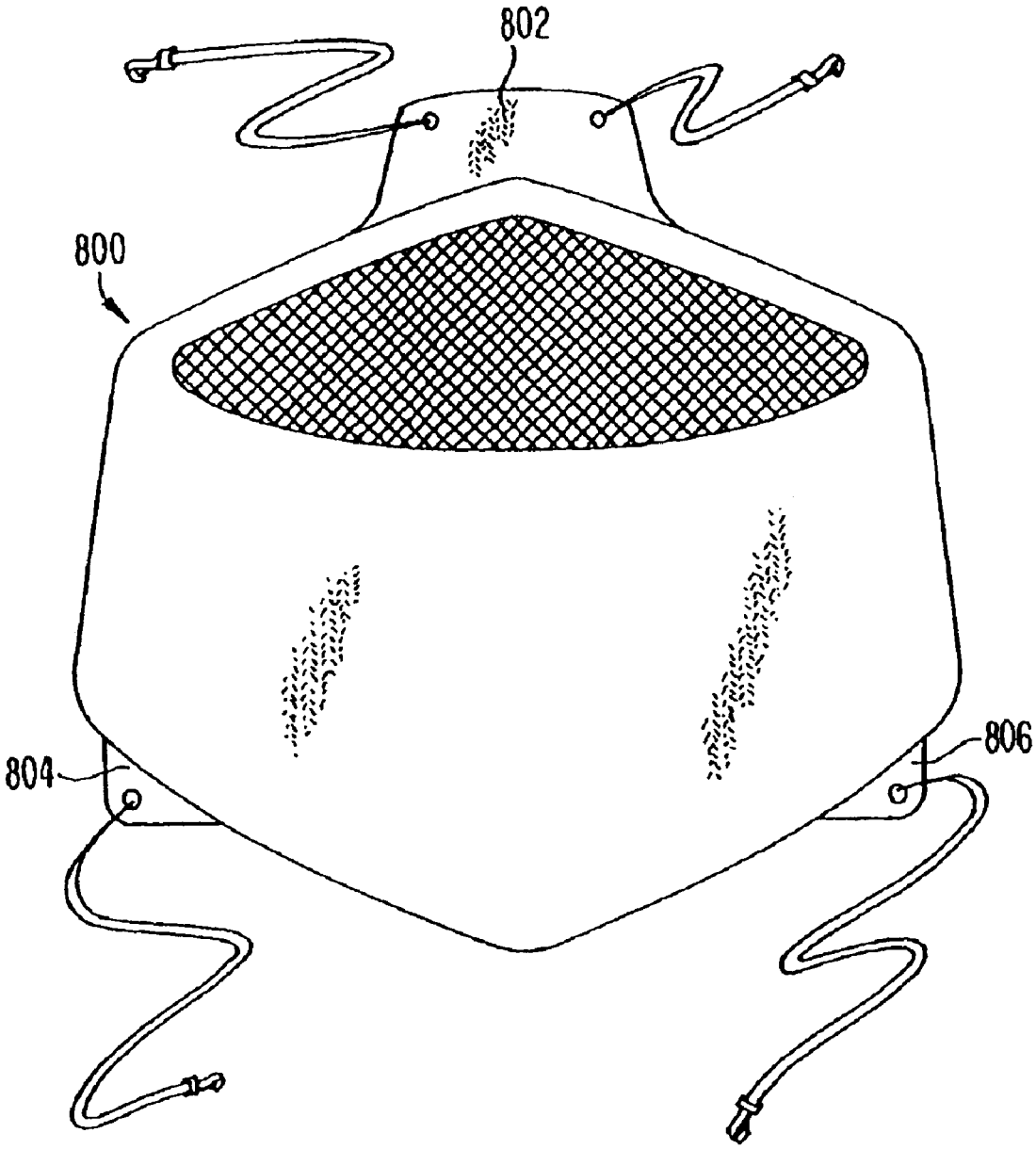

In FIG. 28, shade 800 has a hexagonal shape with several flaps 802, 804, 806 located on its perimeter.

The shapes of the shades, including the flaps, can be varied depending on the desired amount of protection from the sun, rain, etc. The frame member of a shade provides support and can be located in different portions of the shade, depending on the desired flexibility of the shade.

Figure 29:
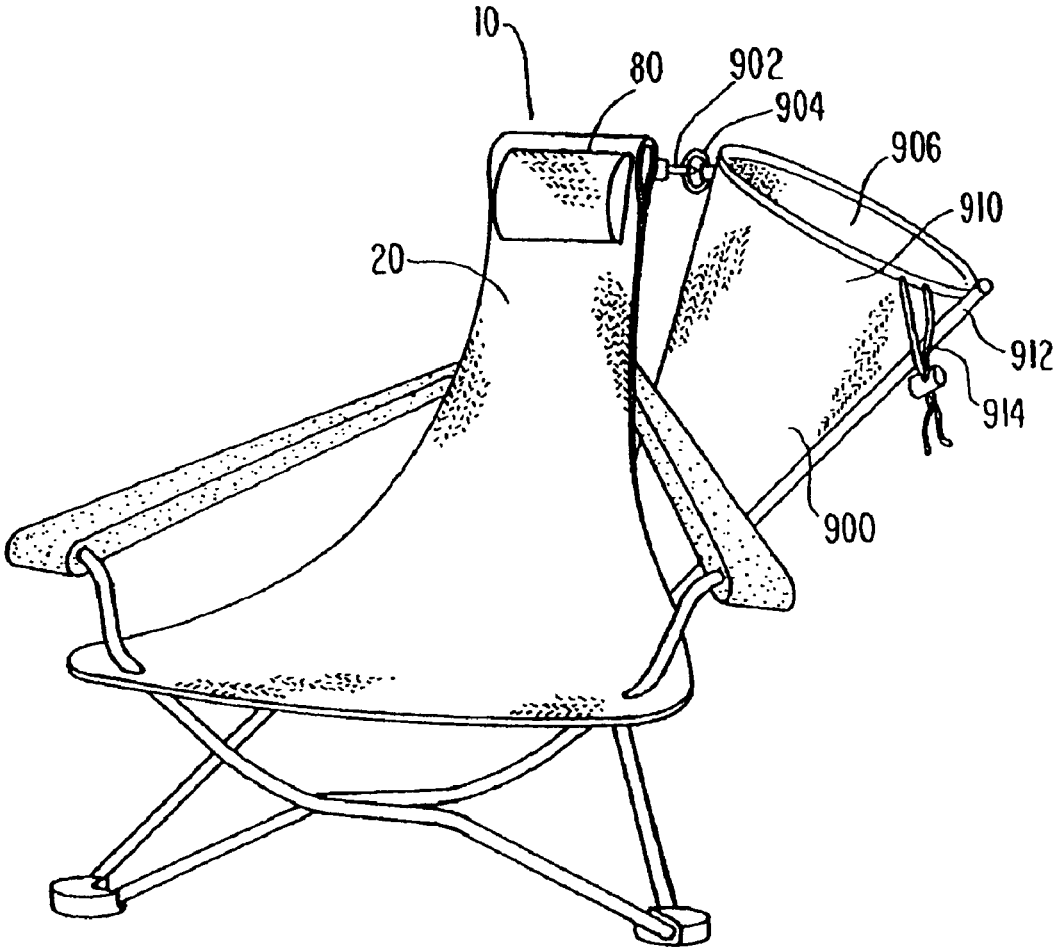
FIG. 29 illustrates an alternative embodiment of a support according to the present invention.

The support 10 can also include a storage bag 900 as illustrated in FIG. 29. The bag 900 includes a wall 910 that defines an opening 906 into which articles can be inserted. The opening 906 can be adjusted using a drawstring 914. The bag 900 includes a rod 912 along a portion of the wall 910. When the support 10 is in its expanded configuration the weight of the rod 912 causes the bag 900 to lean to one side of the support 10 to bias the bag 900 into an open position.

The support 10 is releasably coupled to the frame 100. In the illustrated embodiment, the support includes mounting element 904 that can be coupled to coupler 902 on the frame 100.

Alternatively, the support 10 can include a storage device 1000 as illustrated in FIGS. 30-33. The storage device 1000 includes mounting elements 1010, 1012, 1014, 1016, a mesh compartment 1030, a cooler compartment 1034, and pockets 1040, 1042, 1044. The support 10 includes couplers 1020, 1022, 1024, 1026 that can interact with the mounting elements 1010, 1012, 1014, 1016 to releasably couple the storage device 1000 to the support 10. For example, the storage device 1000 can be supported on the frame 100 when it is connected to primary mounting elements 1010, 1012, and one or both of the secondary mounting elements 1014, 1016.

Figure 30:
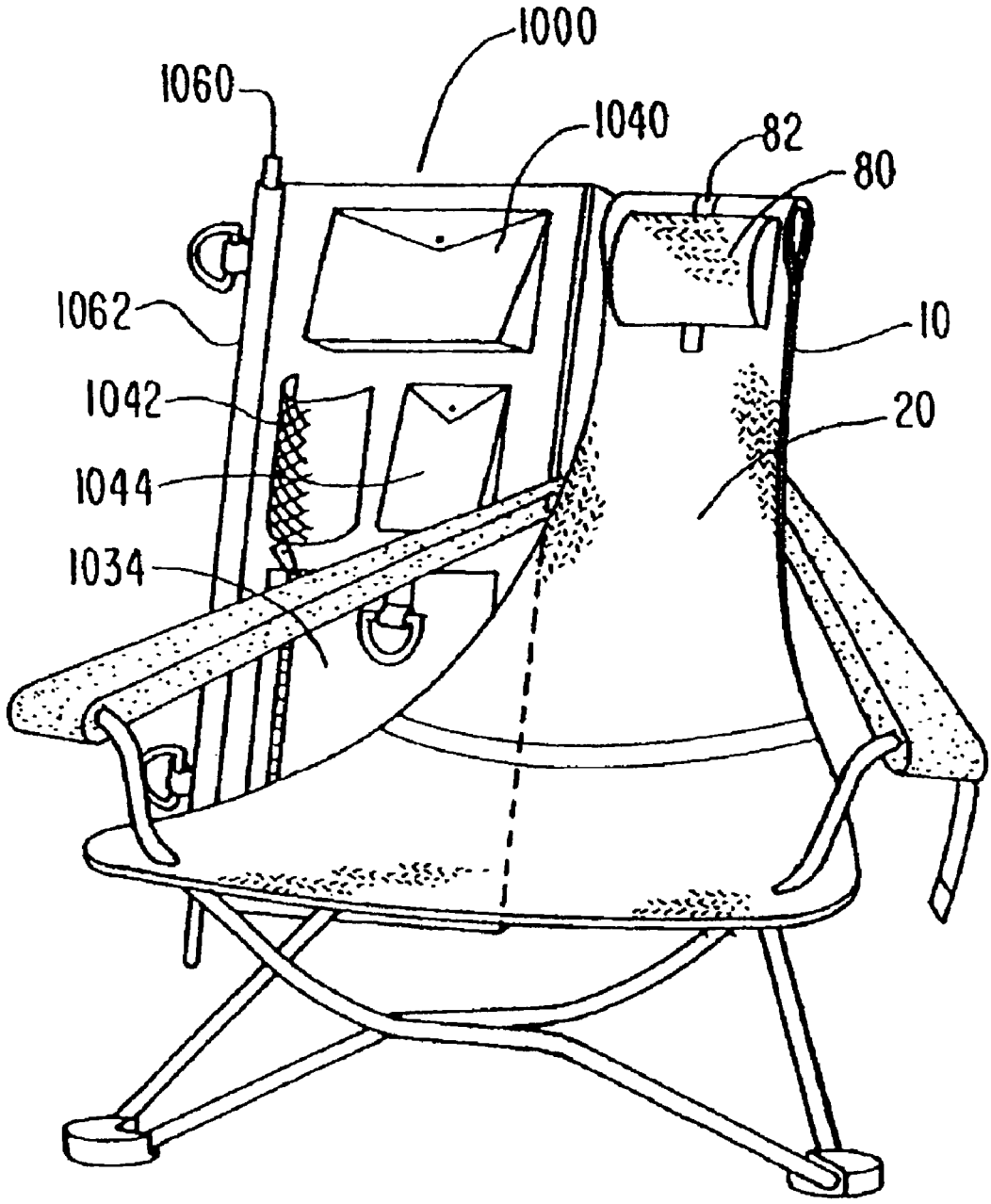
FIGS. 30-32 illustrate a combination of a support and a storage device according to the present invention.

As illustrated in FIG. 30, when the support 10 is in its expanded configuration, the storage device 1000 can be positioned on one side of the support 10 to allow for easy access to the cooler compartment 1034 and the pockets 1040, 1042, 1044.

Figure 31:
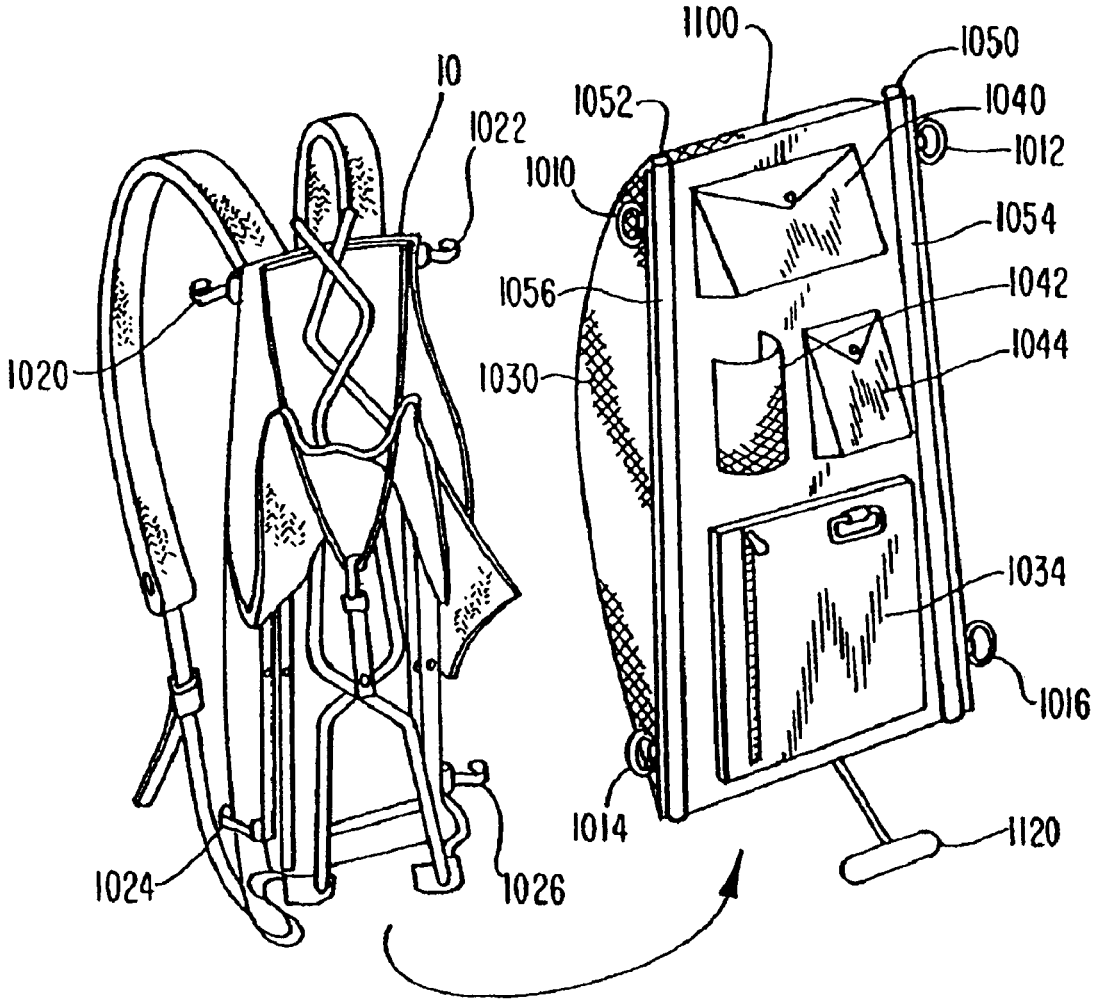
Figure 32:
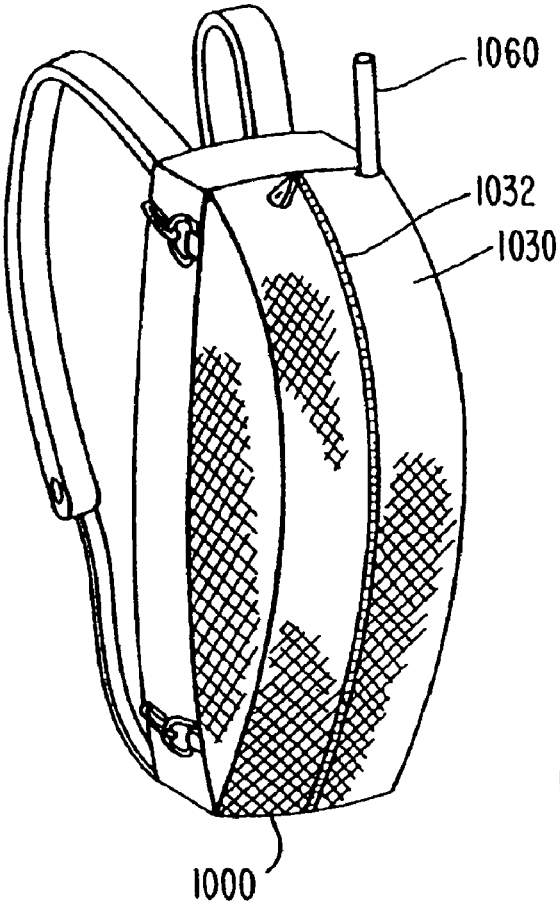
Figure 33:
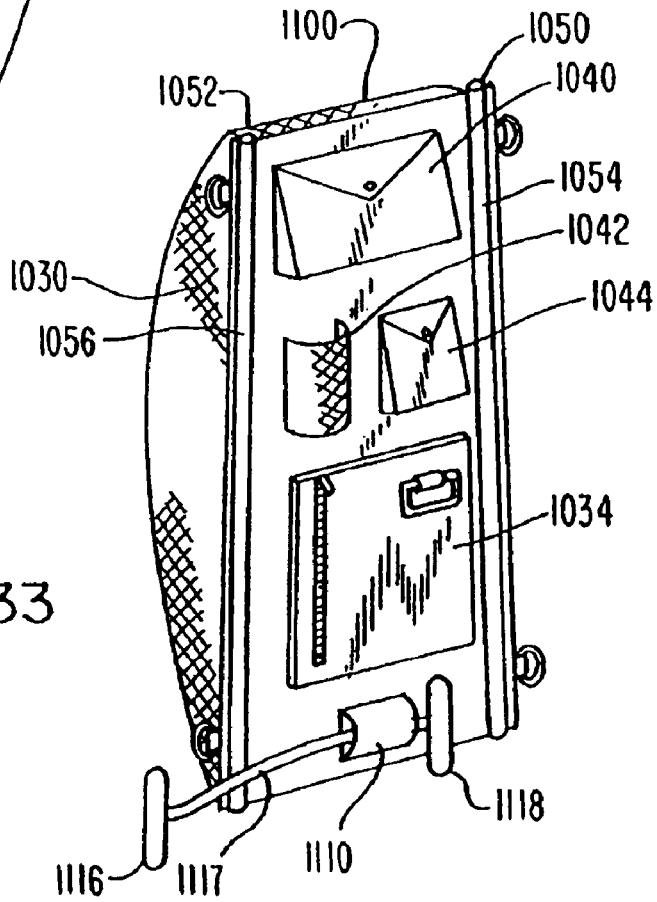
FIG. 33 illustrates an alternative embodiment of a storage device according to the present invention.

As illustrated in FIGS. 31-32, when the support 10 is in its collapsed configuration, the storage device 1000 can be coupled to the support 10 opposite the tension members 40, 70. The connection of the storage device 1000 and the support 10 allows for easy transportation of the storage device 1000 with the support 10.

In one embodiment of the storage device 1000, as illustrated in FIGS. 30 and 32, the storage device 1000 includes a stake 1060 and a sleeve 1062. The stake 1060 is stored in the sleeve 1062 when the support 10 is in its collapsed configuration.

The stake 1060 can extend through the sleeve 1062 when the support 10 is in its expanded configuration. When the stake 1060 extends from the sleeve 1062, the stake 1060 engages a support surface to provide support for the storage compartment 1000.

As illustrated in FIG. 31, storage device 1100 includes frame members 1050, 1052 and an anchor 1120. The frame members 1050, 1052 are mounted in sleeves 1054, 1056 and provide rigidity to the storage device 1110. The anchor 1120 can be used to support the storage device 1100 when the support 10 is in its expanded configuration.

The anchor 1120 can be releasably coupled to the frame members as illustrated in FIG. 31, or can be coupled at any point along the bottom or side of the storage device 1100.

In one embodiment, two anchors 1116, 1118 can be coupled to a single strap 1117 that is slidably threaded through loop 1110. In one embodiment, the storage device can include two or more loops through which the strap is threaded. Depending on the orientation of the storage device 1100, anchor 1116 or anchor 1118 can be pulled out to one side to be engaged with a supporting surface and to secure the storage device 1100. Strap 1117 can be any flexible, elongated member that can be positioned along the storage device 1110.

Many possible variations on the particular embodiments described above would be consistent with the principles of the invention. Several additional variations are described below.

Figure 34:
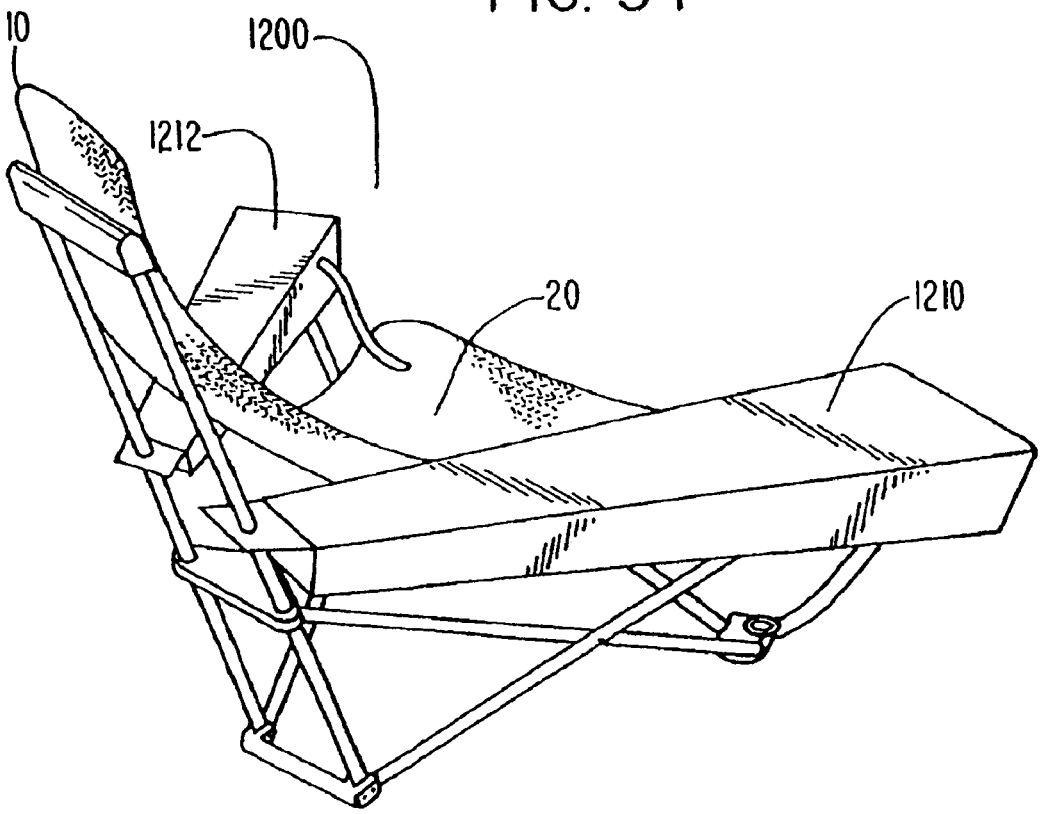
FIG. 34 illustrates an alternative embodiment of a support according to the present invention.

In one embodiment, the support 1200 can include floatation devices. As illustrated in FIG. 34, support 1200 includes floatation devices 1210, 1212 coupled to the tension members 40, 70. Additional floatation devices can be coupled to the support 10 at different locations to increase the buoyancy of the support 1200. For example, a floatation device can be positioned beneath part of the seat portion.

In the illustrated embodiment, floatation devices are inflatable members that are coupled to the tension members. The floatation devices can be any device that can float (i.e., has a density less than that of water).

Figure 35:
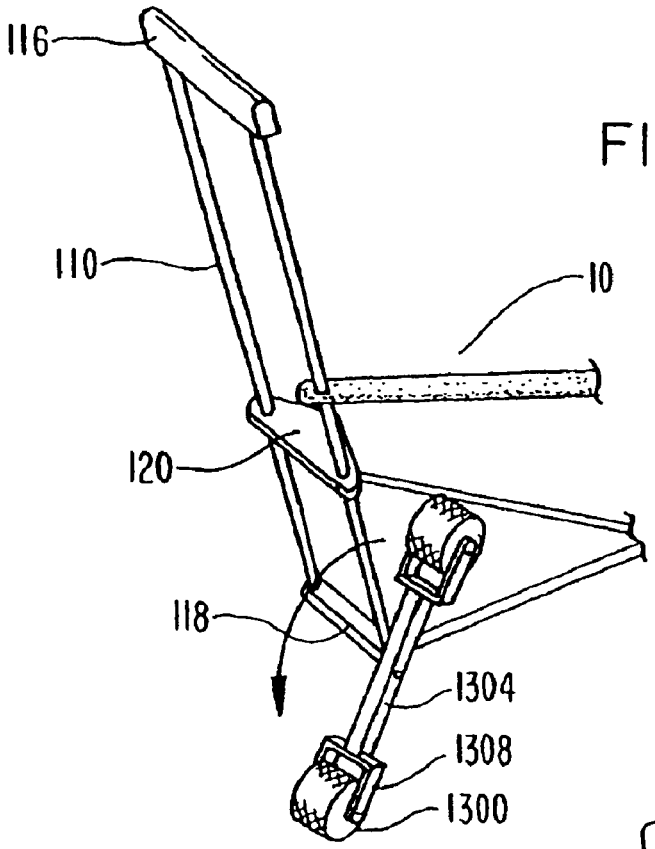
FIGS. 35-36 illustrate alternative embodiments of a support according to the present invention.

In one embodiment, the support 10 can also include wheels coupled to support members that are pivotally coupled to the frame. As illustrated in FIG. 35, a wheel 1300 is rotatably mounted to a wheel support member 1310 that is coupled to the frame. The wheel support member 1310 can be moved between an upper position and a lower position as represented by the arrow in FIG. 35. Thus, when the support 10 is in its expanded configuration the wheel 1300 can be pivoted into and out of contact with the support surface. A user can lift up the front frame portion of the support so that only the wheels contact the support surface. Accordingly, the user can easily pull the support to a different location.

Figure 36:
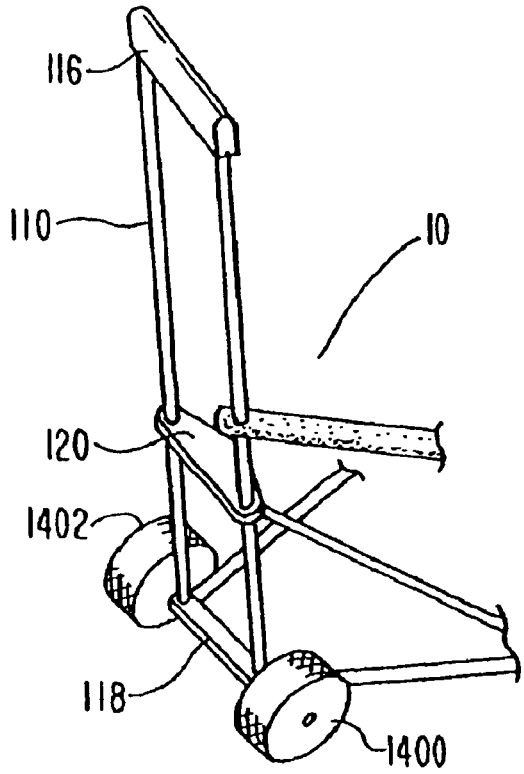

In another embodiment, the support 10 can include wheels 1400, 1402 as illustrated in FIG. 36. In this embodiment, the wheels 1400, 1402 are rotatably mounted to an axle positioned proximate to the lower coupler 118. A locking mechanism (not shown) can be provided to lock the wheels 1400, 1402.

Figure 37:
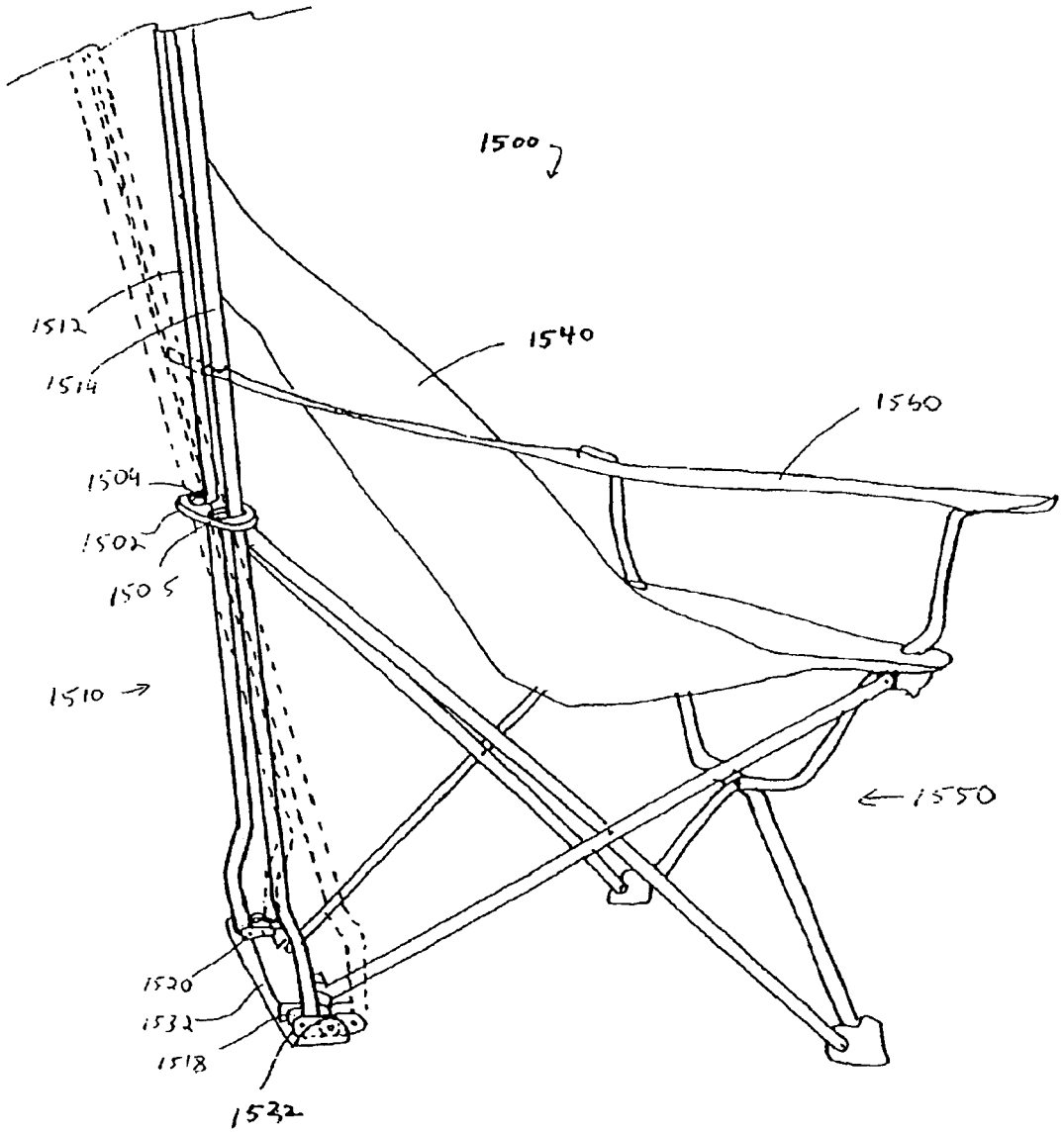
FIG. 37 illustrates a side view of a support according to an alternative embodiment of the invention.
Figure 38:
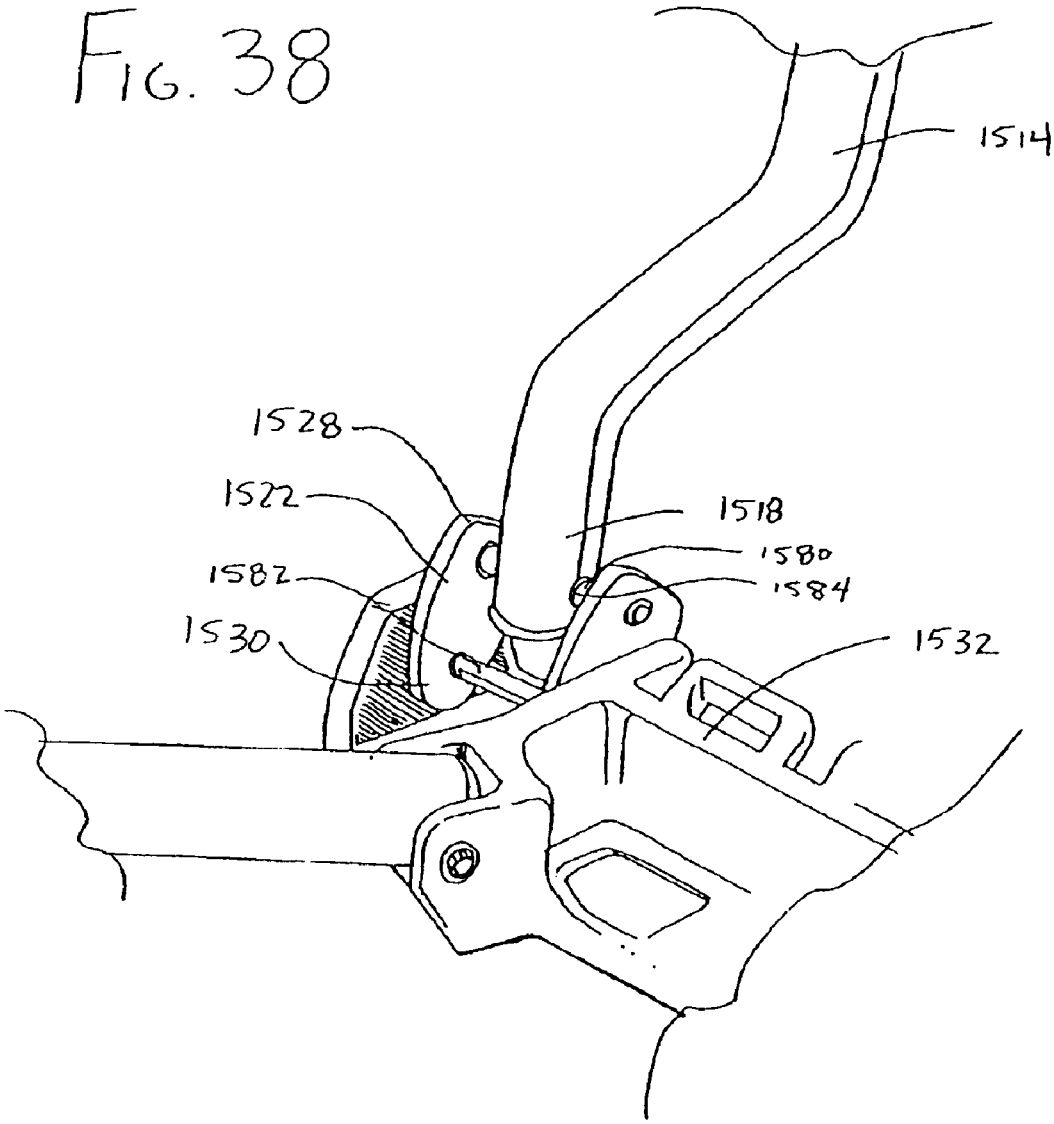
FIG. 38 illustrates a perspective view of a rear portion of the support of FIG. 37.
Figure 39:
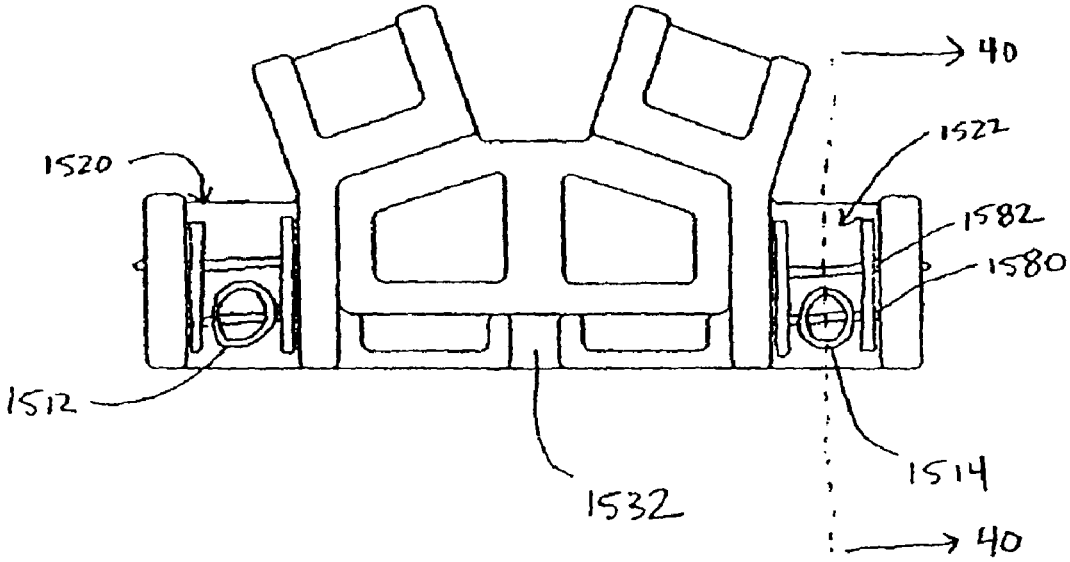
FIG. 39 illustrates a top view of a rear portion of the support of FIG. 37.
Figure 40A:
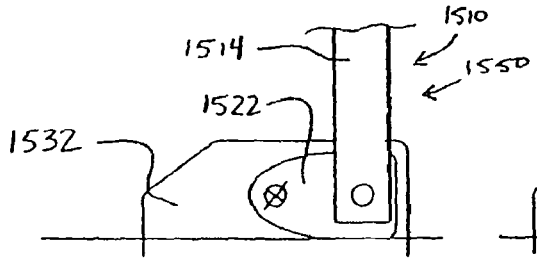
FIGS. 40a-40d illustrate cross-sectional views of a rear portion of the support of FIG. 37.
Figure 40B:
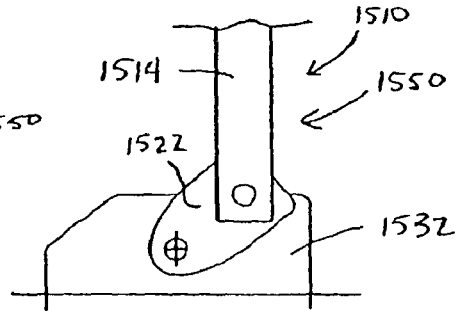
Figure 40C:
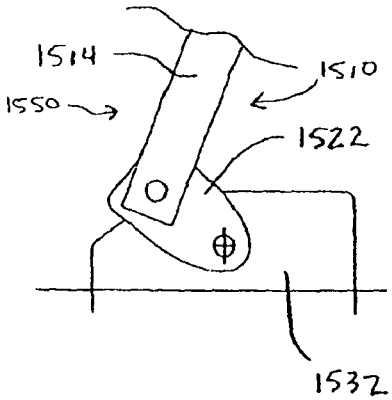
Figure 40D:
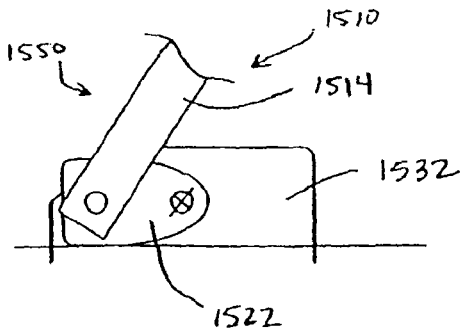

Another embodiment of the invention is illustrated in FIGS. 37-40. In this embodiment, a support 1500 has a frame 1550, a seat 1540, and tension members 1560 (although two are present only one is shown in FIG. 37). Similar to the above-described embodiments, the frame 1550 can be placed in an expanded configuration and in a collapsed configuration. The frame 1550, while in an expanded configuration, can be placed in an upright position and in a reclined position. The frame 1550 has a rear frame portion 1510 that includes a pair of support members 1512 and 1514, a pair of extension members 1520 and 1522, a coupler 1532 and guide plate 1502.

In the illustrated embodiment, the support members are hollow metal tubes, but as described above for support members 112 and 114, the support members 1512 and 1514 can be made of different materials and have different cross-sectional shapes.

The extension members 1520 and 1522 are similar in structure and function, thus only extension member 1522 will be discussed in detail. The extension member 1522 is elongated in shape. Extension member 1522 has a first end 1528 and a second end 1530. The first end 1528 of the extension member 1522 is pivotally coupled to the lower end 1518 of the support member 1514. The second end 1530 of the extension member 1522 is pivotally coupled to the coupler 1532.

In the illustrated embodiment, the extension member 1522 is pivotally coupled to support member 1514 and to the coupler 1532 via rods 1580 and 1582, respectively, that extend through the coupled components. For example, rod 1580 extends from one side of the extension member 1522, through the support member 1514 (via through holes 1584), and through another side of the extension member. In an alternative embodiment, the extension member is pivotally coupled to the support member and to the coupler via rivets, brads, or another connection device known in the art that would provide a pivotal connection between the coupled components.

As best illustrated in FIGS. 40a-40d, the rear frame portion 1510 can be pivoted with respect to the coupler 1532 to convert the frame 1550 from an upright position to a reclined position. Support member 1512 and elongate member 1520 function in a similar manner as support member 1514 and elongate member 1522, thus only the movements of support member 1514 and elongate member 1522 are illustrated and discussed in detail. To recline the frame 1550, the support member 1514 can be lifted from its initial upright position on the coupler 1532. Then the extension member 1522 can be pivoted with respect to the coupler 1532, and the support member 1514 can be pivoted with respect to the extension member 1520. These steps can then be repeated for support member 1512 and extension member 1520 to place the frame 1550 in a reclined position. The steps of this process can be reversed to convert the frame 1550 from a reclined position to an upright position.

Note that as support 1500 is moved between the upright position and the reclined position, the support members 1512 and 1514 slide through holes 1504 and 1505 of guide plate 1502. The diameters of the holes 1504 and 1505 are greater than the diameters of support members 1512 and 1514, respectively. Consequently, as the support 1500 is moved between the upright position and the reclined position, the incline of support members 1512 and 1514 can change while still allowing the support members 1512 and 1514 to be capable of slidely moving within guide plate 1502. For example, support members 1512 and 1514 can slide within guide plate 1502 when moving support 1500 into a collapsed configuration.

Figure 41:
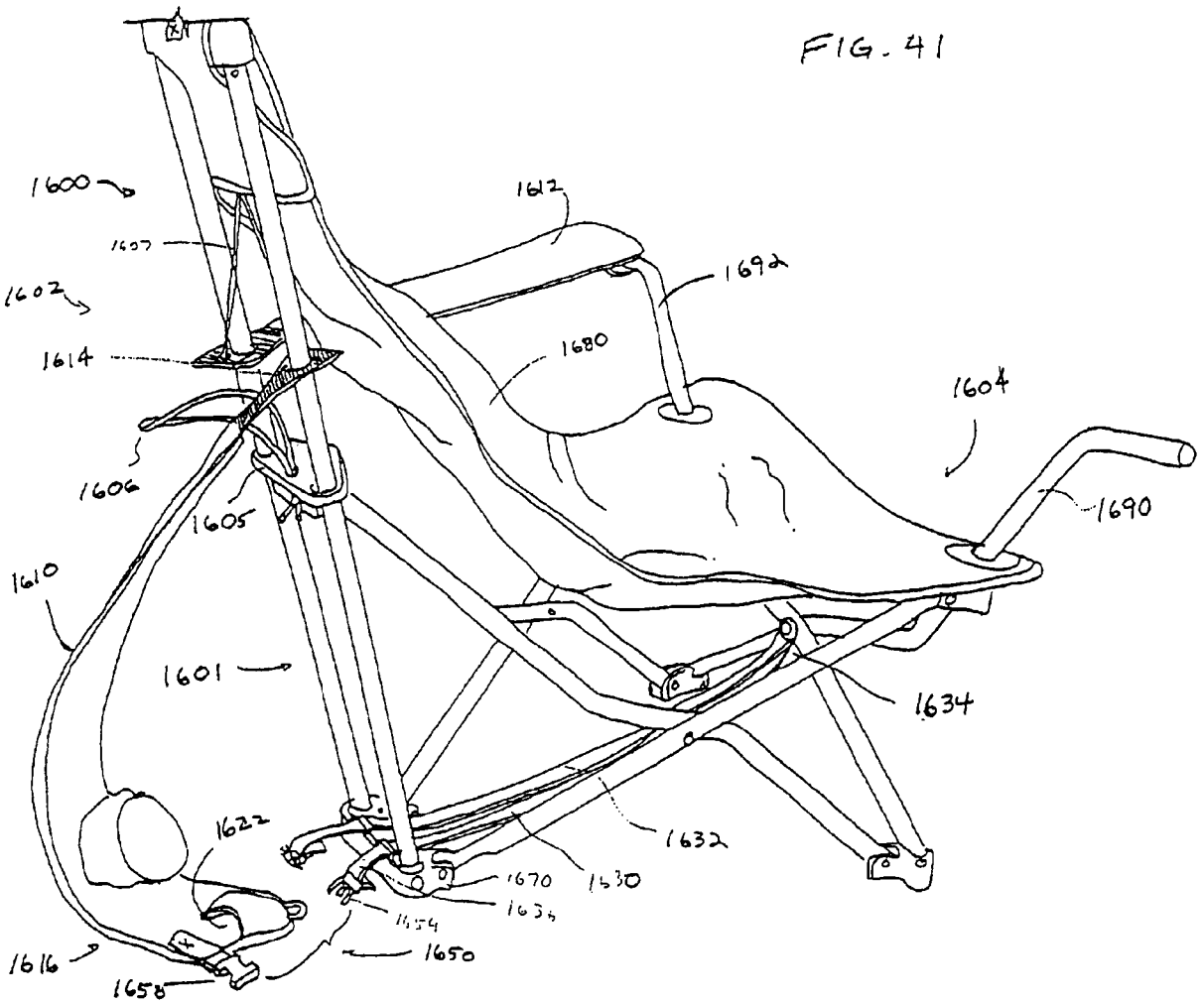
FIG. 41 illustrates a rear perspective view of a support according to an alternative embodiment of the invention.
Figure 42:
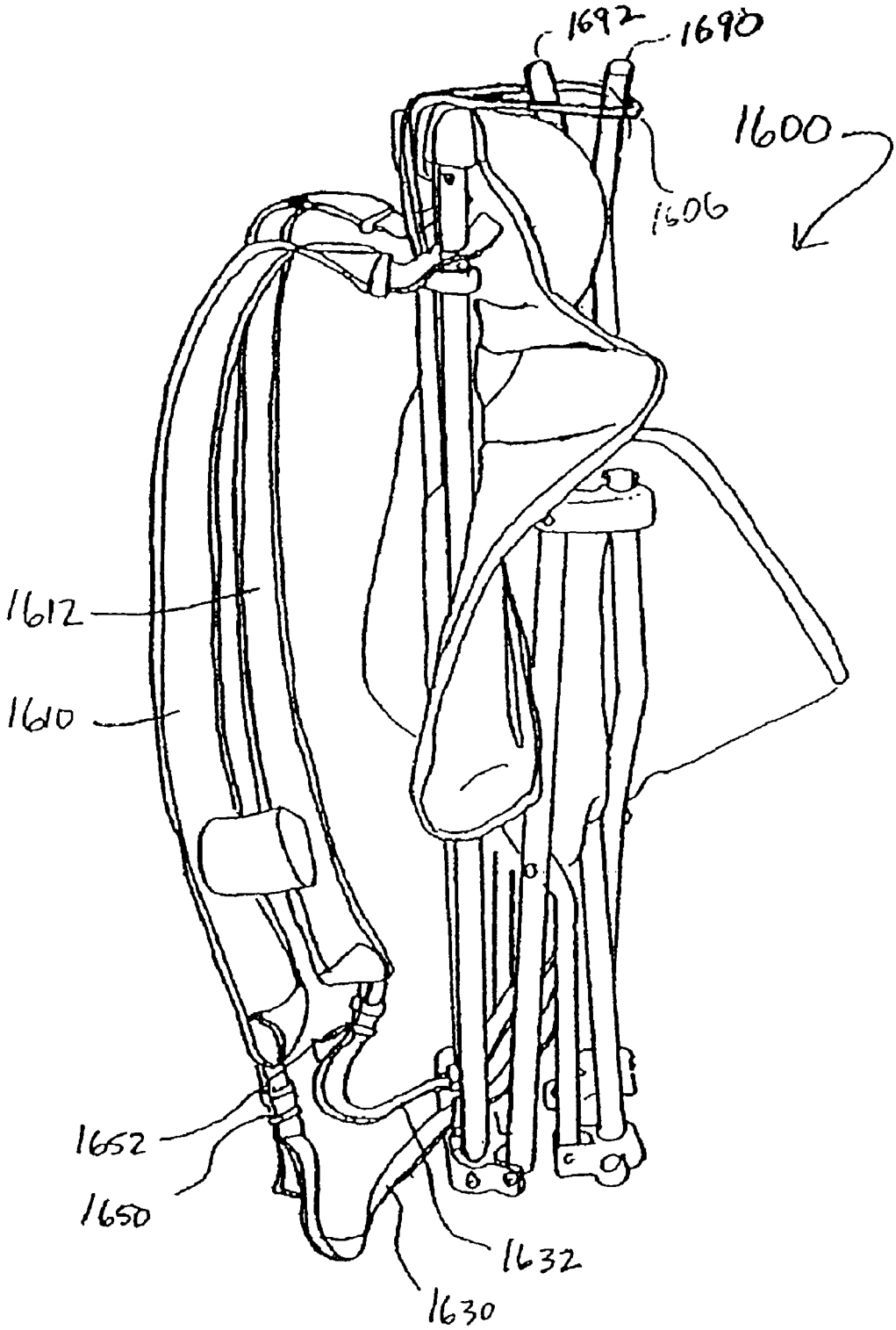
FIG. 42 illustrates a side view of the support of FIG. 41 in a collapsed configuration.

Another embodiment of the invention is illustrated in FIGS. 41-42. In this embodiment, a support 1600 has a frame 1601, a coupler 1670, a seat 1680, tension members 1610 and 1612, elongate members 1630 and 1632, guide plate 1605 and guide-plate member 1606. Frame 1601 also includes members 1690 and 1692. Similar to the above-described embodiments, the frame 1601 can be placed in an expanded configuration and in a collapsed configuration. Also similar to the above-described embodiments, each of the tension members 1610 and 1612 can be placed in two positions. The tension members 1610 and 1612 can be placed in a first position when the frame 1601 is in its expanded configuration to provide supports for the arms of a user. In addition, the tension members 1610 and 1612 can be placed in a second position when the frame is in its collapsed configuration to serve as shoulder straps while support 1600 is being transported on the user's back.

Tension members 1610 and 1612 are functionally and structurally similar. Thus, although only tension member 1610 is discussed in detail, the same features are present for tension member 1612. Tension member 1610 has a first end 1614 that is coupled to a rear frame portion 1602 of the frame 1601 and a second end 1616. The vertical position of first end 1614 of tension member 1610 can be maintained by support 1607. In other words, the extent to which the first end 1614 of tension member 1610 slides down its respective the support member is defined by the support 1607. Tension member 1610 also has a sleeve 1622 that is located near the second end 1616 of the tension member. The sleeve 1622 is configured to selectively couple the second end 1616 of the tension member 1610 to a front frame portion 1604 of the frame 1601 when the frame is its expanded configuration. In this position, tension member 1612 provides support for an arm of a user. In an alternative embodiment, the tension member does not include a sleeve, but rather includes another coupling device, such as a strap or a clip, that can be used to selectively couple the second end of the tension member to the front frame portion.

Elongate members 1630 and 1632 can be structurally similar. Thus, although only elongate member 1630 is discussed in detail, the same features are present for elongate member 1632. Elongate member 1630 has a first end 1634 and a second end 1636. The first end 1634 of the elongate member 1630 is coupled to the front frame portion 1604. The second end 1636 of the elongate member 1630 is configured to be selectively coupled to the second end 1616 of the tension member 1610. Thus, when the frame 1601 is in its collapsed configuration, the second end 1636 of the elongate member 1630 can be coupled to the second end 1616 of the tension member 1610 to form a strap that can be placed over a shoulder of a user to retain the support 1600 on the user.

Because the first end 1634 of elongate member 1630 is coupled the front frame portion 1604, the second end 1636 of elongate member 1630 is drawn inwardly when the support 1600 is moved from the collapsed configuration to the expanded configuration. This allows the connector 1654 also to be drawn inwardly so that it is disposed close to the support 1600 and out of the way of the user when in the expanded configuration. When the support 1600 is moved from an expanded configuration to a collapsed configuration, the elongate member 1630 can be drawn outwardly to provide a greater overall length to the strap formed by tension member 1610 coupled to elongate member 1630.

Note that although the elongate members 1630 and 1632 are shown as straps, elongate members can be cables, cords or any appropriate type of material that can be slidably coupled to coupler 1670 and can be used to form a shoulder strap. In an alternative embodiment, the elongate members are not coupled to the front frame portion, but rather are fixedly coupled to the rear frame portion; the particular length of the elongate members can be selected so that distance from the rear frame portion is minimized while optimizing the shoulder strap length when the support is in a collapsed configuration.

In the illustrated embodiment, a coupling mechanism 1650 is used to selectively couple the second end 1636 of the elongate member 1630 to the second end 1616 of the tension member 1610. The coupling mechanism has a female portion 1658 coupled to the second end 1616 of the tension member 1610 and a male portion 1654 coupled to the second end 1636 of the elongate member 1630. The female portion 1658 and the male portion 1654 can be coupled to the respective ends of the members via any known method, such as by sewing or gluing the portion to the member.

In an alternative embodiment, the coupling mechanism 1650 is a hook and loop device, a lock and key mechanism, a fastener, a clip, a button or another item by which the tension member 1610 can be removably coupled to the elongate member 1630.

A coupling mechanism 1652, which is similar to coupling mechanism 1650, is used to couple tension member 1612 to elongate member 1632.

In the illustrated embodiment, the elongate members 1630 and 1632 are slidably coupled to the coupler 1670, however the elongate members need not be slidably coupled to the coupler or to any other portion of the support 1600. In an alternative embodiment, the elongate members are slidably coupled to the frame of the support.

FIG. 42 shows the support in a collapsed configuration. As shown in FIG. 42, the guide-plate member 1606 can be pulled over the end of the frame member 1690 and 1692 to maintain the support in the collapsed configuration and prevent it from unfolding.

Figure 43:
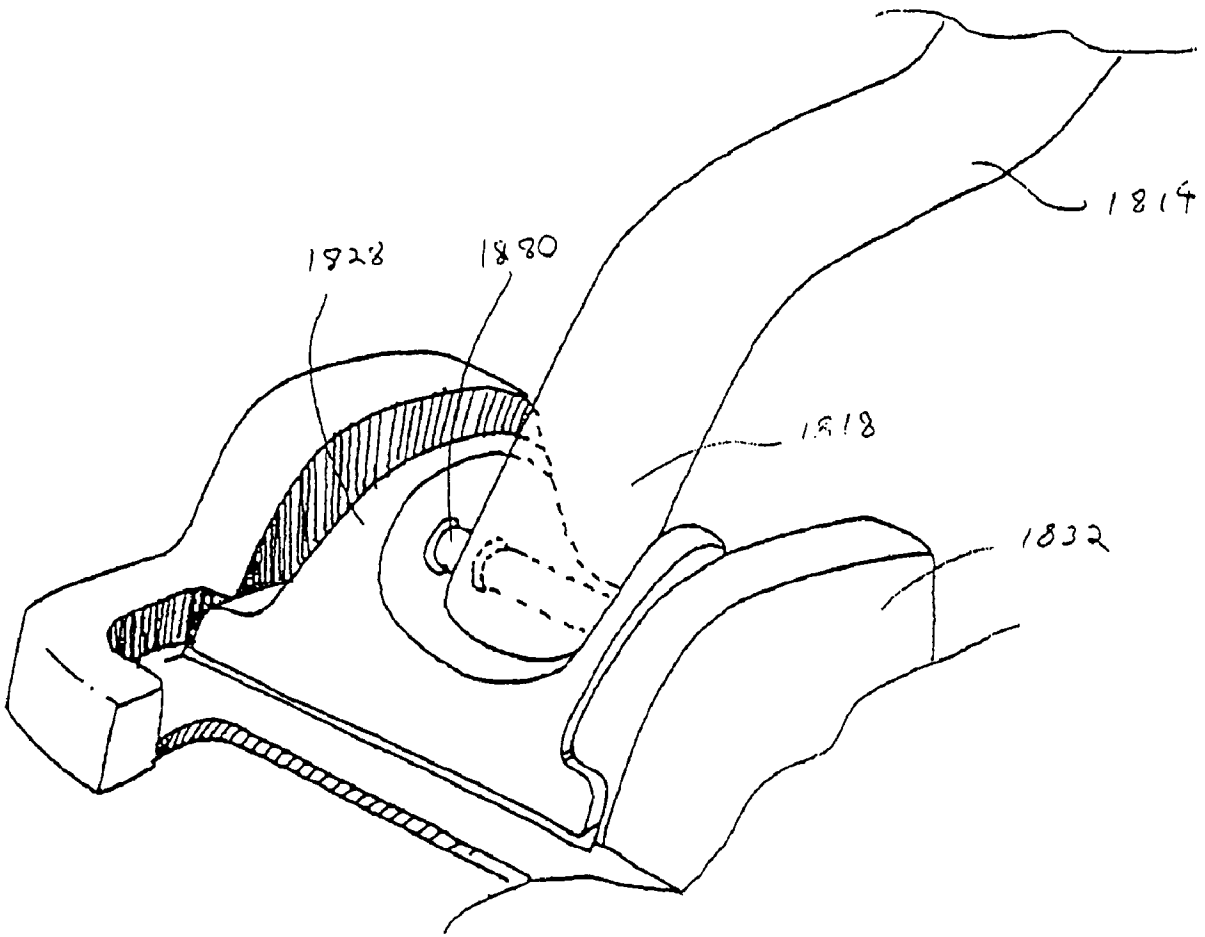
FIG. 43 shows a perspective view of a rear portion of a support in an upright position, according to an embodiment of the invention.
Figures 44, 45A, 45B:
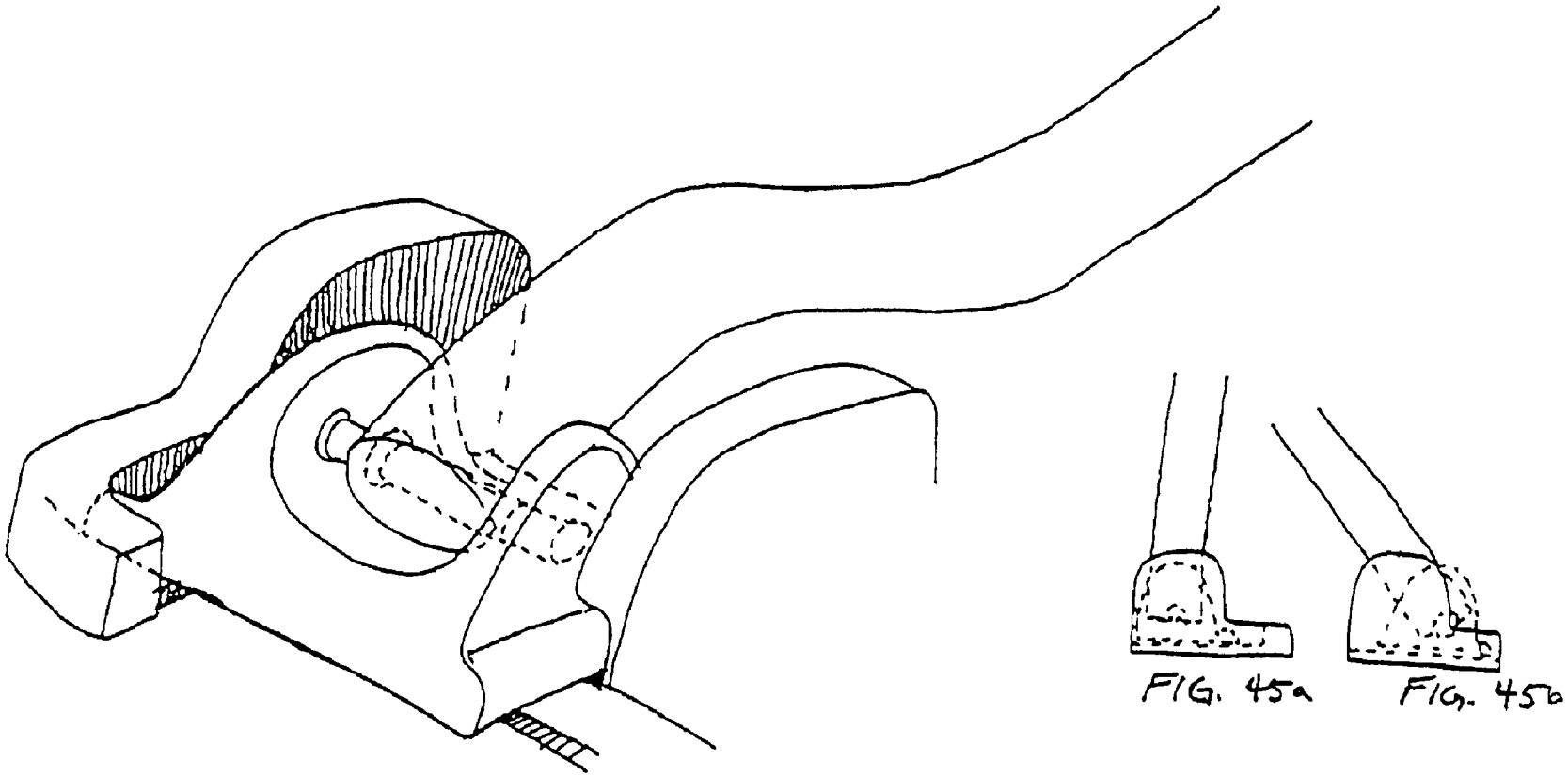
FIG. 44 shows a perspective view of the rear portion of the support shown in FIG. 43 in a reclined position.
FIGS. 45a and 45b show a side view of the rear portion of the support shown in FIG. 43 while in an upright position and collapsible position.

An alternative embodiment of the support is shown FIGS. 43-45. In the shown embodiment, the support member 1814 is pivotably coupled to collar 1828 by rod 1880. Collar 1828 is slidably attached to coupler 1832. The support is in an upright position when the collar 1828 is positioned as shown in FIGS. 43 and 45a. The support is in a reclined position when the collar 1828 is positioned as shown in FIGS. 44 and 45b. As the support moves between the upright position and the reclined position, member 1814 has a range of motion pivoting around rod 1880.

Figure 46:
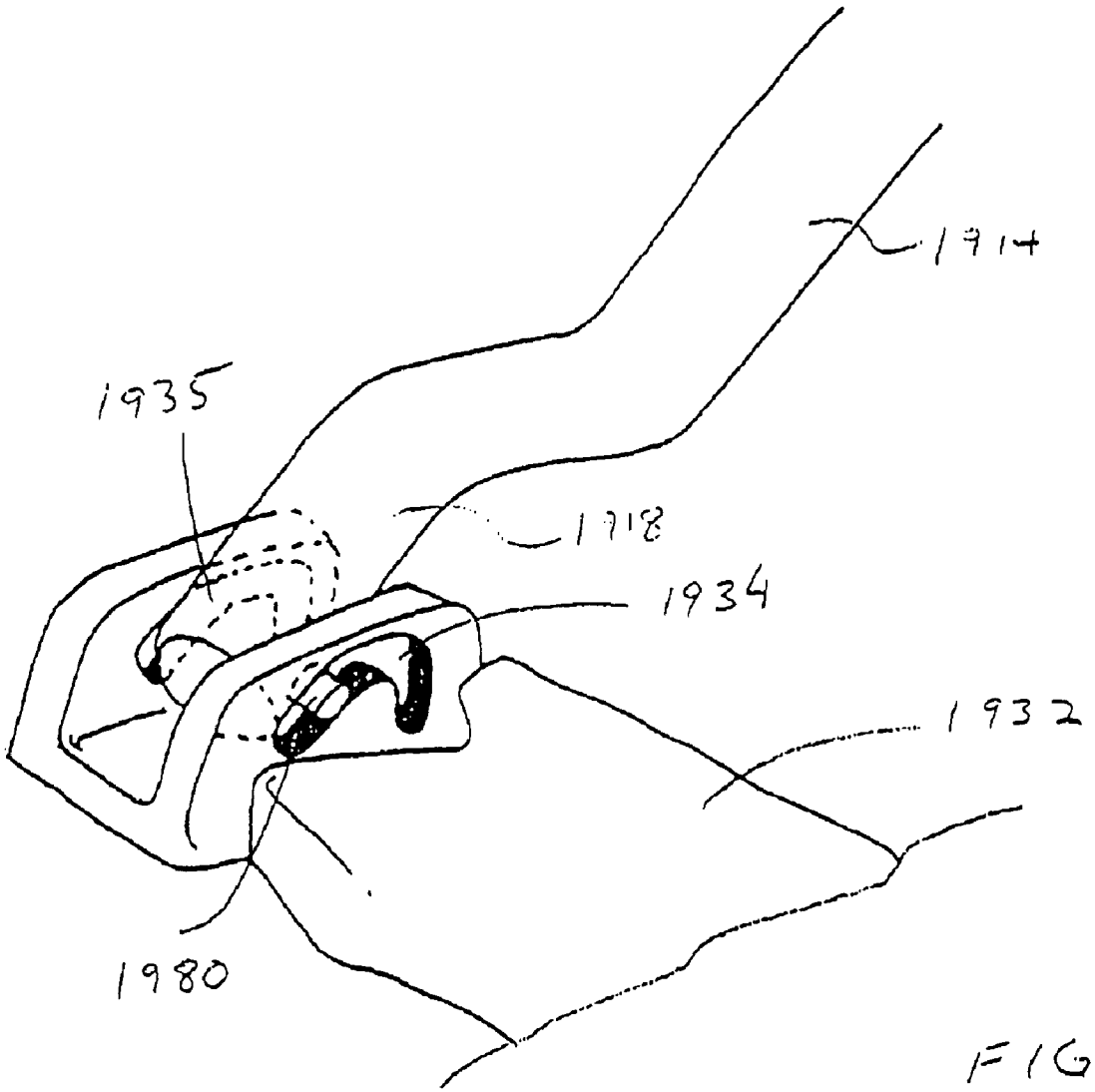
FIG. 46 shows a perspective view of a rear portion of a support in an upright position, according to another embodiment of the invention.
Figure 47:
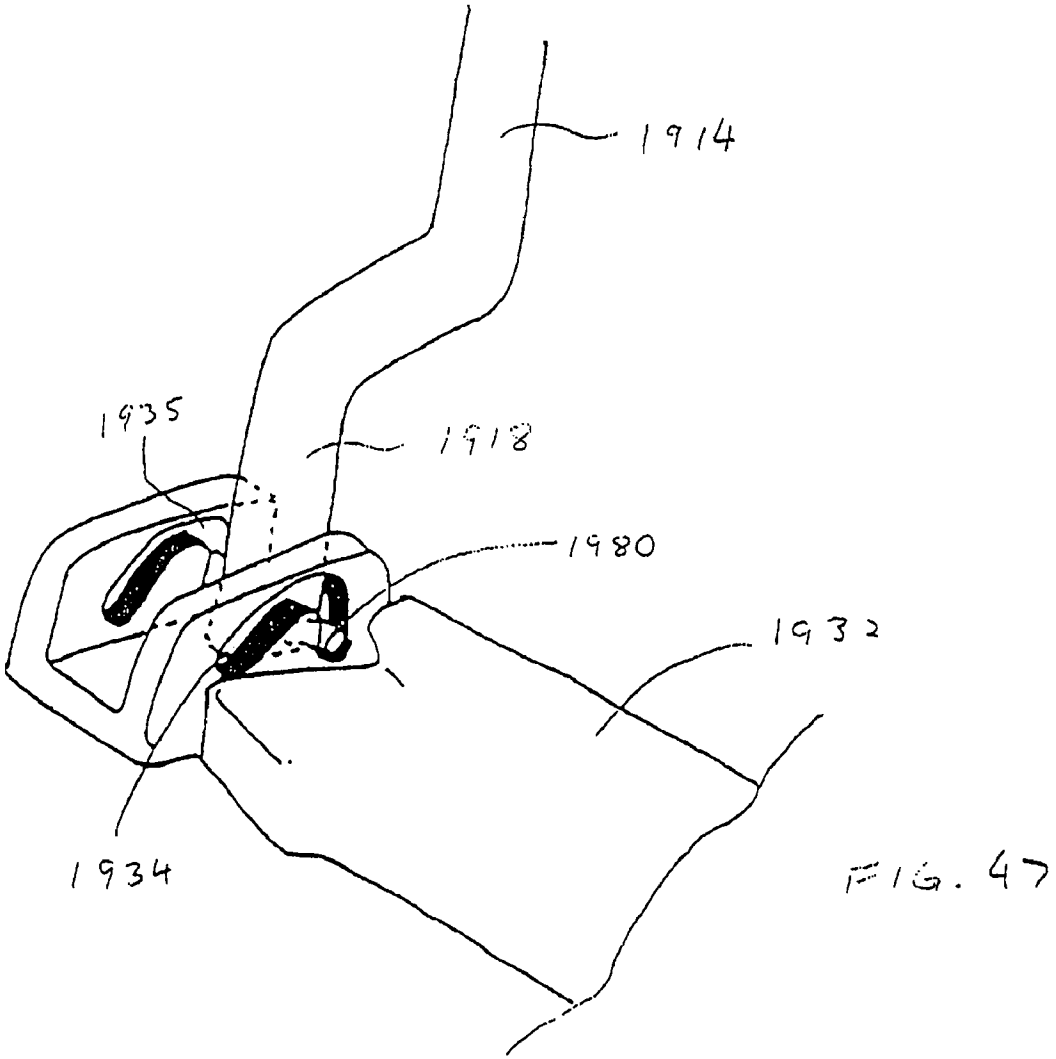
FIG. 47 shows a perspective view of the rear portion of the support shown in FIG. 46 in a reclined position.

Yet other alternative embodiment of the support is shown FIGS. 46-47. In the shown embodiment, the support member 1914 includes rod 1980. Coupler 1932 includes grooves 1934 and 1935. Rod 1980 is slidably coupled to coupler 1932 and has a range of motion within grooves 1934 and 1935. The support is in an upright position when the rod 1980 is in the rear position within grooves 1934 and 1935, as shown in FIG. 47. The support is in a reclined position when the rod 1980 is in the front position within grooves 1934 and 1935. FIG. 46 shows the rod 1980 in an intermediate position near the front position.

Another embodiment of the invention is illustrated in FIGS. 48-52. In this embodiment, a support 1700 has a frame 1702, a seat 1704, tension members 1706 and 1708, and a shade 1710. The shade 1710 includes a first end 1711, a second end 1713, a membrane portion 1712, a frame portion 1714, and a resilient or shape-retention portion 1716. The frame portion 1714 is a flexible band that provides support to the membrane portion 1712 to keep the membrane portion relatively taut within the interior area defined by the frame portion. In the illustrated embodiment, the frame portion 1714 extends around the entire perimeter of the membrane portion 1712. In an alternative embodiment, the frame portion extends around only a portion of the perimeter of the membrane portion.

Figure 48:
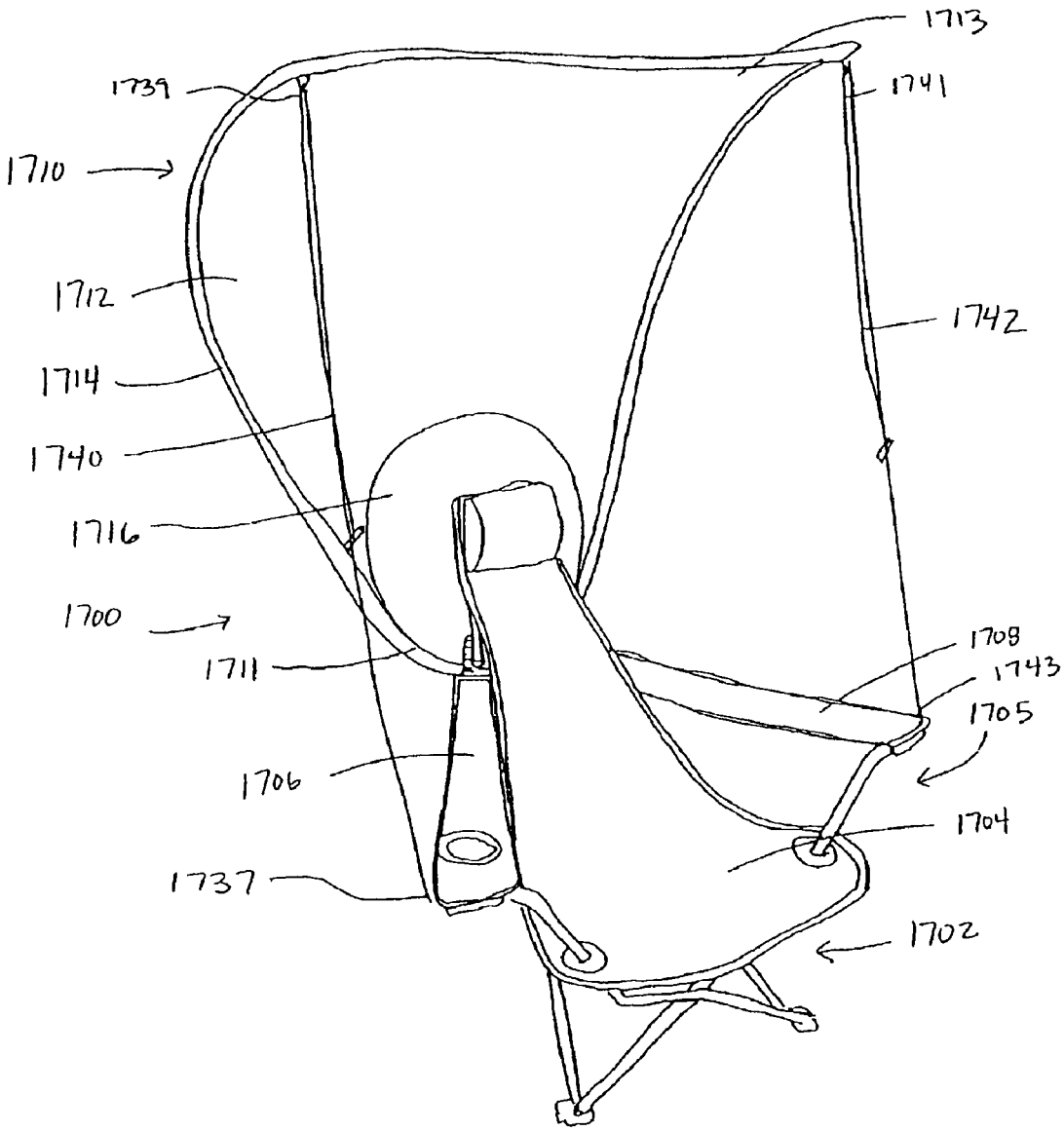
FIG. 48 illustrates a front perspective view of a combination of a support and a shade according to an alternative embodiment of the invention.
Figure 51:
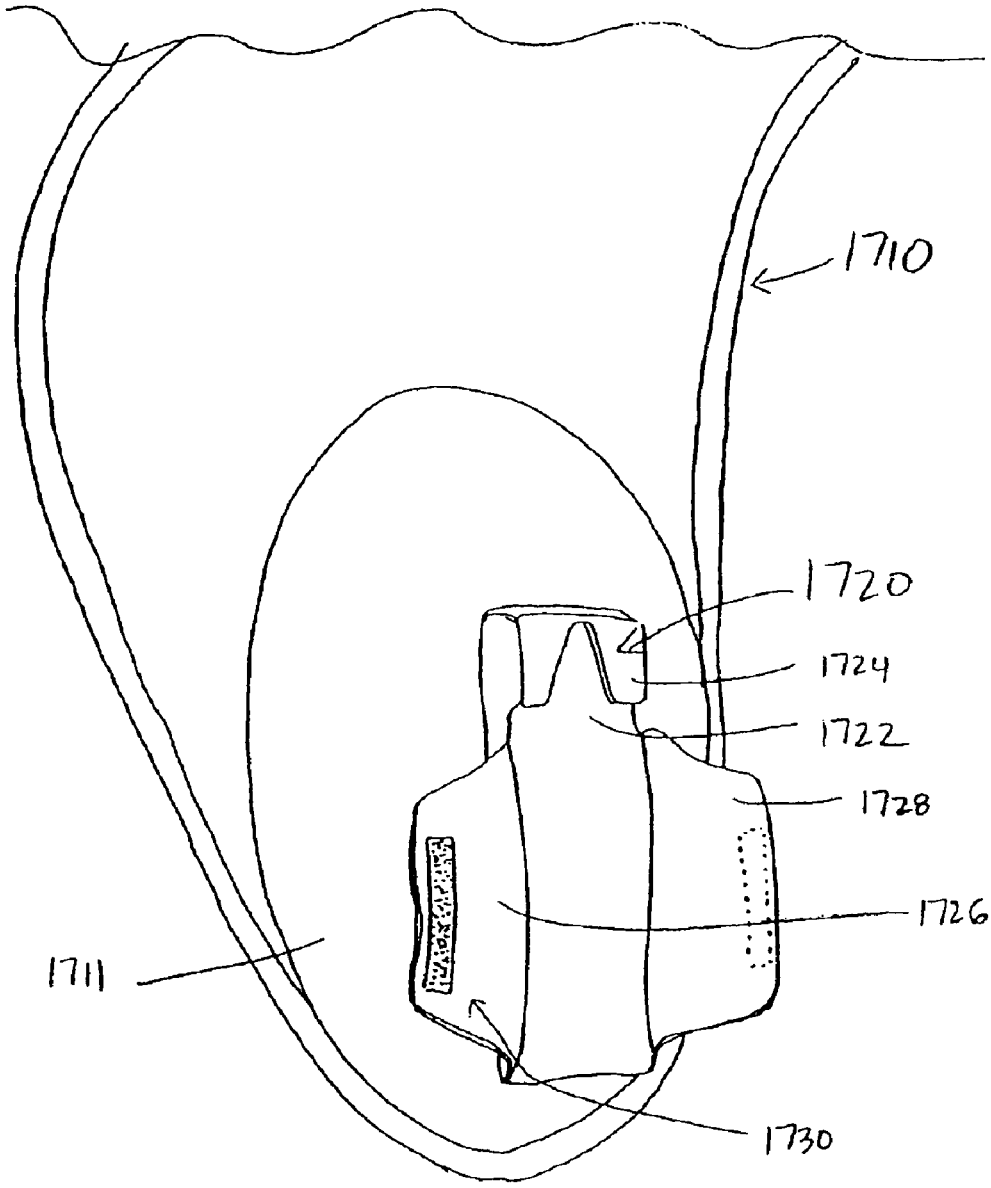
FIG. 51 illustrates a front perspective view of the shade of FIG. 48.
Figure 52:
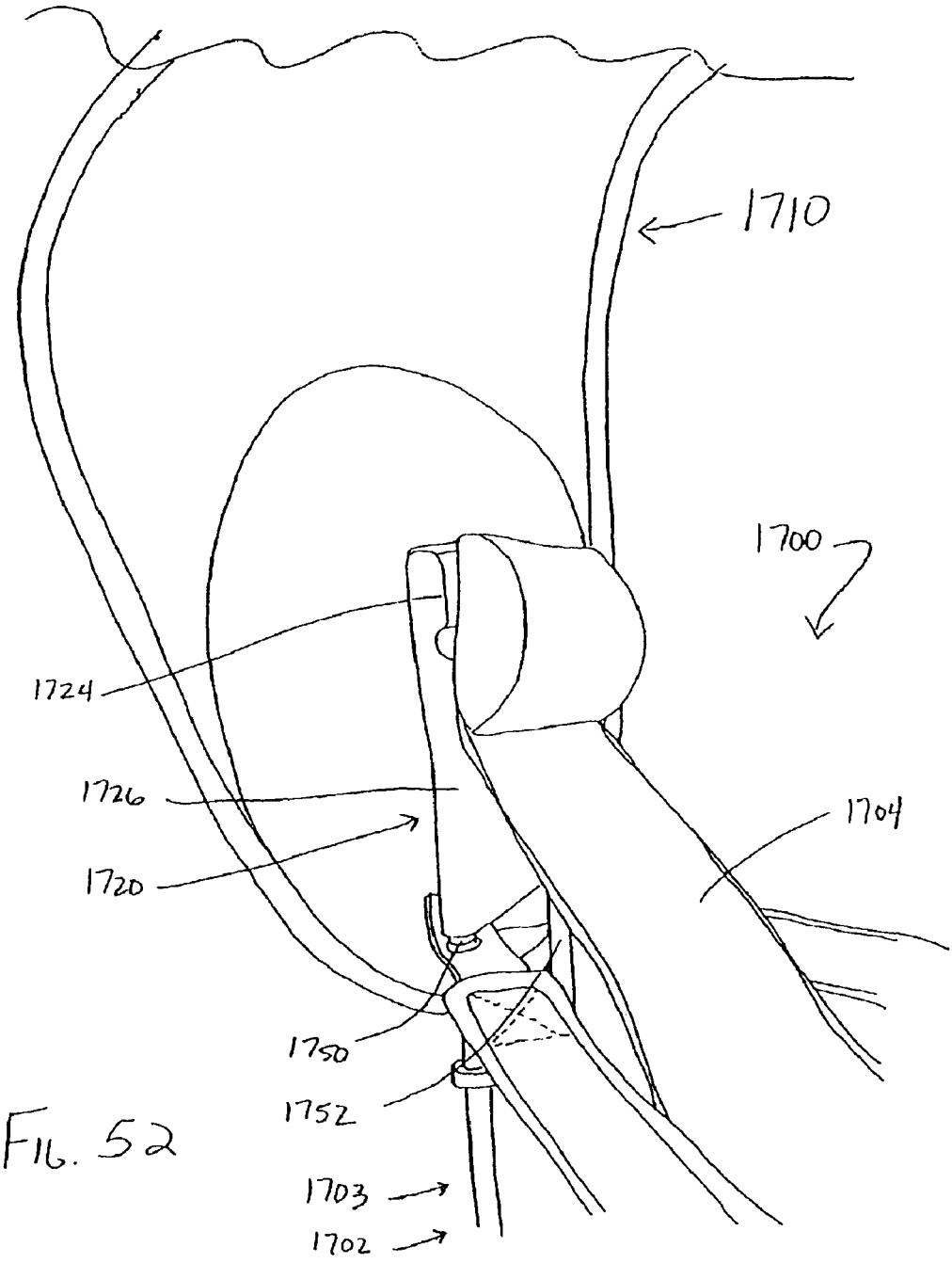
FIG. 52 illustrates a front perspective view of the combination of FIG. 48.

The shade can be placed in an expanded configuration and in a collapsed configuration. Similar to the shade disclosed in U.S. patent application Ser. No. 09/764,059, entitled "Collapsible Sunshade and Methods of Using the Same," filed on Jan. 19, 2001, when the shade 1710 is in its collapsed configuration, the frame portion 1714 forms a plurality of concentric, substantially circular rings. As shown in FIGS. 48, 49, and 50, the shade 1710 can be releasably coupled to the support 1700 when the shade is in its expanded configuration.

The shade 1710 includes a coupling sleeve 1720 (shown in FIG. 51) and a pair of tethering lines 1740 and 1742 to releasably couple the shade to the support 1700. The coupling sleeve 1720 is coupled to the first end 1711 of the shade 1710. Any known method can be used to couple the coupling sleeve 1720 to the shade 1710. In one embodiment, the coupling sleeve 1720 is sewn to the shade 1710.

The coupling pocket 1720 is configured to receive and couple to a portion of the frame 1702. The coupling pocket 1720 has an upper cap 1724 and a pair of retention flaps 1726 and 1728 that define a cavity 1722 into which a portion of the rear frame portion 1703 can be inserted. In the illustrated embodiment, support members 1750 and 1752 are inserted into the cavity 1722. The retention flaps 1726 and 1728 include a coupler 1730 that is configured to releasably couple one of the retention flaps to the other, thereby securing the coupling sleeve 1720 to the rear frame portion 1703. In the illustrated embodiment, the coupler 1730 is a hook and loop type coupler, where hook type material is coupled to one of the retention flaps and loop type material is coupled to the remaining retention flap.

In an alternative embodiment, the retention flaps are coupled together via another releasable coupling device, such as a snap, a button, or a hook. In another alternative embodiment, the retention flaps are coupled together via a more permanent method, such as adhesive, or stitching. In yet another alternative embodiment, the retention flaps are integrally formed by a single piece of material. In yet another embodiment, the upper cap can be a strap configured to define a top portion of the cavity in which the frame is retained. Alternatively, each retention flap can be one or more straps or cords that individually wrap around a respective support member of the frame to maintain the position of the shade relative to the frame.

The tethering lines 1740 and 1742 are configured to couple the shade 1710 to the front frame portion 1705 of the support 1700. First ends 1739 and 1741 of each of the tethering lines 1740 and 1742, respectively, are coupled to the second end 1713 of the shade 1710. Any known method can be used to couple the first ends 1739 and 1741 of the tethering lines 1740 and 1742 to the shade 1710. In one embodiment, the tethering lines 1740 and 1742 are sewn to the shade 1710. In another embodiment, the tethering lines 1740 and 1742 are removably coupled to the shade 1710.

In the illustrated embodiment, second ends 1737 and 1743 of the tethering lines 1740 and 1742, respectively, are releasably coupled to the support 1700. Any known method can be used to couple the tethering lines 1740 and 1742 to the support 1700. In one embodiment, the tethering lines 1740 and 1742 are tied to the support 1700. In another embodiment, the tethering lines 1740 and 1742 include couplers, such as clips or hooks, that releasably fasten the tethering lines to the support 1700. In an alternative embodiment, the tethering lines 1740 and 1742 extend to a support surface on which the support 1700 rests, and the second ends 1743 and 1737 include devices, such as anchors, that releasably couple the tethering lines to the support surface.

As illustrated in FIG. 49, the shade 1710 has a longitudinal line 1780 that extends between ends 1711 and 1713. The shade 1710 also has a lateral line 1782 that extends substantially perpendicularly to the longitudinal line 1780. When the shade 1710 is in an expanded configuration, the shade has a surface that is defined by the longitudinal and lateral lines 1780 and 1782. The shade 1710 can have a shape defined so that the shade 1710 is maintained off the user's head while the user is sitting in the support.

In the illustrated embodiment, the resilient portion 1716 provides support to the shade 1710 and stiffens the shade 1710 so as to increase the resistance of the shade 1710 to bending or sagging out of its expanded configuration surface. In particular, the resilient portion 1716 increases the stiffness of the shade 1710 along the longitudinal line 1780. The resilient portion 1716 can increase the stiffness along all or only a portion of the shade 1710 along the longitudinal line 1780. Similarly, the resilient portion 1716 increases the stiffness of the shade 1710 along the lateral line 1782. The resilient portion 1716 can increase the stiffness along all or only a portion of the shade 1710 along the horizontal line 1782.

In the illustrated embodiment, the resilient portion 1716 is made from a different material than the membrane portion of the shade 1710. In one embodiment, the resilient portion 1716 made of a flexible material, such as rubber. In other embodiments, the resilient portion is made of a semi-rigid or rigid material, such as plastic or metal. In other embodiments, the resilient portion can be a metal frame, flexible hoop or multiple separate components (e.g., batten-like rods). While the resilient portion is illustrated as being substantially circular, the resilient portion can have any geometric shape, such as oval, rectangular, or square.

In an alternative embodiment, the resilient portion may be a separate member that can be releasably or fixedly coupled to the shade. In another alternative embodiment, the frame portion is configured to provide sufficient stiffness to the shade along the longitudinal and horizontal lines such that a resilient portion is not necessary.

Support member 1790 also supports to the shade 1710 and stiffens the shade 1710 so as to increase the resistance of the shade 1710 to bending or sagging out of its expanded configuration surface. In particular, the support member 1790 increases the stiffness of the shade 1710 along the lateral line 1782. The resilient portion 1716 can increase the stiffness along all or only a portion of the shade 1710 along the horizontal line 1782. Support member 1790 can be, for example, a rod made of appropriate material such as plastic or metal. FIG. 50 shows an example where the support member 1790 is a collapsible rod having an elastic member inside the hollow tubing. Note that support member 1790 can be used with or without resilient member 1716. Similarly, the resilient member 1716 can be used alone without support member 1790.

Another embodiment of the invention is illustrated in FIGS. 53-56. In this embodiment, a support 2000 has a frame 2002 that can be placed in an expanded configuration and in a collapsed configuration. The frame 2002, while in an expanded configuration, can be placed in an upright position and in a reclined position. The frame 2002 has a rear frame portion 2004 that includes a pair of support members 2010 and 2012 and a coupler 2030. The frame 2002 also has two side support members 2020 and 2022 that are pivotally coupled to the coupler 2030 as described below.

In the illustrated embodiment, the support members 2010 and 2012 are hollow metal tubes with a circular cross-section, but as described above for support members 1512 and 1514, the support members 2010 and 2012 can be made of different materials and have different cross-sectional shapes.

In the illustrated embodiment, support members 2010 and 2012 are connected together by a link 2014. Link 2014 includes a lower portion 2016 that engages the coupler 2030 as described below. In one embodiment, the link 2014 and the support members 2010 and 2012 can be integrally formed. In one embodiment, the link can be a linear member.

Figure 53A:
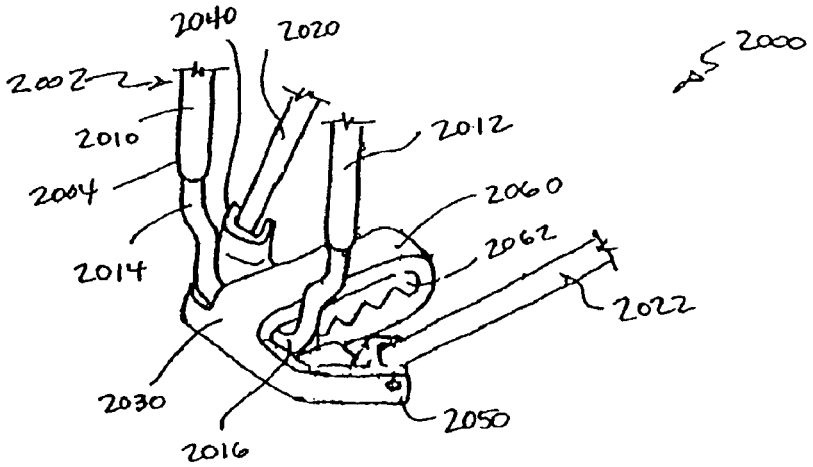
FIG. 53A illustrates a perspective view of a rear portion of a support in an upright position, according to an embodiment of the invention.
Figure 54A:
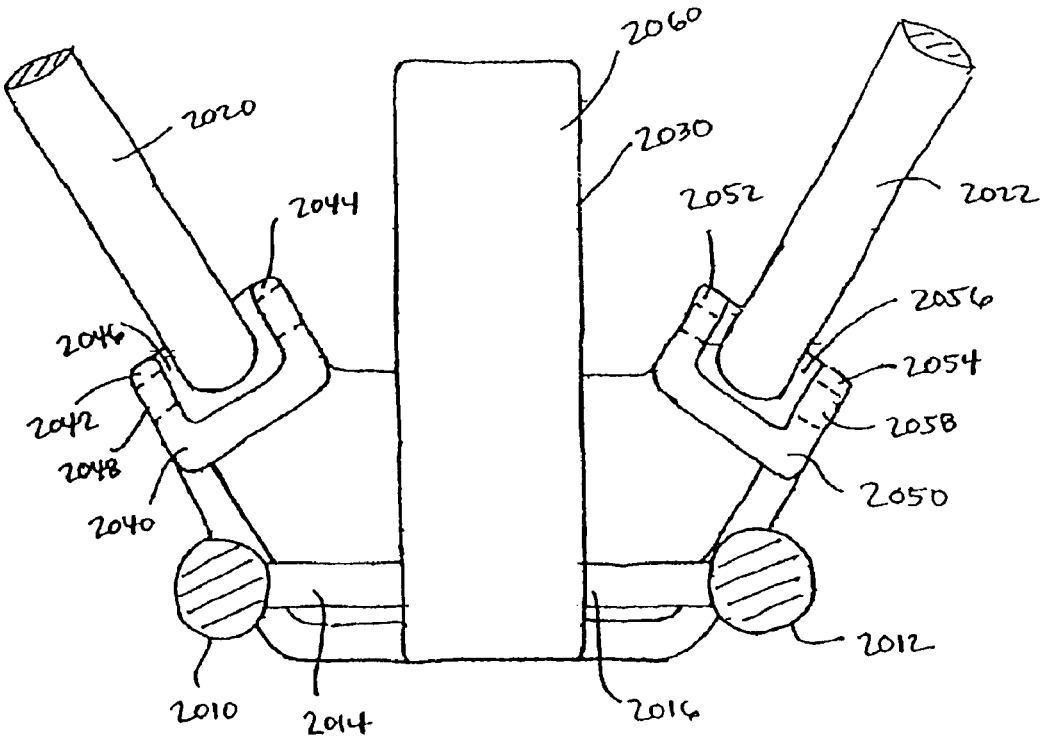
FIG. 54A illustrates a top view of a rear portion of the support of FIG. 53A.

As illustrated in FIGS. 53A and 54A, the coupler 2030 includes mounting portions 2040 and 2050 and an adjustment portion 2060. In the illustrated embodiment, the mounting portions 2040 and 2050 are mounted on opposite sides of and at an angle with respect to the adjustment portion 2060.

Mounting portion 2040 includes a pair of walls 2042 and 2044 that define a cavity 2046 therebetween. Each of the walls 2042 and 2044 includes an opening 2048 through which a connector, such as a rivet (not shown), can be inserted to couple the lower end of the support member 2020 to the mounting portion 2040.

Similarly, mounting portion 2050 includes a pair of walls 2052 and 2054 that define a cavity 2056 therebetween. Each of the walls 2052 and 2054 includes an opening 2058 through which a connector, such as a rivet (not shown), can be inserted to couple the lower end of the support member 2022 to the mounting portion 2050.

Figure 53B:
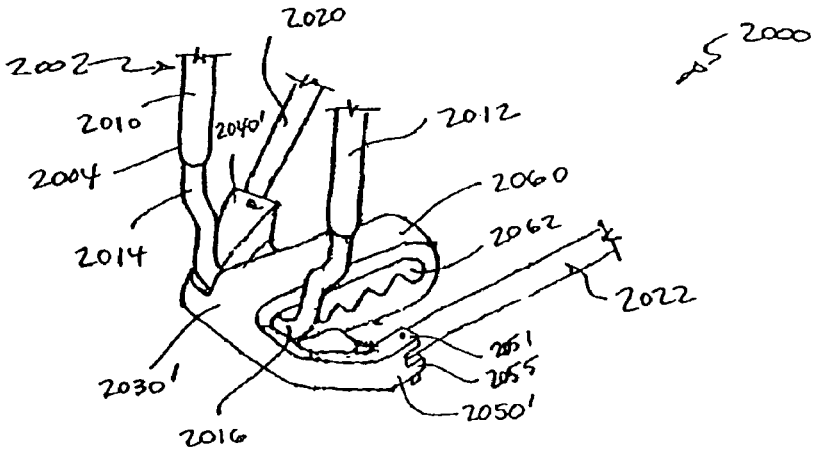
FIG. 53B illustrates a perspective view of a rear portion of a support in an upright position, according to an alternative embodiment of the invention.
Figure 54B:
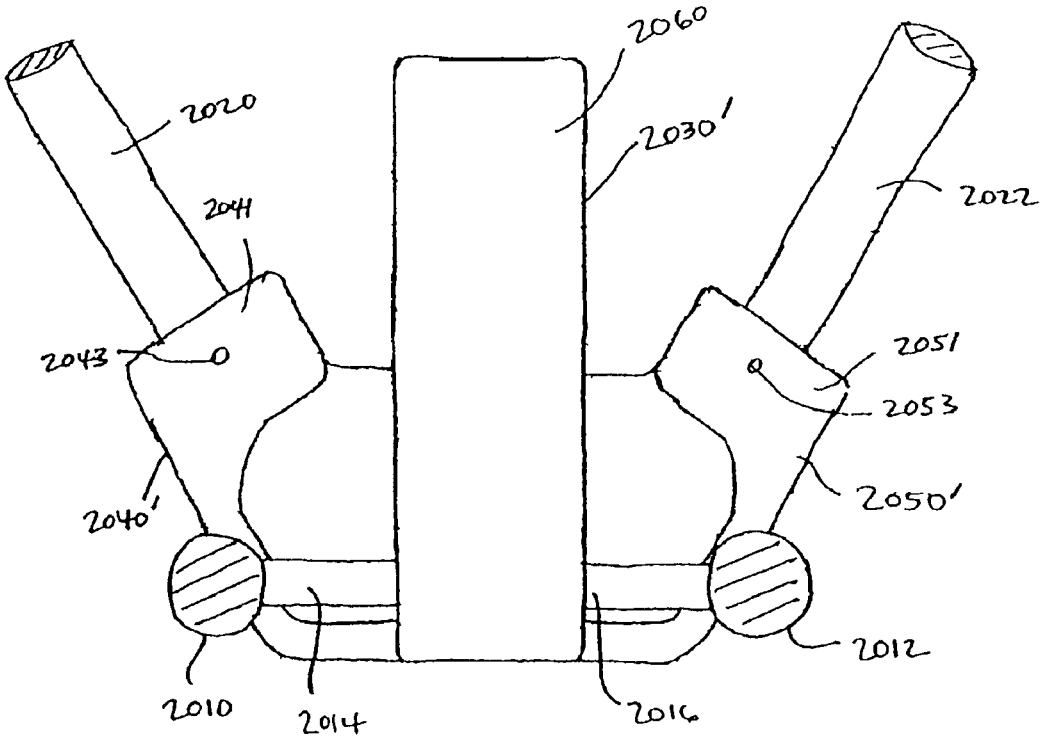
FIG. 54B illustrates a top view of a rear portion of the support of FIG. 53B.

An alternative embodiment of a coupler is illustrated in FIGS. 53B and 54B. The coupler 2030' includes the same components as coupler 2030 with the exception of the mounting portions. As illustrated, mounting portions 2040' and 2050' have a different orientation as compared to mounting portions 2040 and 2050. In this embodiment, mounting portion 2040' includes an upper wall 2041 and a lower wall (not shown) through which a fastener 2043, such as a screw or rivet, can be inserted to couple the support member 2020 to the coupler 2030'. Similarly, mounting portion 2050' includes an upper wall 2051 and a lower wall 2055 through which a fastener 2053, such as a screw or rivet, can be inserted to couple the support member 2022 to the coupler 2030'. In alternative embodiments, the mounting portions of the coupler may be oriented at angle with respect to the support surface on which the coupler is placed.

Figure 55:
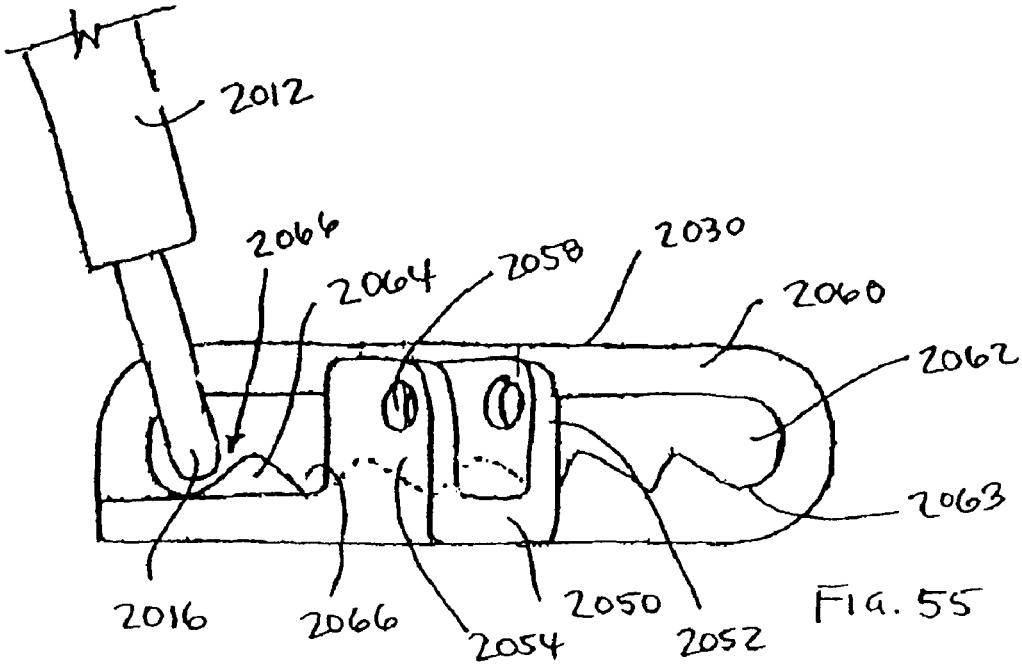
FIG. 55 illustrates a side view of a rear portion of the support of FIG. 53 in an upright position.
Figure 56:
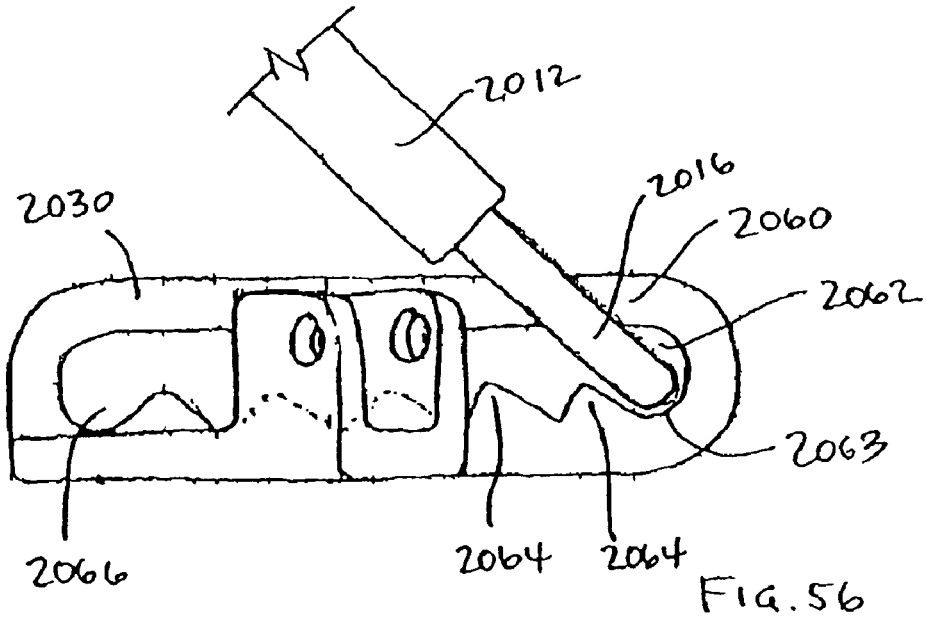
FIG. 56 illustrates a side view of a rear portion of the support of FIG. 53 in a reclined position.

As illustrated in FIGS. 55 and 56, the adjustment portion 2060 includes a central opening or slot 2062 through which the lower portion 2016 of the link 2014 passes. The opening 2062 is configured to allow the lower portion 2016 to move along the length of the adjustment portion 2060 of the coupler 2030. Side support members 2020 and 2022 are not illustrated in FIGS. 55 and 56 for reasons of simplicity only.

In the illustrated embodiment, the adjustment portion 2060 includes a lower inner surface 2063 that has several ridges or teeth 2064 that defines notches 2066 therebetween. The ridges 2064 are configured to retain the lower portion 2016 in one of the notches 2066. Each notch 2066 corresponds to a different angle of inclination of the support members 2010 and 2012 and the frame 2002. Each notch 2066 defines a retaining position in which the lower portion 2016 of the link 2014 can be retained. While the illustrated embodiment of the adjustment portion 2060 includes five ridges 2064 that define six notches 2066, any number of ridges 2064 and notches 2066 can be provided on the adjustment portion 2060. Similarly, the adjustment portion 2060 can be any length.

As best illustrated in FIGS. 55 and 56, the rear frame portion 2004 can be pivoted with respect to the coupler 2030 to convert the frame 2002 from an upright position to a reclined position. Support member 2010 functions in a similar manner as support member 2012, and thus only the movements of support member 2012 are illustrated and discussed in detail. To recline the frame 2002, the support member 2012 is lifted from its initial upright position (see FIG. 55) on the coupler 2030. The lower portion 2016 of the support member 2012 can be moved along the slot 2062 of the coupler 2030 to the desired position. The support member 2012 and link 2014 can be lowered so that lower portion 2016 of link 2014 engages a notch 2066 on the coupler 2030. The steps of this process can be reversed to convert the frame 2002 from a reclined position to an upright position.

Another embodiment of the invention is illustrated in FIGS. 57A-60. In this embodiment, a support 2100 has a frame 2101, a coupler 2150, tension members 2110 and 2112, elongate members 2130 and 2140, slide plate 2105 and slide-plate member 2106. Similar to the above-described embodiments, the frame 2101 can be placed in an expanded configuration and in a collapsed configuration. Also similar to the above-described embodiments, each of the tension members 2110 and 2112 can be placed in two positions. The tension members 2110 and 2112 can be placed in a first position when the frame 2101 is in its expanded configuration to provide supports for the arms of a user. In addition, the tension members 2110 and 2112 can be placed in a second position when the frame 2101 is in its collapsed configuration to serve as shoulder straps when support 2100 is being transported on the user's back.

Elongate members 2130 and 2140 are structurally similar to each other and to elongate members 1630 and 1632 described above. Note that although the elongate members 2130 and 2140 are shown as straps, elongate members can be cables, cords or any appropriate type of material that can be coupled to coupler 2150 and can be used to form a shoulder strap or just be used for adjustment.

Elongate member 2130 has a first end 2132 and a second end 2134. The first end 2132 of the elongate member 2130 can be formed into a loop that can be grasped by the user. The second end 2134 of the elongate member 2130 is coupled to the coupler 2150. Similarly, elongate member 2140 has a first end 2142 and a second end 2144. The first end 2142 of the elongate member 2140 can be formed into a loop that can be grasped by the user. The second end 2144 of the elongate member 2140 is coupled to the coupler 2150.

In the illustrated embodiment, the second end 2134 of elongate member 2130 includes the male portion 2136 of a buckle. The male portion 2136 can be coupled to a corresponding female portion of the buckle (not shown) on tension member 2112 when tension member 2112 is disconnected from the front frame portion. Similarly, the second end 2144 of elongate member 2140 includes the male portion 2146 of a buckle. The male portion 2146 can be coupled to a corresponding female portion of the buckle (not shown) on tension member 2110 when tension member 2110 is disconnected from the front frame portion.

As illustrated in FIGS. 57A, and 58-60, the coupler 2150 includes a front surface 2151, a rear surface 2152, an upper end 2153, and a lower end 2154. The lower end 2154 engages the support surface on which support 2100 is placed. The coupler 2150 includes mounting portions 2160 and 2162 proximate to upper end 2153 to which support members 2102 and 2104 are coupled, respectively. In one embodiment, connectors, such as bolts or rivets, can be used to couple the lower ends of support members 2102 and 2104 to the mounting portions 2160 and 2162 of the coupler 2150. In alternative embodiments, any device that can movably couple the support members 2102 and 2104 to coupler 2150 can be used.

Figure 57A:
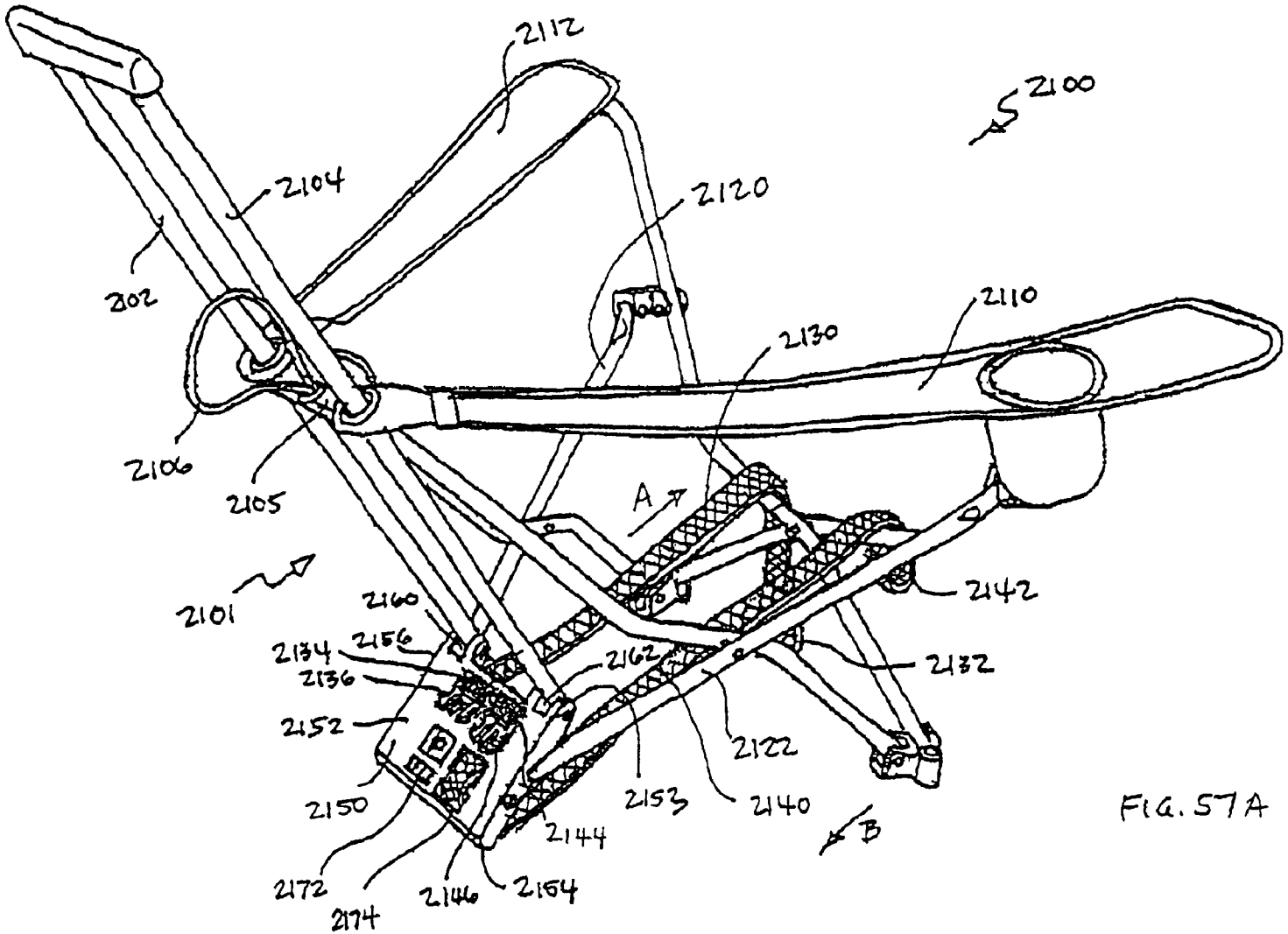
FIG. 57A illustrates a rear perspective view of a support in a reclined position according to an alternative embodiment of the invention.
Figure 59:
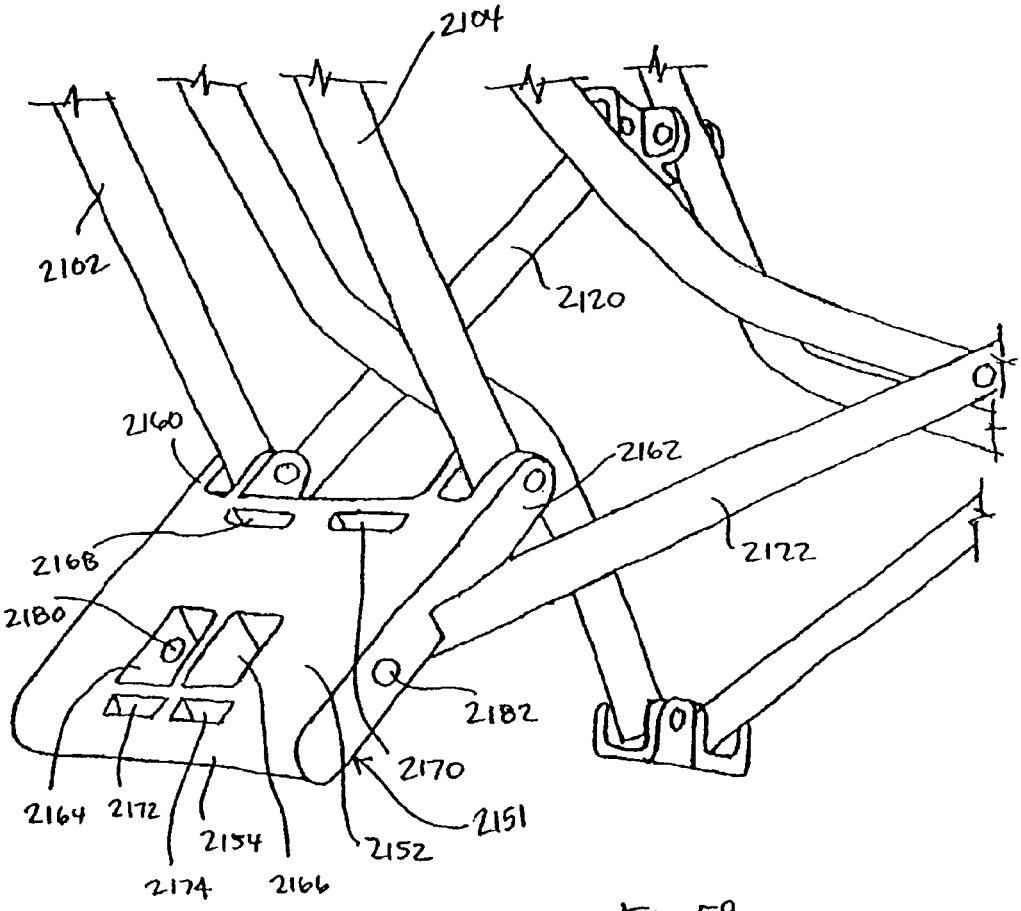
FIG. 59 illustrates a perspective view of a rear portion of the support of FIG. 57A in a reclined position.
Figure 60:
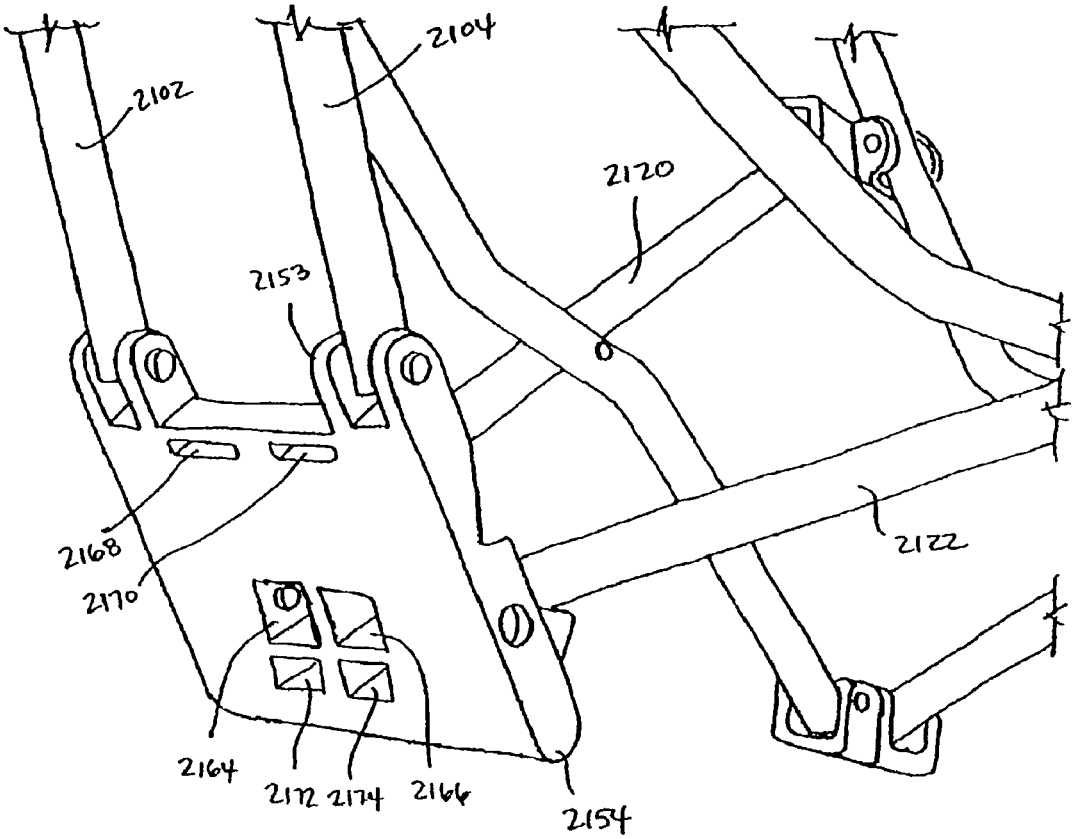
FIG. 60 illustrates a perspective view of a rear portion of the support of FIG. 57A in an upright position.

As best illustrated in FIGS. 59 and 60, coupler 2150 includes openings 2164 and 2166, a pair of slots 2168 and 2170 and a pair of slots 2172 and 2174. Openings 2164 and 2166 and slots 2168, 2170, 2172 and 2174 are configured to receive elongate members 2130 and 2140, respectively. As illustrated in FIG. 57A, elongate member 2140 passes through slot 2174, through opening 2166, and through slot 2170. Elongate member passes through slot 2168. By connecting elongate members 2130 and 2140 to different parts of the coupler 2150, movement of either of the elongate members 2130 and 2140 can cause movement of the coupler 2150. While the illustrated embodiment includes a sliding connection between the elongate members 2130 and 2140 and the coupler 2150, any type of connection between the elongate members 2130 and 2140 and the coupler 2150 can be used.

Figure 57B:
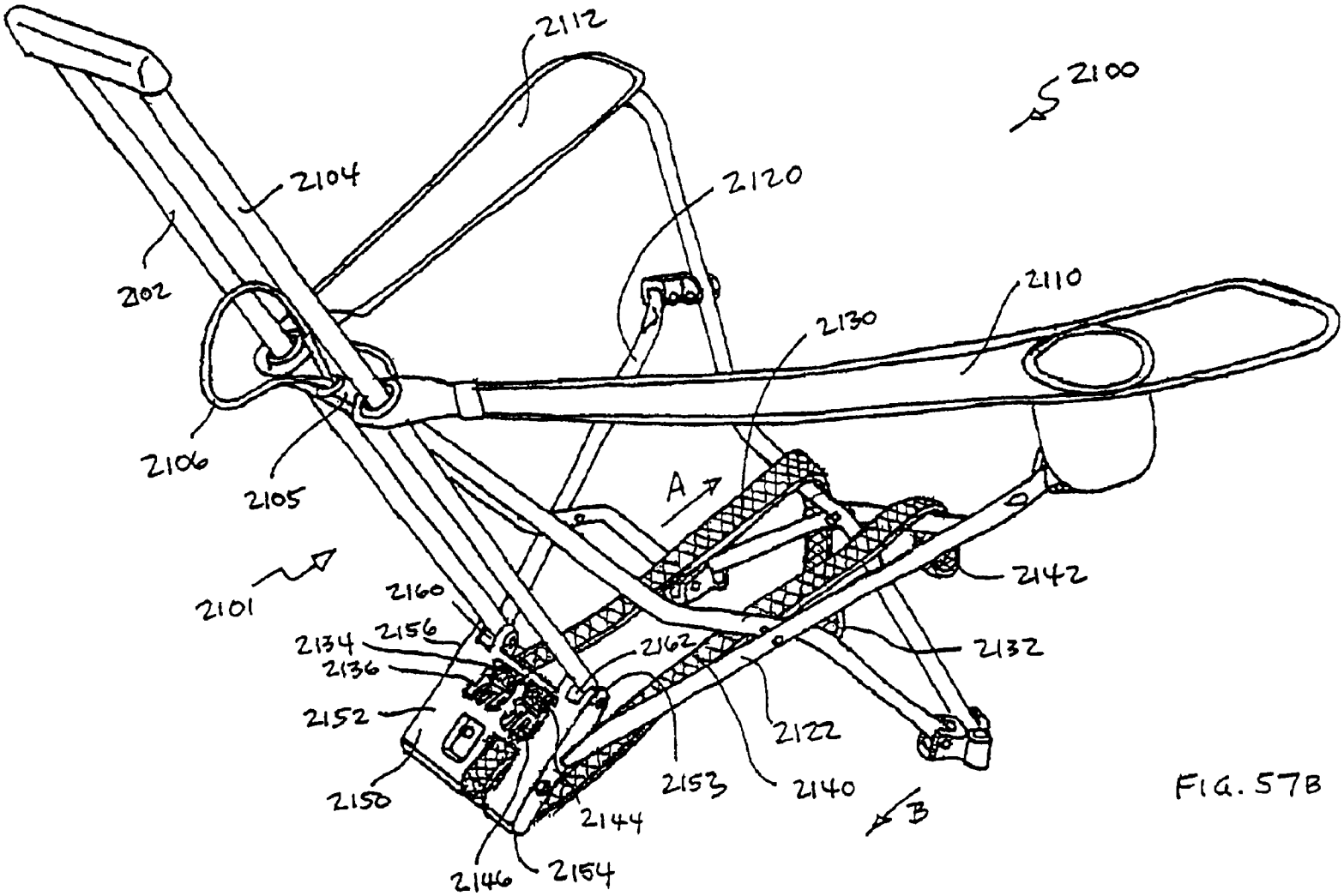
FIG. 57B illustrates a rear perspective view of a support in a reclined position according to an alternative embodiment of the invention.

An alternative embodiment of a coupler is illustrated in FIG. 57B. In this embodiment, the coupler 2150' only includes a pair of slots and a pair of openings. As illustrated, elongate member 2140 passes around the lower end 2154 of the coupler 2150', through opening 2166 and through slot 2170. Elongate member 2130 passes through slot 2168. By connecting elongate members 2130 and 2140 to different parts of the coupler 2150', movement of either of the elongate members 2130 and 2140 can cause movement of the coupler 2150'. While the illustrated embodiment includes a sliding connection between the elongate members 2130 and 2140 and the coupler 2150', any type of connection between the elongate members 2130 and 2140 and the coupler 2150' can be used.

In alternative embodiments, elongate members 2130 and 2140 can be coupled to the coupler 2150' in a variety of ways. For example, elongate member 2130 could pass through the slot 2172 near the lower end 2154 of the coupler 2150, through opening 2150, through opening 2164 and through slot 2168. Elongate member 2140 can then pass through slot 2170 only.

Returning to the illustrated embodiment, side or forwardly extending support members 2120 and 2122 are pivotally coupled to the coupler 2150. As illustrated in FIG. 59, side support member 2120 is coupled to the coupler 2150 by connector 2180. Similarly, side support member 2122 is coupled to the coupler 2150 by connector 2182. It can be appreciated that any connectors or fasteners of the supports described herein can be any type of connector, such as a rivet, screw, bolt, etc.

In alternative embodiments, the support members 2102 and 2104 and the side support members 2120 and 2122 can be coupled to various locations on the coupler 2150. For example, the support members 2102 and 2104 can be coupled proximate to the middle of the coupler 2150 and the side support members 2120 and 2122 can be coupled proximate to the upper end of the coupler 2150. Alternatively, the support members 2102 and 2104 can be coupled along the lower end 2154 of the coupler 2150 and the side support members 2120 and 2122 can be coupled to the upper end 2153 or the along the middle of the coupler 2150. In one embodiment, the support members 2102 and 2104 can be coupled to the coupler 2150 on its rear surface.

In one embodiment, elongate members 2130 and 2140 can be coupled together or formed integrally in a continuous loop that is coupled to the coupler 2150. The continuous elongate member loop can be coupled to the coupler 2150 in any manner that facilitates movement of the coupler 2150 in response to movement of any the loop. For example, when the user pulls on a first portion of the loop, the coupler 2150 is moved in a first direction. When the user pulls on a second portion of the loop, the coupler 2150 is moved in a second direction.

As illustrated in FIG. 57A, the support 2100 can be adjusted to a recline position by pulling forward on the elongate member 2130. When the user pulls elongate member 2130 along the direction of arrow "A," the upper end 2153 of the coupler 2150 moves forwardly and the lower end 2154 of the coupler 2150 moves rearwardly about pivots 2180 and 2182 of the coupler 2150. As the coupler 2150 rotates to its reclined position in FIG. 57A, the support members 2102 and 2104 pivot relative to the coupler 2150 to their reclined positions. As the coupler 2150 is moved, elongate member 2140 moves along the direction of arrow "B." In other words, because elongate member 2140 is threaded through slot 2174, through opening 2166 and through slot 2170, elongate member 2140 moves coupler 2150 in the direction of arrow "B" when elongate member 2140 is pulled in the direction of arrow "A."

Figure 58:
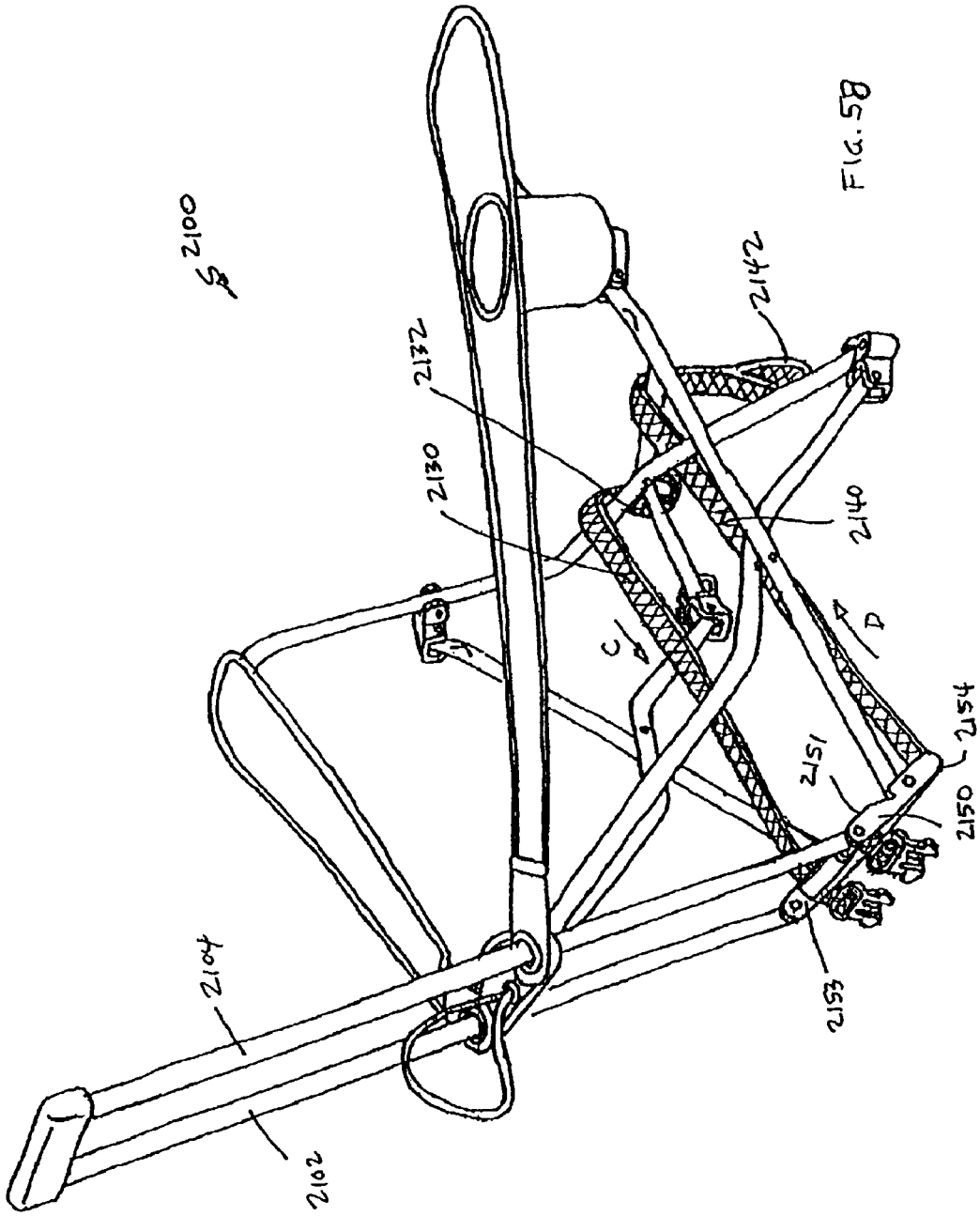
FIG. 58 illustrates a rear perspective view of the support of FIG. 57A in an upright position.

As illustrated in FIG. 58, the support 2100 can be adjusted to an upright position by pulling forwardly on the elongate member 2140. When the user pulls the elongate member 2140 along the direction of arrow "D," the lower end 2154 of the coupler 2150 moves forwardly and the upper end 2153 of the coupler 2150 moves rearwardly about pivots 2180 and 2182. As the coupler 2150 rotates to its upright position in FIG. 58, the support members 2102 and 2104 pivot relative to the coupler 2150 to their upright positions. As the coupler 2150 is moved, elongate member 2130 also moves along the direction of arrow "C." While the user can pull his weight upwardly to make the movement of the coupler 2150 easier, it is not necessary for the user to shift any weight to move the coupler 2150.

The coupler 2150 functions as a single joint to which the support members 2102 and 2104 and the side support members 2120 and 2122 are mounted. Movement of the coupler 2150 causes relative movement of the support members 2102 and 2104 and side support members 2120 and 2122 simultaneously.

In the illustrated embodiment, end 2132 of elongate member 2130 and end 2142 of elongate member 2140 are resting on part of the front frame portion. In alternative embodiments, ends 2132 and 2142 can be located anywhere along the frame 2101 as long as a user can grasp the ends 2132 and 2142 to adjust the frame 2101 and the support 2100.

In an alternative embodiment, the support can include four elongate members. For example, two elongate members can be coupled to the coupler and can be used and pull straps to change the angle of inclination of the support. Two elongate members can be coupled proximate to the upper portion and to the lower portion of the rear frame portion and can be used as carrying straps.

Figure 61:
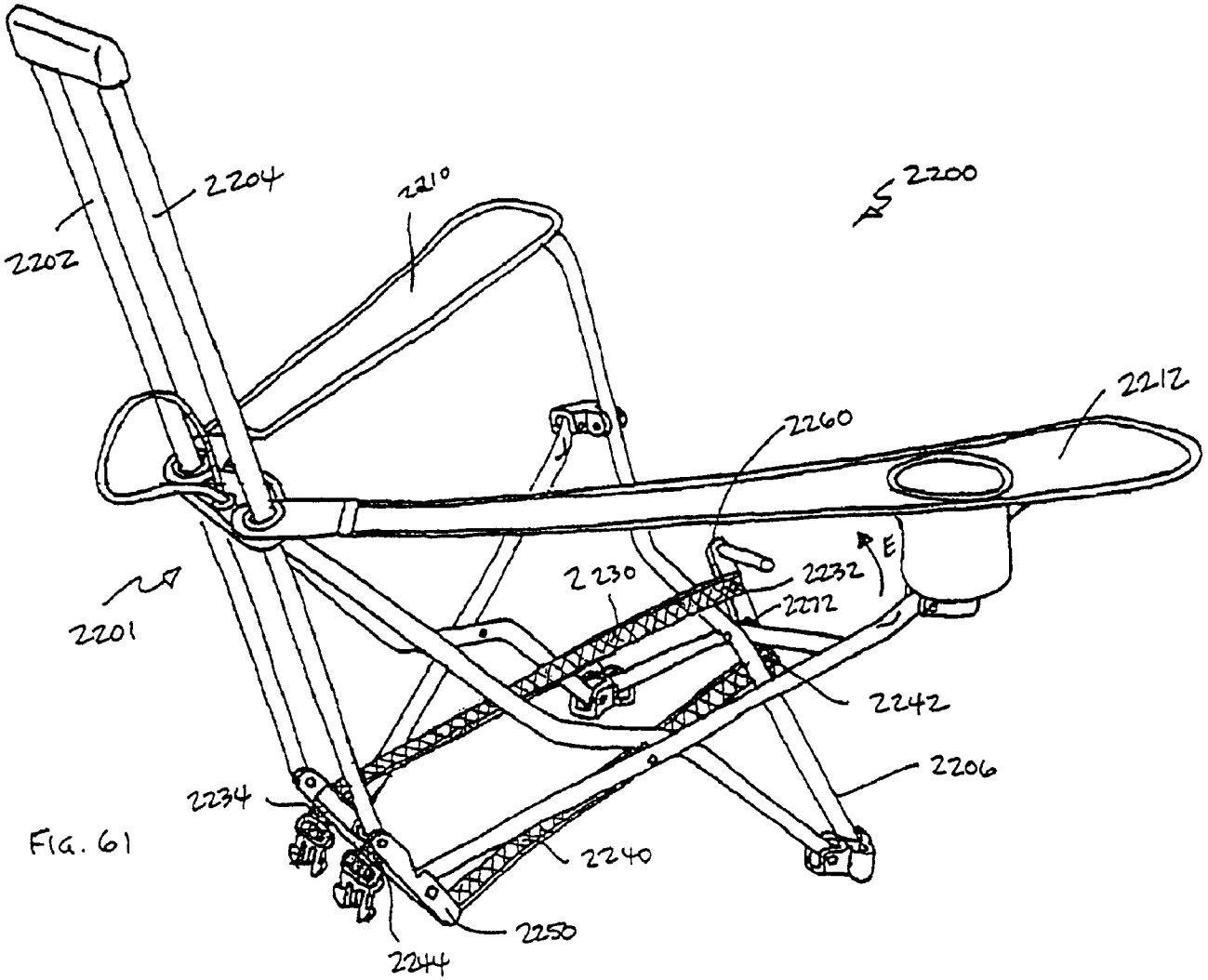
FIG. 61 illustrates a rear perspective view of a support in an upright position according to an alternative embodiment of the invention.
Figure 62:
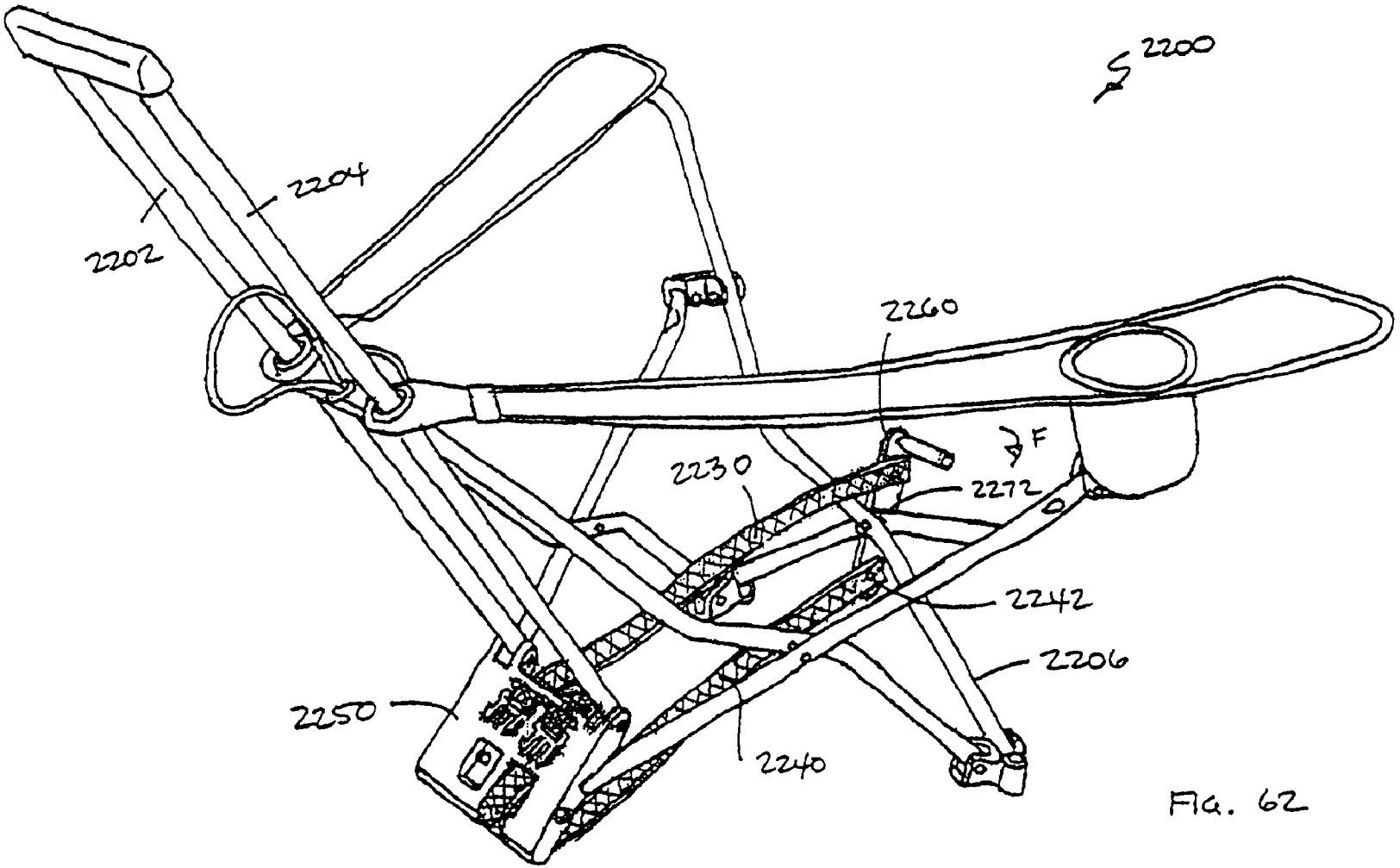
FIG. 62 illustrates a rear perspective view of the support of FIG. 61 in a reclined position.
Figure 63:
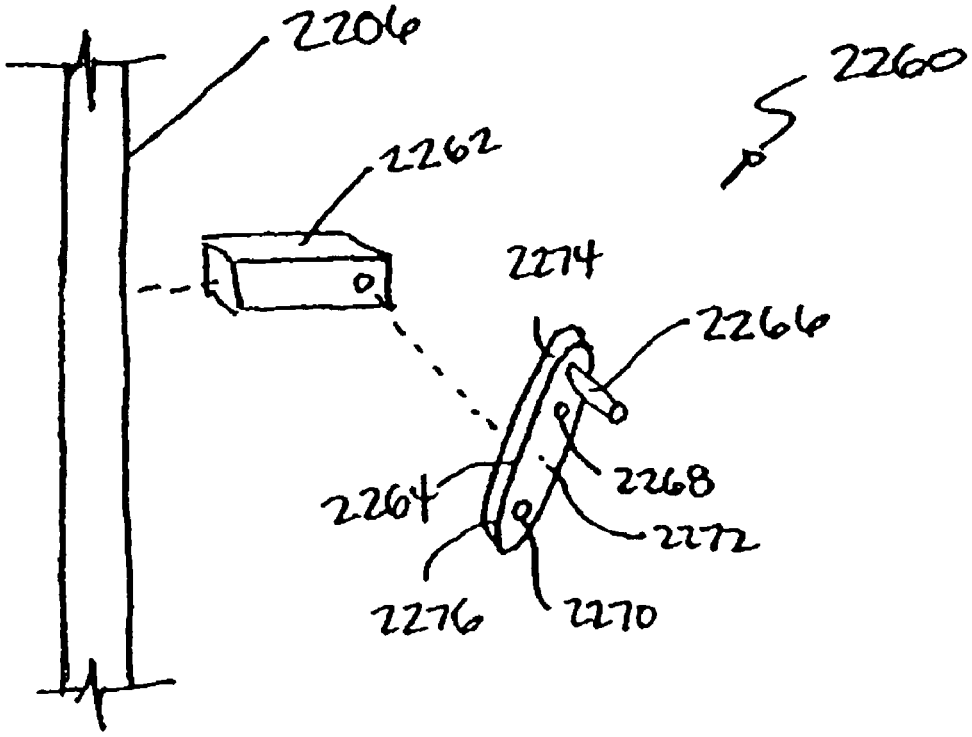
FIG. 63 illustrates a perspective view of an adjustment mechanism of the support of FIG. 61.

Another embodiment of the invention is illustrated in FIGS. 61-63. In this embodiment, a support 2200 has a frame 2201, a coupler 2250, tension members 2210 and 2212, and elongate members 2230 and 2240. Most of the components of support 2200 are similar to the corresponding components of support 2100. Similar to the above-described embodiments, the frame 2201 can be placed in an expanded configuration and in a collapsed configuration. Also similar to the above-described embodiments, each of the tension members 2210 and 2212 can be placed in two positions. The tension members 2210 and 2212 can be placed in a first position when the frame 2201 is in its expanded configuration to provide supports for the arms of a user. In addition, the tension members 2210 and 2212 can be placed in a second position when the frame 2201 is in its collapsed configuration to serve as shoulder straps when support 2200 is being transported on the user's back.

In the illustrated embodiment, support 2200 includes an adjustment mechanism 2260. Adjustment mechanism 2260 can be used to adjust the angle of inclination of the frame 2201. As illustrated in FIG. 61, elongate member 2230 has a first end 2232 and a second end 2234. Similarly, elongate member 2240 has a first end 2242 and a second end 2244.

The first end 2232 of the elongate member 2230 is coupled to the adjustment mechanism 2260 and the second end 2234 is coupled to the coupler 2250. The first end 2242 of the elongate member 2240 is coupled to the adjustment mechanism 2260 and the second end 2244 is coupled to the coupler 2250. First ends 2232 and 2242 of elongate members 2230 and 2240 are coupled to the adjustment mechanism via connectors, such as rivets or bolts. In alternative embodiments, any type of fasteners or method of coupling different parts, such as gluing, welding, etc., can be used to couple the elongate members to the adjustment mechanism.

Adjustment mechanism 2260 is mounted for movement relative to the frame 2201. In one embodiment, adjustment mechanism 2260 is pivotally mounted to the frame 2201. While the adjustment mechanism 2260 is illustrated as coupled to the front of the frame 2201, the adjustment mechanism 2260 can be mounted at any location on the frame 2201 as long as the user of the support 2200 can manipulate the adjustment mechanism 2260. For example, the adjustment mechanism 2260 can be mounted to a rear portion of the frame 2201.

An embodiment of an adjustment mechanism is illustrated in FIG. 63. In this embodiment, the adjustment mechanism 2260 includes a mount 2262 that is coupled to the frame 2201. In one embodiment, the mount 2262 is a separate piece that can be coupled to any part of the frame 2201. For example, the mount 2262 can be coupled to the front frame portion 2206 of the frame 2201. Mount 2262 can be coupled to the front frame portion 2206 using any conventional fastener or coupling techniques. In alternative embodiments, the mount can be integrally formed on the frame or the adjustment mechanism can be directly coupled to the frame.

The adjustment mechanism 2260 includes a link 2264 that is pivotally coupled to the mount 2262 for rotation about the pivot point 2272. Link 2264 can include a handle 2266 that can be grasped by the user. In the illustrated embodiment, link 2264 includes openings 2268 and 2270 that are configured to receive fasteners (not shown) that couple the elongate members 2230 and 2240 to the link 2264.

In the illustrated embodiment, when the adjustment mechanism 2260 is pivoted about pivot point 2272 along the direction of arrow "E," the lower end 2276 of the link 2264 moves forwardly and the upper end 2274 moves rearwardly (see FIG. 61). As the lower end 2276 moves forwardly, elongate member 2240 is pulled in the same direction and the coupler 2250 can be moved to its upright position, thereby changing the inclination of the frame 2201. While the user can pull his weight upwardly to make the movement of the coupler 2250 easier, it is not necessary for the user to shift any weight to move the coupler 2250.

When the adjustment mechanism 2260 is pivoted about pivot point 2272 along the direction of arrow "F," the upper end 2274 of the link 2264 moves forwardly and the lower end 2276 moves rearwardly (see FIG. 62). As the upper end 2274 moves forwardly, elongate member 2230 is pulled in the same direction. If the user lifts his weight up from the support 2200, the coupler 2250 can be moved to its reclined position, thereby changing the inclination of the frame 2201.

As discussed above, the movements of elongate members 2230 and 2240 relative to each other cause movement of the coupler 2250. Thus, while the adjustment mechanism 2260 is illustrated as having an elongate link, any type of structure that facilitates the movement of elongate members 2230 and 2240 relative to each other can be used. For example, any structure that can be manipulated to selectively move one elongate member with respect to the other elongate member can be used.

In an alternative embodiment, the adjustment mechanism can include one or more members. For example, the adjustment mechanism can include two independently mounted pieces. Each elongate member can be coupled to a separate piece of the adjustment mechanism and can be moved independent of the other elongate member.

In one embodiment, the coupler 2250 of support 2200 can include additional slots corresponding to slots 2172 and 2174 of coupler 2150 described above. In other embodiments, couplers 2150 and 2250 can include any number of slots and/or openings.

Figure 64:
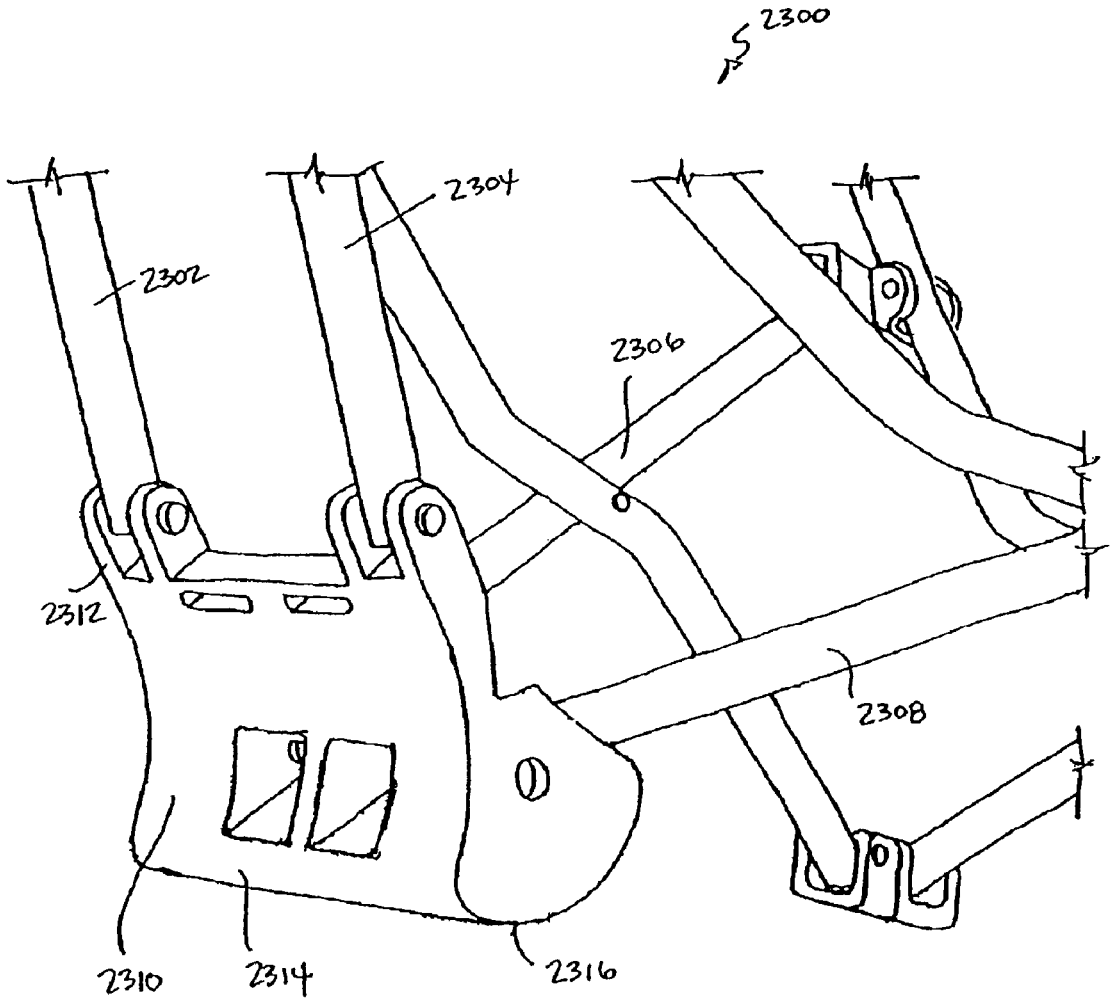
FIG. 64 illustrates a perspective view of a rear portion of a support in an upright position according to an alternative embodiment of the invention.
Figure 65:
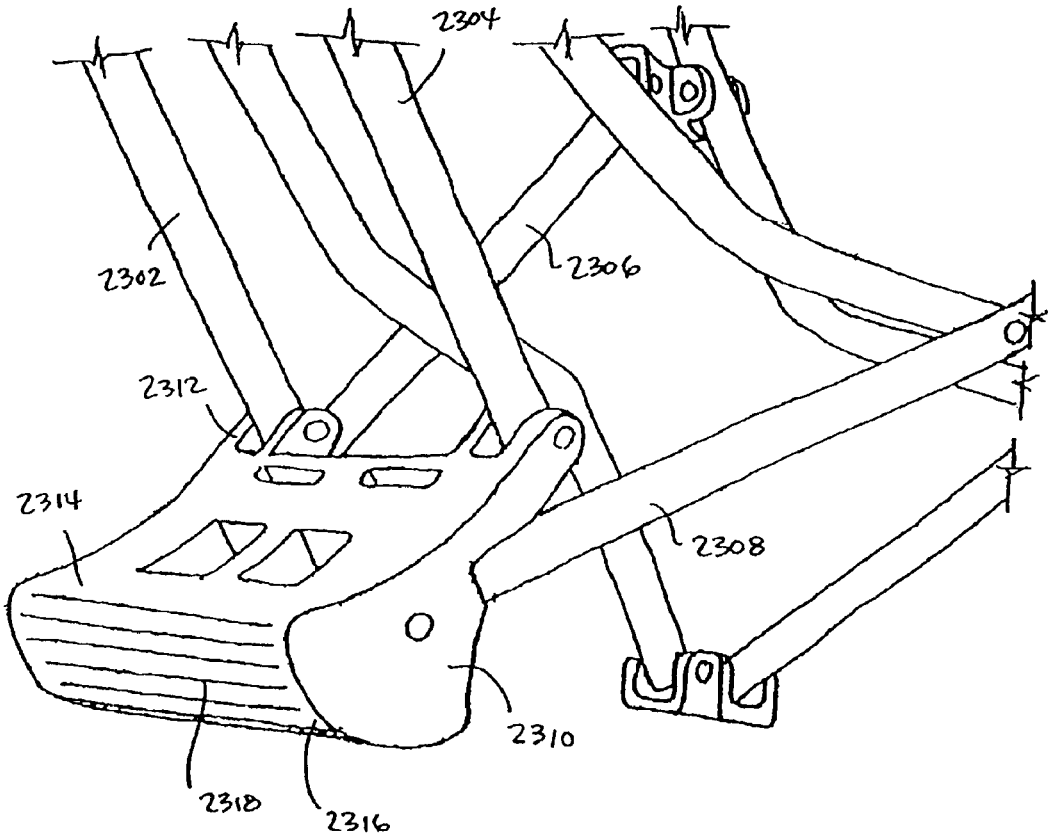
FIG. 65 illustrates a perspective view of a rear portion of the support of FIG. 64 in a reclined position.

An alternative embodiment of a support is illustrated in FIGS. 64 and 65. In this embodiment, the support 2300 includes support members 2302 and 2304, side support members 2306 and 2308, and a coupler 2310. Coupler 2310 is pivotally coupled to support members 2302 and 2304 and side support members 2306 and 2308. Coupler 2310 can be positioned in an upright position as illustrated in FIG. 64 and in a reclined position as illustrated in FIG. 65.

In this embodiment, the coupler 2310 can be used with or without elongate members. For example, the coupler 2310 can be used with one or more elongate members in a similar manner as described above with respect to coupler 2250. Also, coupler 2310 can be moved without any elongate members, as described in detail below. While this embodiment is illustrated without elongate members coupled to the coupler 2310, it can be appreciated that coupler 2310 can be used with any type of elongate members as described above.

In this embodiment, coupler 2310 includes an upper end 2312 to which support members 2302 and 2304 are coupled. Coupler 2310 has a lower end 2314 with a rounded bottom surface 2316 that engages the support surface on which support 2300 is placed. As illustrated, the lower end 2314 is larger than the upper end 2312. In the illustrated embodiment, the radius of curvature of the lower end 2314 is greater than the radius of curvature of the upper end 2312. The rounded bottom surface 2316 facilitates the movement of the coupler 2310 between the upright and reclined positions. It is not necessary that the lower end 2314 be rounded and larger than the upper end 2312 for the coupler 2350 to operate.

The bottom surface 2316 includes several ridges 2318 that facilitate the movement of the lower end 2314 and bottom surface 2316 along the support surface. For example, if the support 2300 is deployed on a sandy support surface, the ridges 2318 provide increased friction with the support surface, thereby facilitating the movement of the coupler 2310 between its upright and reclined positions.

In order to move the coupler 2310 between these positions, elongate members can be pulled to move the coupler 2310 in a particular direction. In an alternative embodiment, the coupler can be moved when the occupant shifts his weight on the support. For example, when the occupant shifts his weight from the back to the front of the support 2300, the coupler 2310 is moved from its upright position (see FIG. 64) to its reclined position (see FIG. 65). The process can be reversed to move the coupler 2310 from its reclined position to its upright position.

In an alternative embodiment, the coupler can be formed without any openings or slots. In such an embodiment, the coupler is moved in response to the shifting of the occupant's weight.

Figure 66:
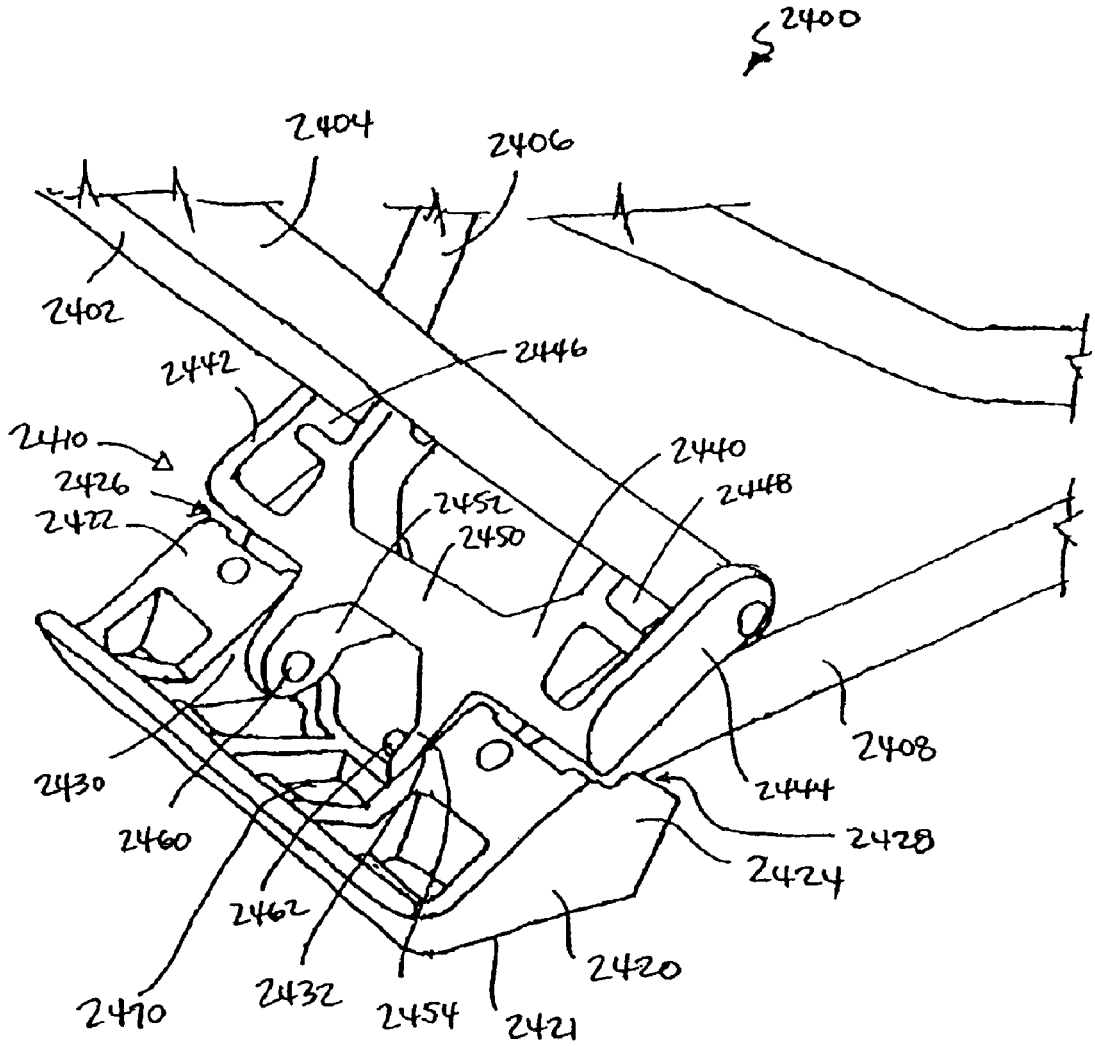
FIG. 66 illustrates a perspective view of a rear portion of a support in a reclined position according to an alternative embodiment of the invention.
Figure 67:
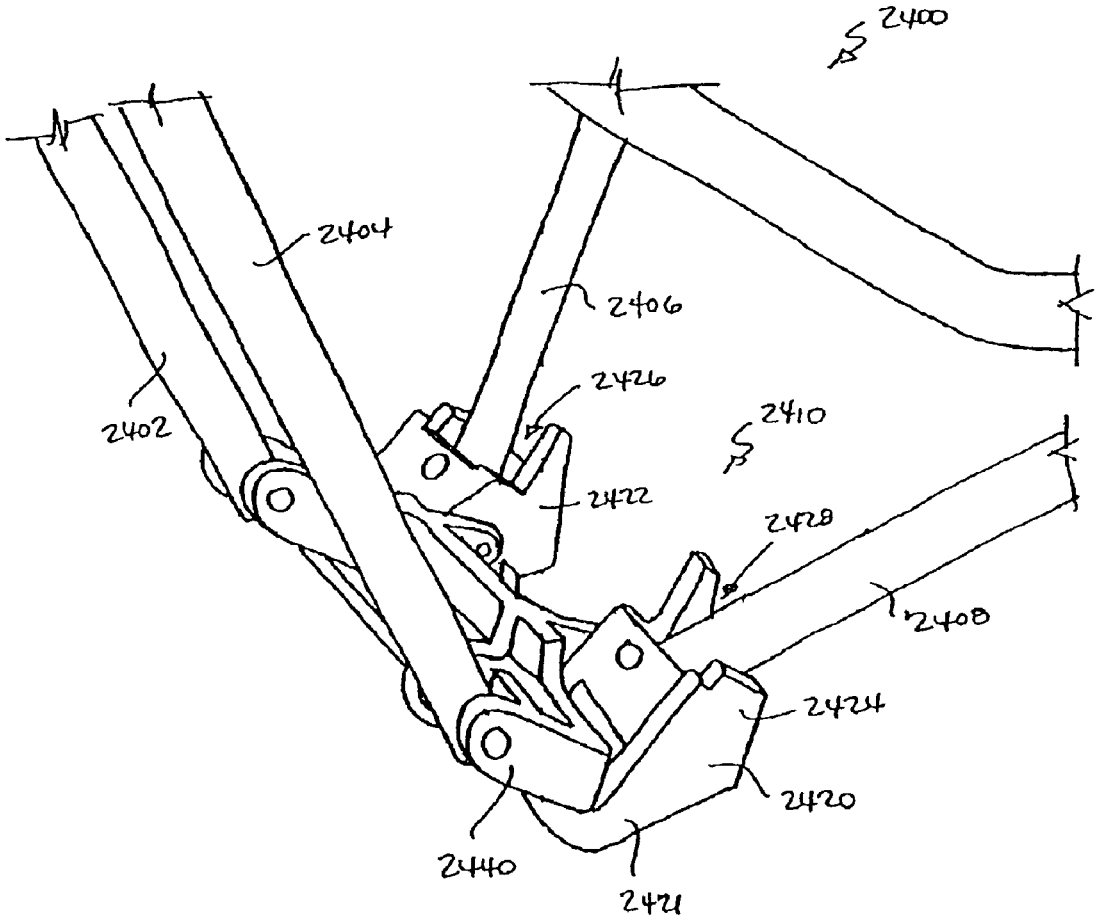
FIG. 67 illustrates a perspective view of a rear portion of the support of FIG. 66 in an upright position.

An alternative embodiment of a support is illustrated in FIGS. 66 and 67. In this embodiment, the support 2400 includes support members 2402 and 2404, side support members 2406 and 2408, and a coupler 2410.

Coupler 2410 includes a lower portion 2420 and an upper portion 2440. Upper portion 2440 is pivotally coupled to the lower portion 2420. Lower portion 2420 has a base 2421 that remains in contact with the support surface on which the support 2400 is placed. Base 2421, for example, can be in stationary, non-pivoting contact with the support surface on which the support 2400 is placed. Upper portion 2440 is movable relative to the lower portion 2420 between a reclined position (see FIG. 66) and an upright position (see FIG. 67).

Lower portion 2420 includes mounting portions 2422 and 2424 to which side support members 2406 and 2408 are coupled. Mounting portions 2422 and 2424 include cavities 2426 and 2428, respectively, into which the lower ends of side support members 2406 and 2408 are inserted. Mounting portion 2422 includes an inner wall surface 2430. Similarly, mounting portion 2424 includes an inner wall surface 2432.

Upper portion 2440 includes mounting portions 2442 and 2444. Mounting portion 2442 has an opening 2446 into which support member 2402 is inserted. Support member 2402 is pivotally coupled to mounting portion 2442, for example, via any conventional fastener, such as a rivet. Similarly, mounting portion 2444 has an opening 2448 into which support member 2404 is inserted. Support member 2404 is pivotally coupled to mounting portion 2444, for example, via any conventional fastener, such as a rivet.

Upper portion 2440 includes a connecting portion 2450 that is coupled to the lower portion 2420 of the coupler 2410. The connecting portion 2450 has extensions 2452 and 2454 that are coupled to the lower portion 2420. In the illustrated embodiment, the extensions 2452 and 2454 are coupled to the inner wall surfaces 2430 and 2432, respectively, of the lower portion 2420. Connectors 2460 and 2462, such as rivets, can be used to pivotally couple the upper portion extensions 2452 and 2454 to the lower portion 2420.

In the illustrated embodiment, the lower portion 2420 has several openings 2470 that pass through the lower portion 2420. Openings 2470 reduce the material in the lower portion 2420. Also, when the support 2400 is used on a sandy support surface, sand can pass through the openings 2470, thereby allowing the lower portion 2420 of the coupler 2410 to settle on the support surface. In alternative embodiments, the lower portion 2420 may not include any openings or the lower portion 2420 can include any number of openings 2470.

In an alternative embodiment, the upper portion of the coupler can be moved relative to the lower portion of the coupler using one or more elongate members. The elongate members can be coupled to the upper portion of the coupler to move the coupler and position the upper portion of the coupler into its reclined position (see FIG. 66) and into its upright position (see FIG. 67). For example, an elongate member can be couple to the upper portion and another elongate member can pass around a support member and then be coupled to the upper portion. Movement of either elongate member can cause movement of the upper portion.

In alternative embodiments, the couplers of the supports can be any size, shape or configuration.

In alternative embodiment, the elongate members for a support can be rigid.

A support according to an alternative embodiment of the invention is illustrated in FIGS. 68-84. In this embodiment, support 2500 includes several components that are structurally and functionally similar to components of the various embodiments of the supports previously discussed. Accordingly, the above descriptions of such components are incorporated in this section.

Figure 68:
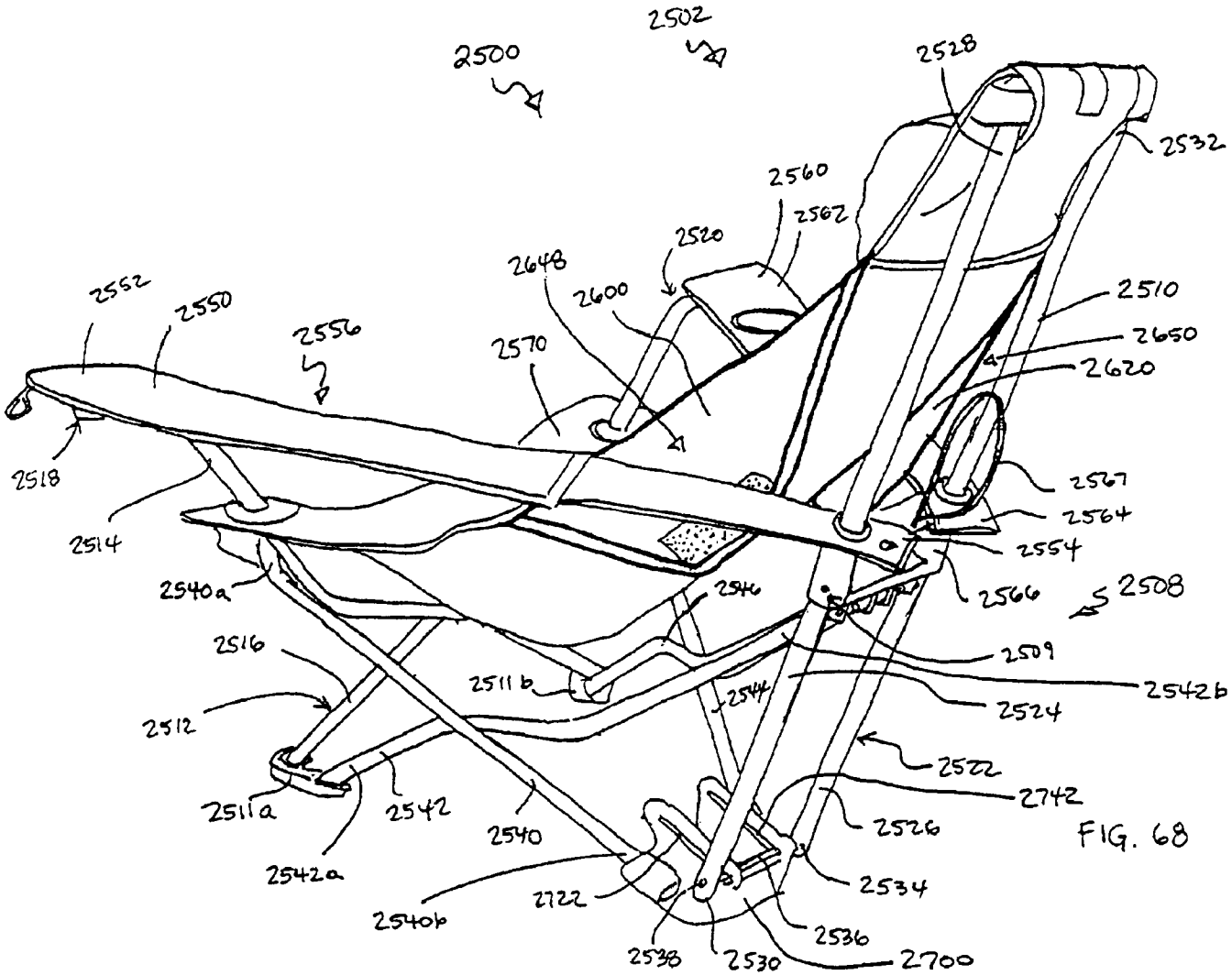
FIG. 68 illustrates a rear perspective view of a support according to an alternative embodiment of the invention.

As illustrated in FIG. 68, support 2500 includes a frame 2510 and a seat or support membrane 2570. The frame 2510 can be disposed in a deployed configuration 2502 (see FIGS. 68-69) and in a collapsed configuration 2504 (see FIGS. 73-74).

The frame 2510 includes a front frame portion 2512 and a rear frame portion 2522. The front frame portion 2512 includes front legs 2514 and 2516 that have upper ends 2518 and 2520, respectively. The rear frame portion 2522 includes rear legs 2524 and 2526 that have upper ends 2528 and 2532 and lower ends 2530 and 2534, respectively.

In the illustrated embodiment, the rear frame portion 2522 includes an elongate member or connector portion 2536 that is coupled to the lower ends 2530 and 2534 of the rear legs 2524 and 2526, respectively. The connector portion 2536 can be coupled to the rear legs 2524 and 2526 by one or more connectors 2538, which can be, for example, any conventional connector mechanism, such as a bolt, rivet, screw, etc. In an alternative embodiment, the rear legs and the connector portion of the rear frame portion can be integrally formed.

The frame 2510 includes side legs 2540, 2542, 2544 and 2546 that extend between the front frame portion 2512 and the rear frame portion 2522. Each of the side legs 2540, 2542, 2544 and 2546 extends between the front frame portion 2512 and the rear frame portion 2522, thereby facilitating the collapsing of the frame 2510. When the frame 2510 is in a collapsed configuration, the legs of the frame 2510 are substantially parallel (see FIGS. 73 and 74).

Side leg 2542 has an upper end 2542b that is pivotally coupled to the guide plate 2566 and a lower end 2542a that is coupled to a foot 2511a. Similarly, side leg 2546 has an upper end that is pivotally coupled to the guide plate 2566 and a lower end that is coupled to a foot 2511b. Side leg 2540 has an upper end 2540a that is coupled to the front frame portion 2512. Similarly, side leg 2544 has an upper end that is coupled to the front frame portion 2512.

Referring to FIG. 68, the support 2500 includes a base or foot 2700. The base 2700 includes slots 2722 and 2742 formed therein. The side legs 2540 and 2544 are coupled to the base 2700. For example, the lower end 2540b of side leg 2540 is coupled to the base 2700. Similarly, the lower end (not shown) of side leg 2544 is coupled to the base 2700.

The rear frame portion 2522 is movably coupled to the base 2700. In this embodiment, the connector portion 2536 is inserted into the slots 2722 and 2742 and moves along the slots 2722 and 2742. The inclination of the rear frame portion 2522, and thus the support 2500, can be adjusted by moving the connector portion 2536 along the slots 2722 and 2742 between an upright configuration 2508 (see FIGS. 68, 69 and 79) and a reclined configuration 2506 (see FIG. 80). The base 2700 and its function are described in detail later with respect to FIGS. 75-84.

The support 2500 also includes tension members 2550 and 2560 coupled to the frame 2510. Tension member 2550 has a first end 2552 to which the front leg 2514 can be coupled and a second end 2554 that is slidably coupled to the rear leg 2524. The first end 2552 is removably coupled to the front leg 2514. Similarly, tension member 2560 has a first end 2562 to which the front leg 2516 can be coupled and a second end 2564 that is slidably coupled to the rear leg 2526. The first end 2562 is removably coupled to the front leg 2516.

Figure 69:
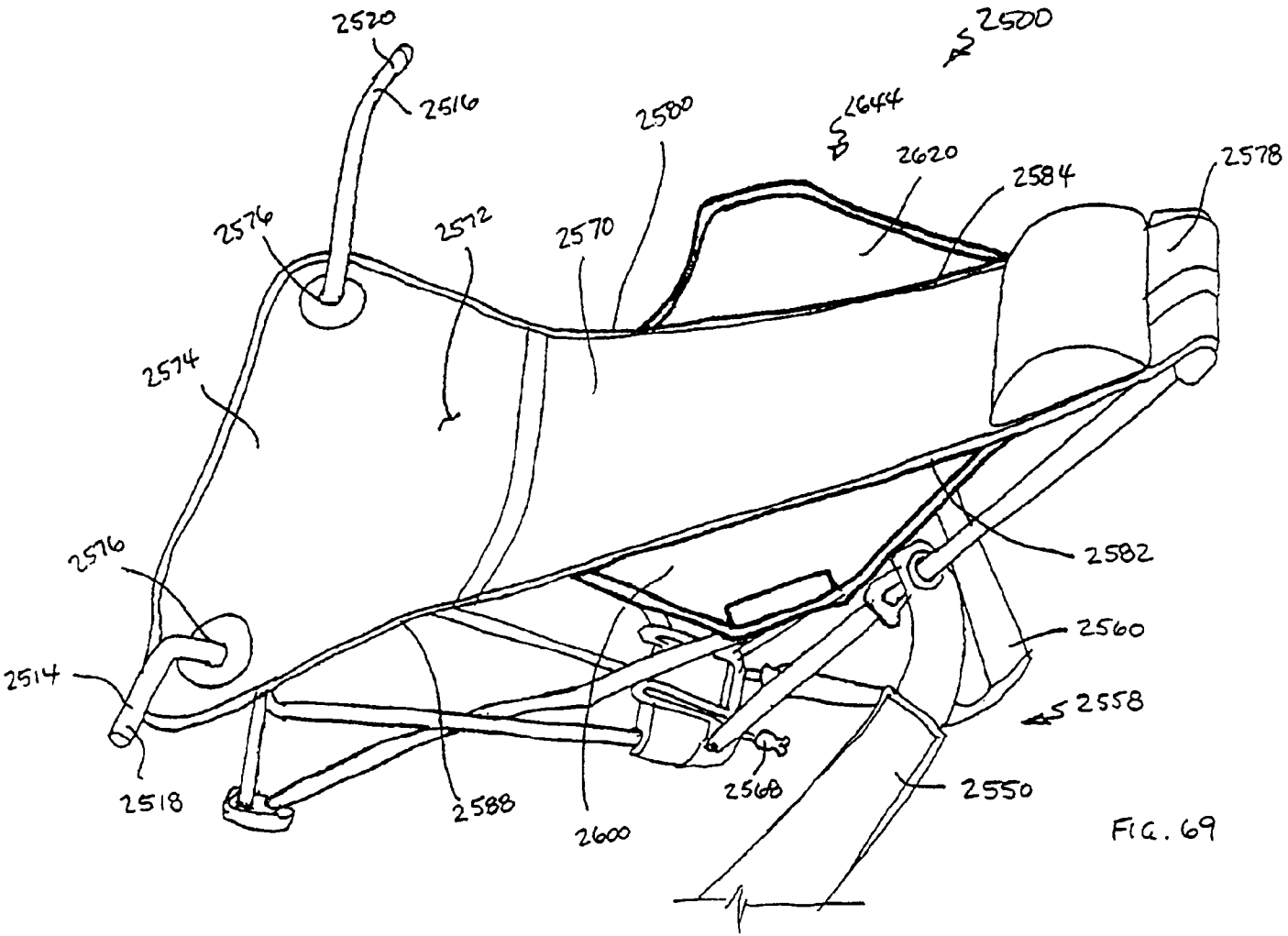
FIG. 69 illustrates a side perspective view of the support of FIG. 68.

The tension members 2550 and 2560 are movable between coupled positions 2556 (see FIGS. 68) and decoupled positions 2558 (see FIG. 69). In their decoupled positions 2558, each of the tension members 2550 and 2560 can be coupled to a connector 2568 (see FIG. 69), such as a buckle on a strap, that is coupled to the frame 2510. In one embodiment, the connector 2568 is coupled to the base 2700. The connector 2568 can be configured as discussed above with respect to previous embodiments. When a tension member is connected to a connector, the tension member can be used as a carrying strap to transport the support 2500.

As shown in FIG. 68, the support 2500 includes a guide plate 2566 that is configured to move along the rear legs 2524 and 2526. Attached to the guide plate 2566 is a pull cord 2567 that can be grasped by a user to move the guide plate 2566 upwardly to collapse the frame 2510. In the illustrated embodiment, the guide plate 2566 extends upwardly a distance that is sufficient to support the rear ends of the tension members 2550 and 2560 at locations that enable the tension members to be used as arm rests. The cords that were previously described with respect to other embodiments as retaining the rear ends of tension members at particular locations are no longer needed for this embodiment.

The seat 2570 of the support 2500 is supported on the frame 2510. As illustrated in FIG. 68, the seat 2570 can be supported on the front frame portion 2512 and the rear frame portion 2522.

As illustrated in FIG. 69, the seat 2570 includes a body portion 2572. The body portion 2572 includes a front portion 2574 and a rear portion 2578. The front portion 2574 includes a pair of openings 2576 through which the upper ends 2518 and 2520 of front legs 2514 and 2516, respectively, are inserted. The rear portion 2578 is coupled to the rear frame portion 2522 proximate to an upper end of the rear frame portion 2522.

The seat 2570 has a perimeter 2580 that defines the outer edge 2586 (see FIG. 70) of the seat 2570. In one embodiment, the seat 2570 includes a binding 2588 that is attached to the seat 2570 along the perimeter 2580. The seat 2570 can be made from any flexible material that provides sufficient strength to support a user.

In the illustrated embodiment, the support 2500 includes side portions 2600 and 2620. The side portions 2600 and 2620 are coupled to the body portion 2572 of the seat 2570. In one embodiment, the side portions 2600 and 2620 are pieces of material that can be referred to as a retainer, flaps, closure mechanisms, etc. The side portions 2600 and 2620 can be made, for example, of the same material as body portion 2572.

In an alternative embodiment, side portions 2600 and 2620 and body portion 2572 can be made of different materials. The side portions 2600 and 2620 can vary in size and configuration. The side portions 2600 and 2620 do not have to enclose any particular portion of the frame. In alternative embodiments, each side portion can be an elongate member, such as a cord, a rope, a string, a strap, an elastic member, etc. Each of these side portion variations can be formed integrally with the frame and/or seat. Alternatively, each of these side portion variations can be coupled to the frame and/or to the seat.

Side portion 2600 can be located proximate to a first portion 2582 of the perimeter 2580 of the seat 2570. Side portion 2620 can be located proximate to a second portion 2584 of the perimeter 2580 of the seat 2570. While first portion 2582 and second portion 2584 are located along the upper edge of the seat 2570, the portions 2582 and 2584 can be located at any location along the perimeter that enables the side portions 2600 and 2620 to be used as closures or retainers as described herein. In an alternative embodiment, the first portion 2582 and the second portion 2584 can be coupled along the upper part of the seat 2570 at locations spaced apart from the edge.

In the illustrated embodiment, side portion 2600 is coupled to the body portion 2572 of the seat 2570 in the binding 2588. Similarly, side portion 2620 is also coupled to the body portion 2572 of the seat 2570 in the binding 2588. By coupling the side portions using the bindings, the side portions naturally fall or rest rearwardly behind the body portion 2572 in their open positions 2648 and 2650, which correspond to an open configuration 2644 (see FIGS. 68 and 69).

Figure 70:
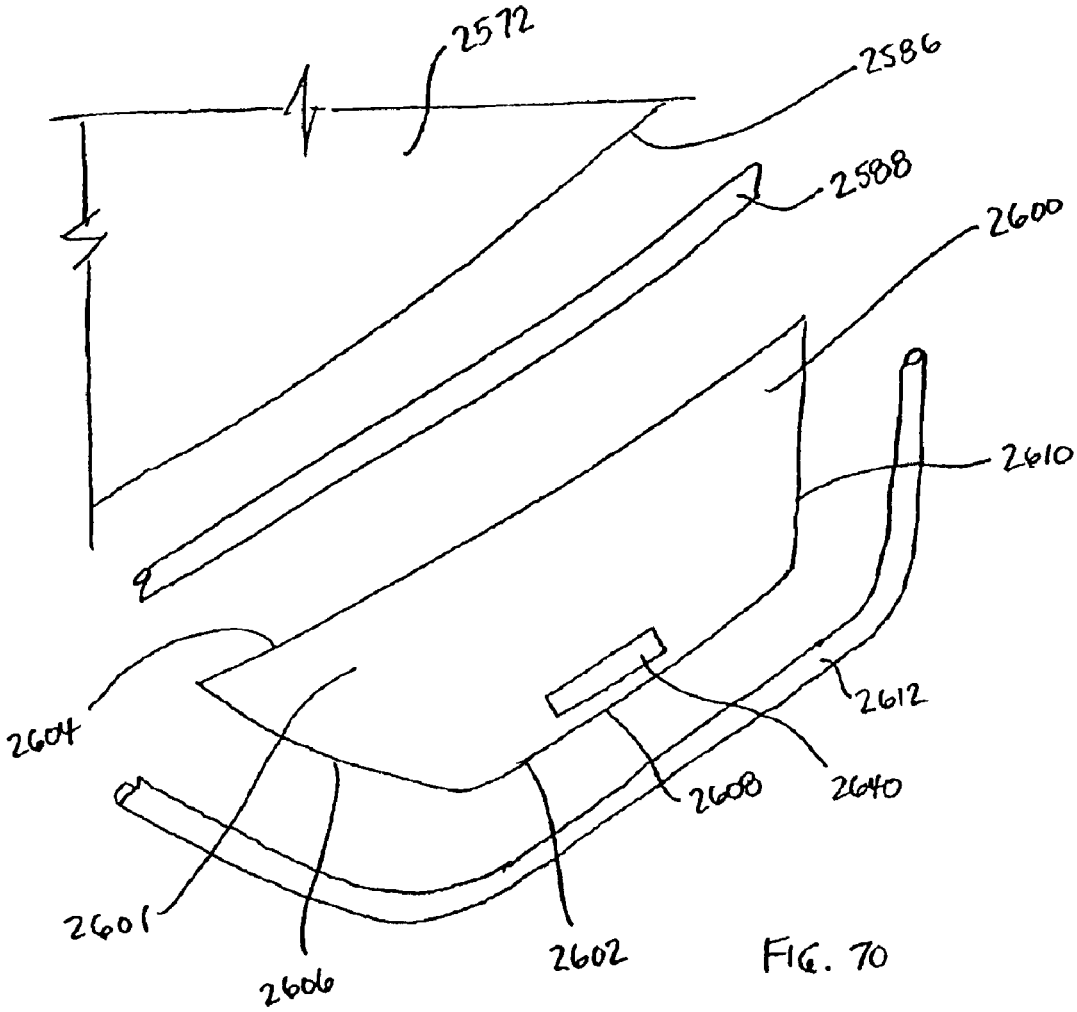
FIG. 70 illustrates some components of the support of FIG. 69.

One embodiment of the coupling of a side portion to the seat is illustrated in detail in FIG. 70. Side portion 2600 includes an inner edge 2604 and outer edges 2606, 2608 and 2610 that collectively form a perimeter 2602 of the side portion 2600. Side portion 2600 includes a coupling mechanism 2640 that is coupled to an inner surface 2601 of the side portion 2600. In an alternative embodiment, the coupling mechanism 2640 is coupled to an outer surface of side portion 2600.

Side portion 2620 is structurally similar to side portion 2600 and has a coupling mechanism 2642 attached to its outer surface. In an alternative embodiment, the coupling mechanism 2642 is coupled to an inner surface of side portion 2620. The coupling mechanisms 2640 and 2642 (not shown in FIG. 70) can engage each other when the side portions are positioned proximate to each other as discussed in detail later.

In various embodiments, any type of coupling mechanisms can be used. Some examples of coupling mechanisms include a hook, a plastic clip or buckle, etc. In an alternative embodiment, a single side portion can be provided that is configured to couple to a connector or coupling mechanism.

In the illustrated embodiment, side portions 2600 and 2620 are coupled to the body portion 2572 of the seat 2570 in a similar manner. Therefore, only the coupling of the side portion 2600 and the body portion 2572 is discussed in detail here. As noted above, side portions 2600 and 2620 can be coupled to the frame 2500.

As illustrated in FIG. 70, the body portion 2572 includes an edge 2586 that forms part of the perimeter of the body portion 2572. During the assembly of the components, side portion 2600 is placed proximate to the body portion 2572 so that the inner edge 2604 is proximate to edge 2586. In an alternative embodiment, side portion 2600 is coupled to the body portion 2572 at a location spaced apart form the edge 2586.

In one embodiment, a conventional binding 2588 is attached, such as by sewing or an adhesive, to the side portion 2600 and the body portion 2572 to couple them together. The flexibility of the side portion 2600 and the use of a binding to couple the side portion 2600 and the seat 2570 cause the side portion 2600 to hang downwardly and toward the rear of the support 2500, and thereby out of the way of the user or the occupant of the support 2500 (see FIG. 68).

In an alternative embodiment, no binding is used. In this example, the side portion 2600 and the body portion 2572 can be sewn together without any binding. The side portion 2600 still hangs or extends rearwardly relative to the support 2500.

In one embodiment, side portion 2600 includes a binding 2612 that is attached around the outer edges 2606, 2608 and 2610. Binding 2612 reduces the likelihood of fraying of the outer edges 2606, 2608 and 2610. Side portion 2620 can have a similar binding.

Figure 71:
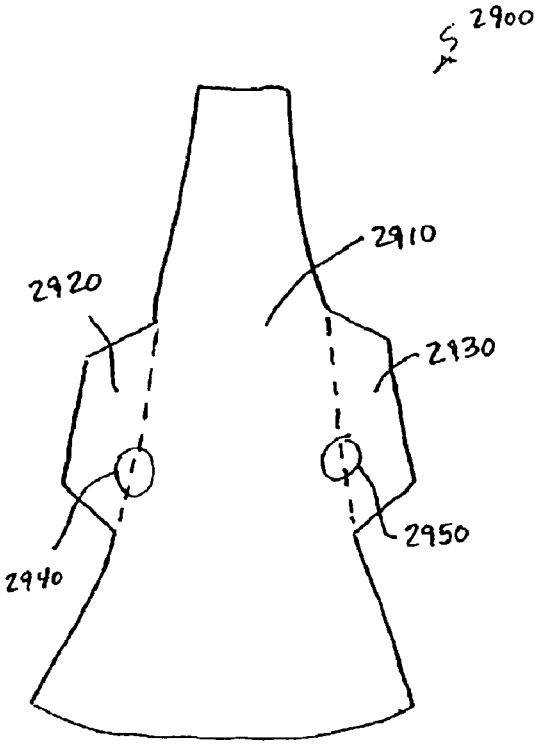
FIG. 71 illustrates a front view of a seat according to an alternative embodiment of the invention.

A seat according an alternative embodiment of the invention is illustrated in FIG. 71. In this embodiment, seat 2900 is a single membrane that includes a body portion 2910 and side portions 2920 and 2930. Body portion 2910 includes openings (not shown) to receive the front legs of a frame.

The body portion 2910 and side portions 2920 and 2930 are integrally formed as a single piece of material. In alternative embodiments, the size and configuration of the side portions can vary. It is not necessary that the side portions have the same size and/or configuration.

In an alternative embodiment, each side portion can be folded back and a seam can be sewn along the lines 2940 and 2950 illustrated in FIG. 71. By sewing along these lines 2940 and 2950, the side portions 2920 and 2930 extend rearwardly with respect to the body portion 2910. In an alternative embodiment, a binding (not shown) can be located along a portion of each line 2940 and 2950 and connected thereto (i.e., sewing, adhesive, etc.).

Figure 72:
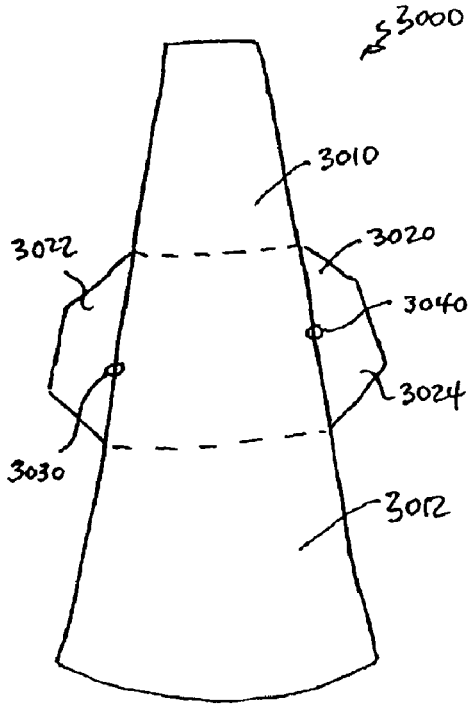
FIG. 72 illustrates a front view of a seat according to an alternative embodiment of the invention.

A seat according to an alternative embodiment of the invention is illustrated in FIG. 72. In this embodiment, seat 3000 includes a body portion 3010 that has a front surface 3012. A separate piece of material 3020 is coupled to the body portion 3010. Body portion 3010 includes openings (not shown) to receive the front legs of the frame.

In this embodiment, the material 3020 is coupled to the rear surface of the body portion 3010 using any conventional technique or procedure, such as sewing, an adhesive, etc. In an alternative embodiment, the material 3020 can be coupled to the front surface 3012 of the body portion 3010. The material 3020 includes a first side portion 3022 proximate to one end and a second side portion 3024 proximate to another end.

In an alternative embodiment, the sides of the separate piece of material 3020 can be folded back and a seam can be sewn along the lines 3030 and 3040 illustrated in FIG. 72. By sewing along these lines 3030 and 3040, the sides extend rearwardly with respect to the body portion 3010. In an alternative embodiment, a binding (not shown) can be located along a portion of each line 3030 and 3040 and connected thereto (i.e., sewing, adhesive, etc.).

Figure 73:
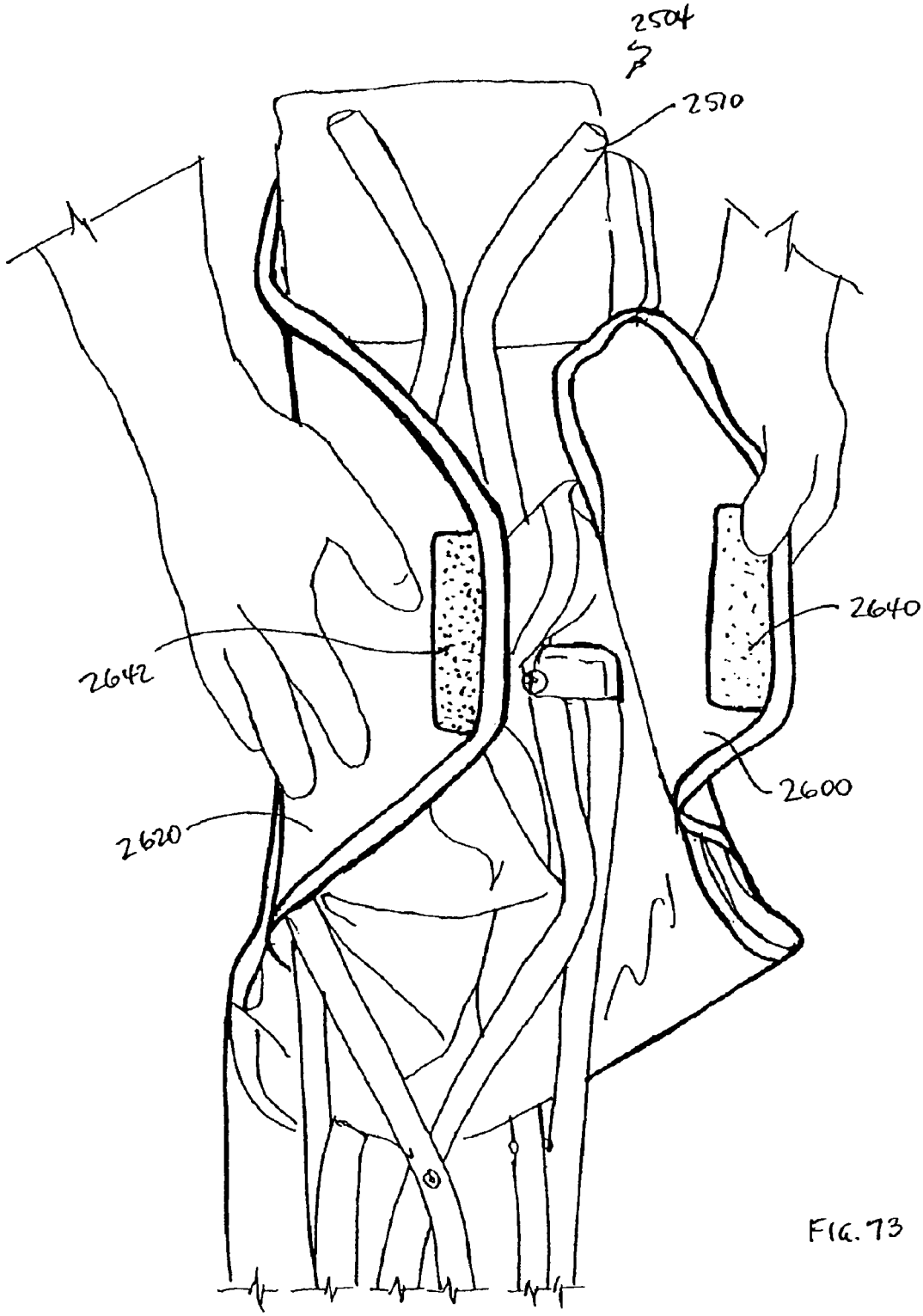
FIG. 73 illustrates a process, according to an alternative embodiment of the invention, by which the frame can be retained in its collapsed configuration.
Figure 74:
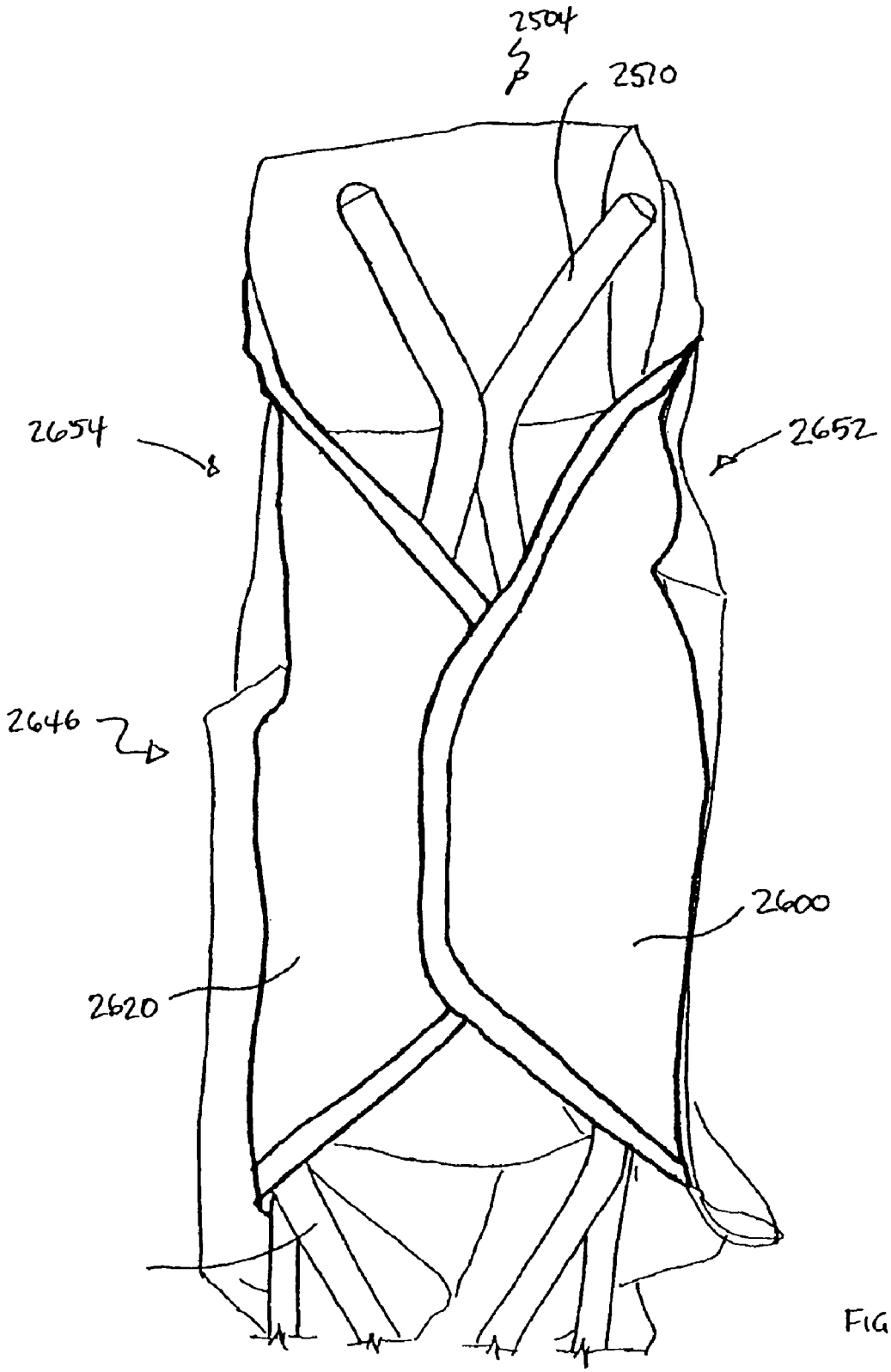
FIG. 74 illustrates a front view of the support of FIG. 68 in a collapsed configuration, according to an embodiment of the invention.

Referring to FIGS. 73-74, a process of retaining the frame 2510 in its collapsed configuration is illustrated. Initially, the guide plate 2566 is moved upwardly to pull the frame legs together and collapse the frame 2510. The frame 2510 of support 2500 is illustrated in its collapsed configuration in FIGS. 73 and 74. The side portions 2600 and 2620 are positioned so that they extend outwardly from the collapsed frame 2510.

As illustrated in FIG. 73, side portion 2600 includes a coupling mechanism 2640, such as one of a hook type or loop type fastener. Similarly, side portion 2620 includes a coupling mechanism 2642, such as the other of a hook type or loop type fastener. The coupling mechanisms 2640 and 2642 are configured to engage each other and can be coupled to the side portions 2600 and 2620, respectively, using any conventional technique, such as, for example, sewing, an adhesive, etc.

In alternative embodiments, the coupling mechanisms can be any structure that can be used to couple the side portions 2600 and 2620 together. Other coupling mechanisms such as, for example, snaps, fasteners, connectors, etc. can be used. In one embodiment, only one of the side portions can include a coupling mechanism, such as a clip, that can be used to grip and hold a part of the other side portion.

Referring to FIG. 73, initially, either side portion 2600 or side portion 2620 is moved so that it wraps around a portion of the collapsed frame 2510. As illustrated, side portion 2620 is first wrapped around a portion of the frame 2510. Side portion 2620 is held in position while the side portion 2600 is wrapped around another portion of the collapsed frame 2510. The side portions 2600 and 2620 can be moved sequentially or simultaneously.

The side portions 2600 and 2620 are placed proximate to each other so that coupling mechanisms 2640 and 2642 engage each other. When the coupling mechanisms 2640 and 2642 are coupled together, as illustrated in FIG. 74, the side portions 2600 and 2620 are retained together and form a retainer or closure mechanism that retains the frame 2510 in its collapsed configuration 2504. Accordingly, side portions 2600 and 2620 can be collectively referred to as a retainer or a closure or enclosure mechanism.

The side portions 2600 and 2620 are illustrated in FIG. 74 in their closed positions 2652 and 2654 which correspond to a closed configuration 2646. As noted above, the sizes and configurations of the side portions 2600 and 2602 can vary as long as the side portions can engage each other and retain the frame 2510 in its collapsed configuration 2504.

In an alternative embodiment, the closure mechanism can include a single side portion instead of two side portions that engage each other. In such an embodiment, a single flap or side portion is coupled to the seat and has a sufficient size that enables the side portion to extend around the collapsed frame 2510. The single side portion can be coupled to any part of the support that enables the side portion to maintain its position in which it retains the frame 2510 in its collapsed configuration.

A base of a support according to an embodiment of the invention is illustrated in FIGS. 75-78. In this embodiment, base 2700 includes a housing 2702 that includes side walls 2710 and 2730 and a rear wall 2750. The housing 2702 has extensions 2760 and 2780 coupled to either side of the housing 2702.

In one embodiment, the side walls 2710 and 2730, the rear wall 2750 and the extensions 2760 and 2780 are integrally formed. In an alternative embodiment, the side walls 2710 and 2730, the rear wall 2750 and the extensions 2760 and 2780 can be formed separately and coupled together.

In one embodiment, side walls 2710 and 2730 have substantially similar structure. Each side wall includes an inner surface, an outer surface, an upper end, a lower end and a hole and a slot formed therein.

As illustrated in FIGS. 75-78, side wall 2710 includes an outer surface 2712, an inner surface 2714, an upper end 2716, a lower end, a hole 2720 extending through the side wall 2710, and a slot 2722 extending along the upper end 2716 of the side wall 2710. In this embodiment, slot 2722 has a front end 2724 and a rear end 2726.

Similarly, side wall 2730 includes an inner surface 2732, an outer surface 2734, an upper end 2736, a lower end 2738, a hole 2740 extending through the side wall 2730, and a slot 2742 extending along the upper end 2736 of the side wall 2730. In this embodiment, slot 2742 has a front end 2744 and a rear end 2746.

While the slots 2722 and 2742 are located proximate to the upper ends of the side walls 2710 and 2730, respectively, the slots 2722 and 2742 can be located at any locations on the side walls 2710 and 2730 that allow a portion of the frame to travel along the slots 2722 and 2742. In alternative embodiments, the slots 2722 and 2742 can have any shape, configuration or length (i.e., slots or ridges for adjustment).

In the illustrated embodiment, extension 2760 has a wall 2762 that forms an internal cavity 2775. A front end 2764 of the wall 2762 defines a front opening 2776 and a rear end 2766 of the wall 2762 defines a rear opening 2778. The wall 2762 has an upper portion 2770 that includes a hole 2771 therethrough. Similarly, the wall 2762 has a lower portion 2772 that includes a hole 2773 therethrough. Holes 2771 and 2773 are configured to receive a conventional fastener that passes through part of side leg 2540 to couple side leg 2540 to the base 2700.

Similarly, extension 2780 has a wall 2782 that forms an internal cavity 2795. A front end 2784 of the wall 2782 defines a front opening 2796 and a rear end 2786 of the wall 2782 defines a rear opening 2798. The wall 2782 has an upper portion 2790 that includes a hole 2791 therethrough. Similarly, the wall 2782 has a lower portion 2792 that includes a hole 2793 therethrough. Holes 2791 and 2793 are configured to receive a conventional fastener that passes through part of side leg 2544 to couple side leg 2544 to the base 2700.

Figure 76:
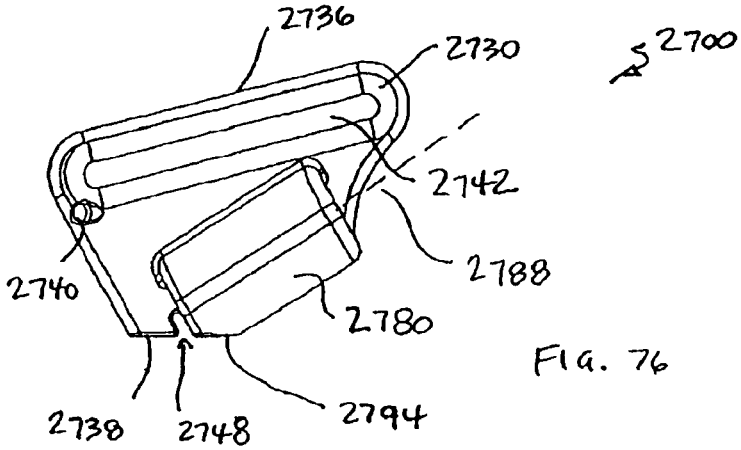
FIG. 76 illustrates a side view of the base of FIG. 75.
Figure 77:
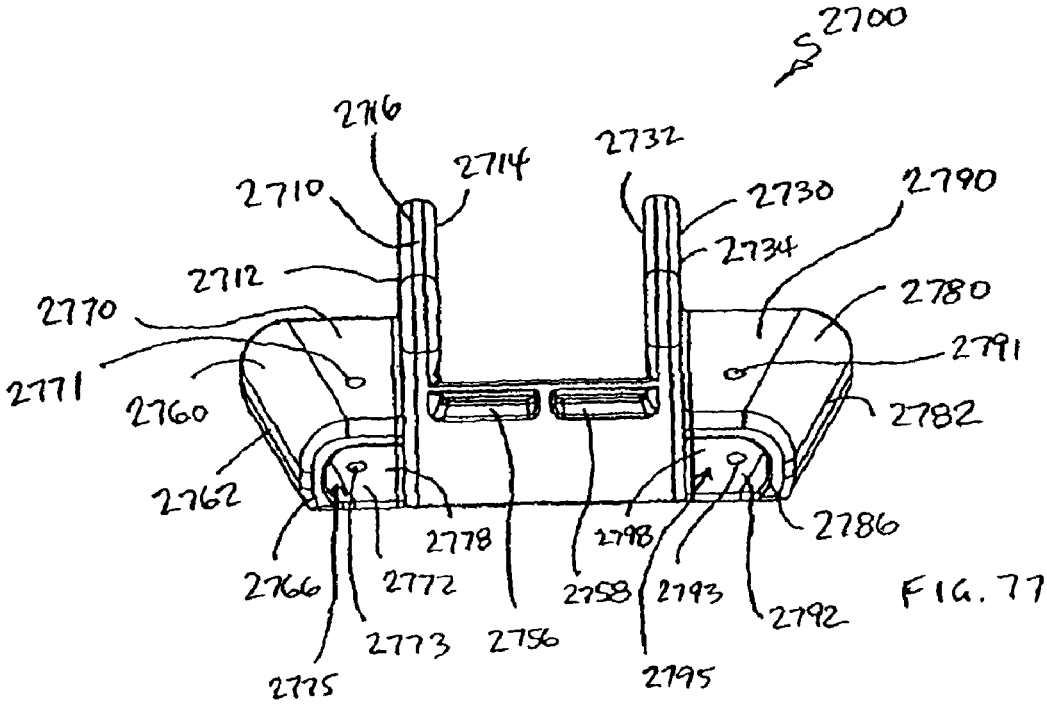
FIG. 77 illustrates a rear view of the base of FIG. 75.
Figure 78:
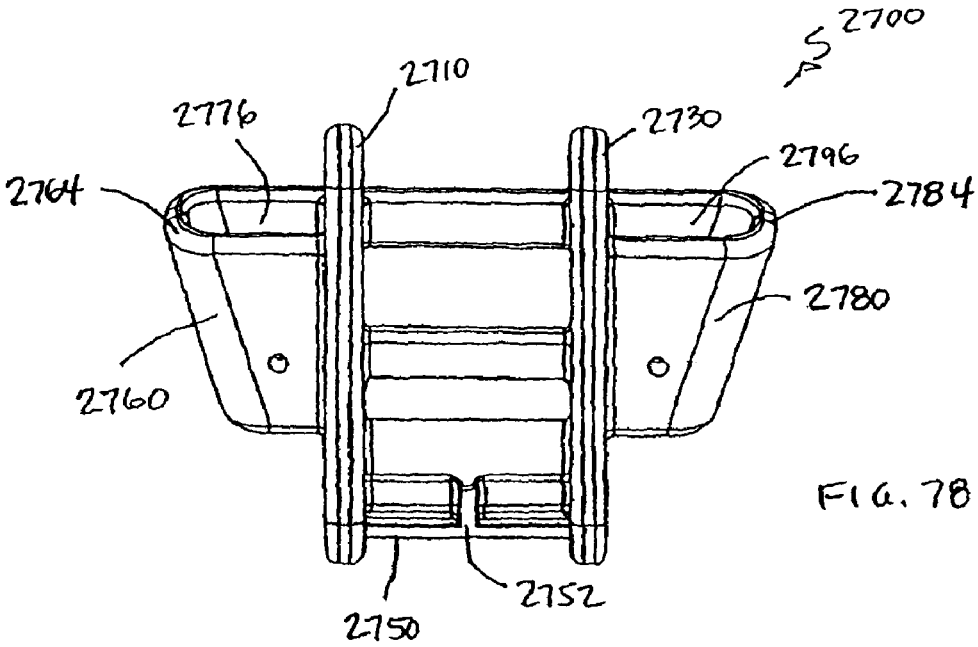
FIG. 78 illustrates a top view of the base of FIG. 75.

Extensions 2760 and 2780 are disposed at an angle with respect to a horizontal plane. As illustrated in FIG. 76, extension 2780 includes a longitudinal axis 2788 that is oriented at an angle with respect to a support surface on which the support 2500 is placed. The angle determines the angles at which side legs 2540 and 2544 extend from the rear frame portion 2522 to the front frame portion 2512.

Each of the extensions 2760 and 2780 includes a tapered portion that engages a support surface on which the support 2500 is placed. As illustrated in FIG. 76, extension 2780 includes a tapered portion 2794. Extension 2760 includes a similar tapered portion (not shown).

Figure 75:
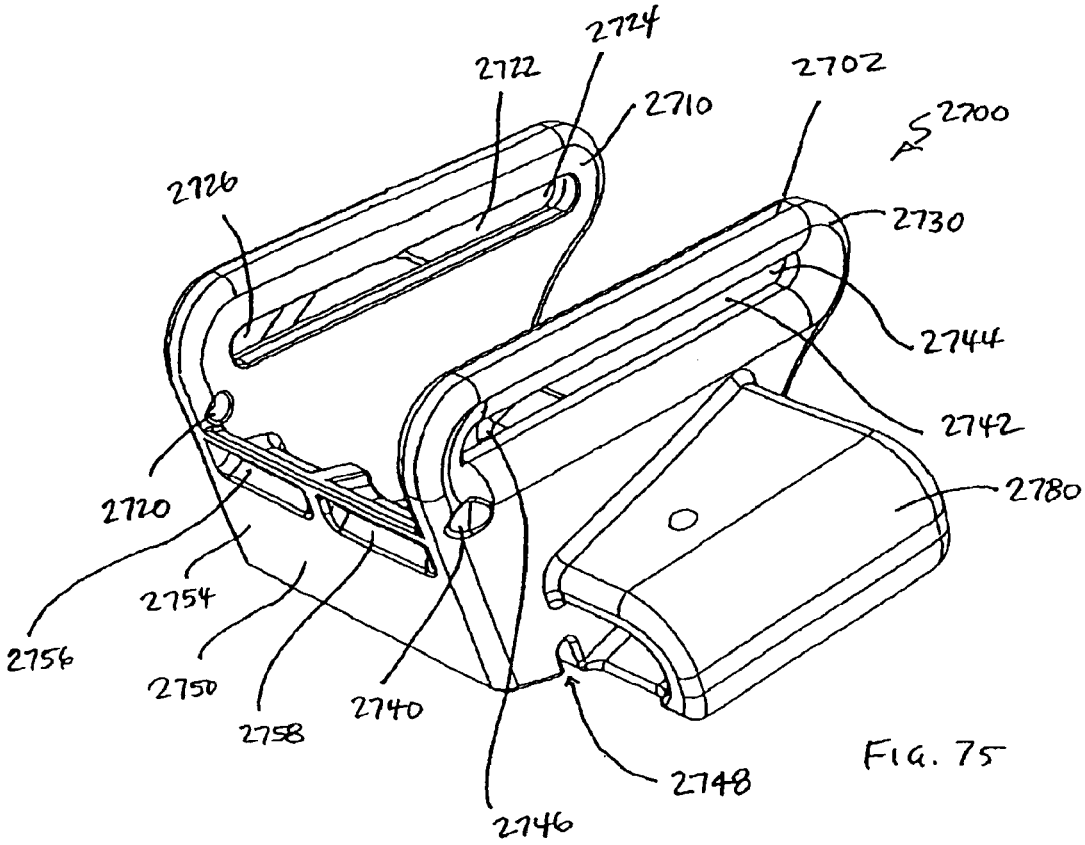
FIG. 75 illustrates a rear perspective view of a base according to an alternative embodiment of the invention.

As illustrated in FIGS. 75 and 76, side wall 2730 includes an opening 2748, the function of which is described later. Side wall 2710 includes a similar opening (not shown). The size and configuration of the openings in the side walls can vary.

The rear wall 2750 has an inner surface 2752, an outer surface 2754 and openings 2756 and 2758 therethrough. Each of the openings 2756 and 2758 is configured to receive a strap that has a connector 2568 coupled thereto.

Figure 79:
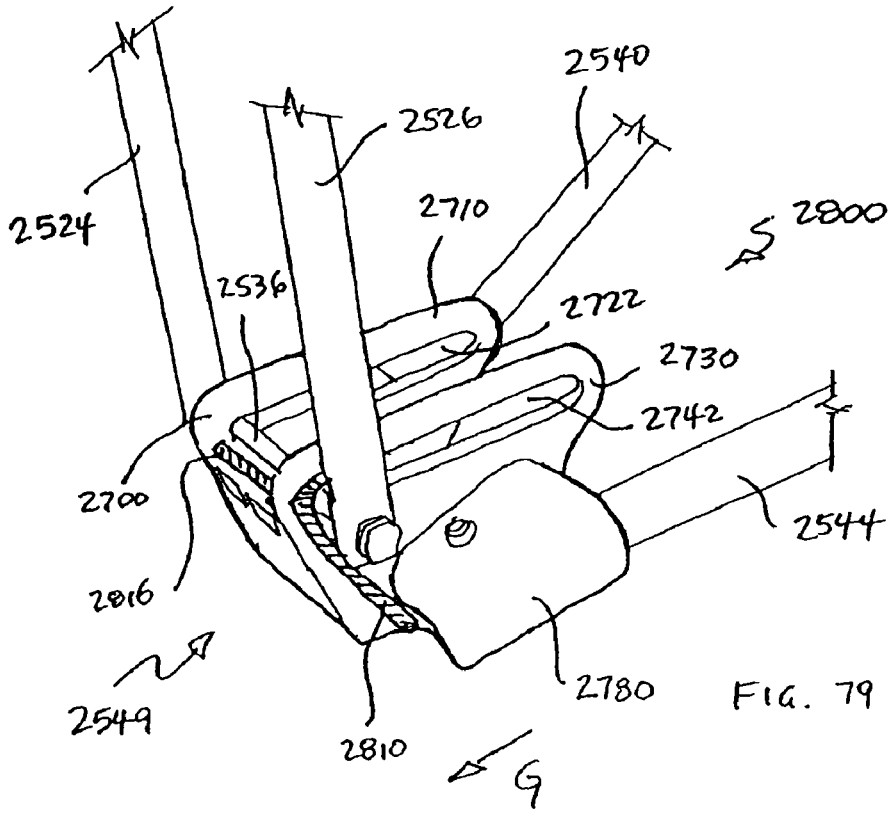
FIG. 79 illustrates a rear perspective view of some components of the support of FIG. 68 in an upright configuration.
Figure 80:
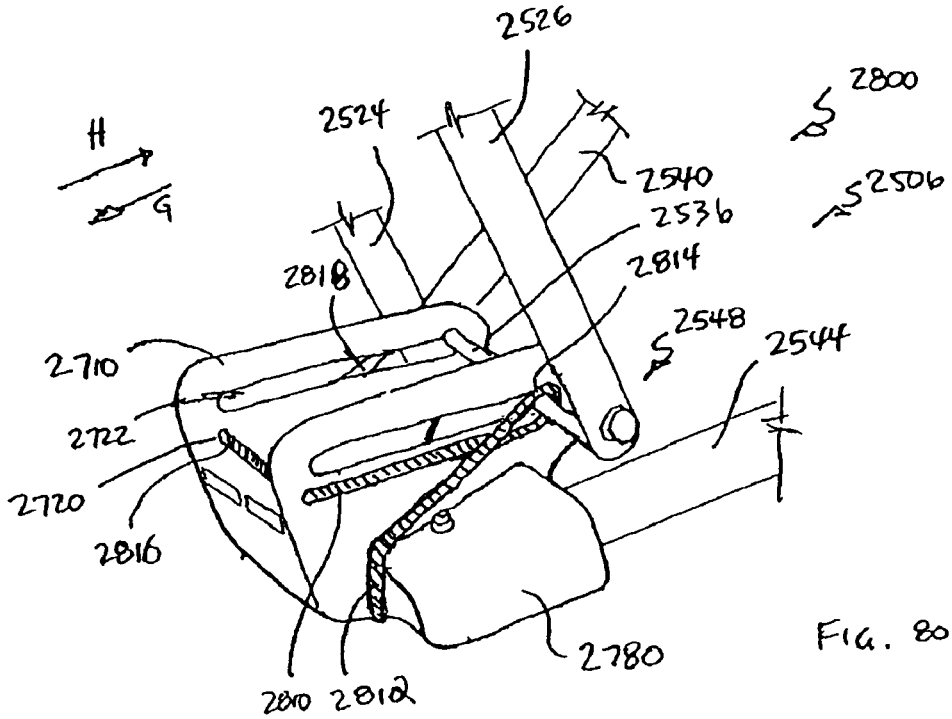
FIG. 80 illustrates a rear perspective view of the components of FIG. 79 in a reclined configuration.

The process of reclining the support is illustrated in FIGS. 79 and 80. As described above, the rear frame portion 2522 includes rear legs 2524 and 2526 and connector portion 2536. Connector portion 2536 is slidably mounted for movement along slots 2722 and 2742 in side walls 2710 and 2730 of the base 2700.

When the connector portion 2536 is located proximate to the rear ends of the slots 2722 and 2742, the rear legs 2524 and 2526 are in their upright positions and the frame 2510 has an upright configuration 2549. When the connector portion 2536 is located proximate to the front ends of the slots 2722 and 2742, the rear legs 2524 and 2526 are in their reclined positions and the frame 2510 has a reclined configuration 2548. It is to be understood that the terms "upright" and "reclined" are relative terms that are used to designate two different configurations. It is not necessary that the rear legs be exactly upright or perpendicular with a horizontal support surface when the legs are in their upright positions or the frame is in its upright configuration. The upright and reclined configurations of the frame are two configurations in which the rear frame portion is disposed at different angles with respect to the support surface on which the support is placed.

The support 2500 includes a recline mechanism 2800 as illustrated in FIGS. 79 and 80. In this embodiment, the recline mechanism 2800 includes a biasing mechanism 2810 that is coupled to the base 2700.

In one embodiment, the biasing mechanism 2810 has a first portion 2812 that is coupled to the base 2700 by being inserted into the slot 2748 on the base 2700. The biasing mechanism 2810 includes a second portion 2814 that is wrapped around a portion of the rear frame portion 2522, which in this embodiment, is the connector portion 2536. The biasing mechanism 2810 includes a third portion 2816 that passes through openings 2740 and 2720 in side walls 2730 and 2710, respectively. The biasing mechanism 2810 also includes a fourth portion 2818 that is wrapped around the connector portion 2536 and a fifth portion (not shown) that is inserted into an opening proximate to the bottom of side wall 2710 of the base 2700.

In one embodiment, the biasing mechanism 2810 has two ends. In another embodiment, the biasing mechanism 2810 forms a continuous loop.

The biasing mechanism 2810 biases the connector portion 2536 downwardly and rearwardly in the slots 2722 and 2742 along the direction of arrow "G." In alternative embodiments, the biasing mechanism can be coupled to the base and the rear frame portion in any configuration that enables the biasing mechanism to bias the connector portion in a rearward and/or downward directions along the slots in the base.

In the illustrated embodiment, the biasing mechanism is an elastic member, such as a bungy cord. In alternative embodiments, the biasing mechanism can be any mechanism that can generate a sufficient pressure or force to bias the rear frame portion rearwardly. The pressure or force can be applied in either a compression mode or a tension mode.

In one embodiment, the biasing mechanism can be a spring. The spring can be coupled to the base at any location. The spring is disposed so that the spring either pushes rearwardly on the rear frame portion or pulls rearwardly on the rear frame portion. In another embodiment, the biasing mechanism can be a flexible member, such as a plastic lever. The plastic lever can be formed integrally with the base. Alternatively, the plastic lever can be coupled to the base via fastener, such as a rivet. In another embodiment, the biasing mechanism can be a spring steel member.

In another embodiment, several biasing mechanisms can be used. For example, one or more plastic plates can be aligned in series with respect to each other and the base.

To recline the support 2500 from its upright configuration 2508 to its reclined configuration 2506, the rear frame portion 2522 is moved from its upright position 2549 (see FIG. 79) to its reclined position 2548 (see FIG. 80). When the user or occupant of the seat 2570 shifts the user's weight toward the rear of the support 2500, the rear frame portion 2522 pivots about a pivot point 2509 (see FIG. 68), and the elongate member 2536 moves to the front ends of the slots 2722 and 2742. When the user moves the upper part of the rear frame portion 2522 rearwardly, for example, by pressing rearwardly on the rear frame portion 2522 with the user's shoulders, the lower part of the rear frame portion 2522 moves forwardly along the direction of arrow "H."

In this configuration, the weight of the user or the occupant of the seat 2570 causes the support 2500 to remain in its reclined configuration 2506.

To move the support 2500 from its reclined configuration 2506 to its upright configuration 2508, the rear frame portion 2522 is moved from its reclined position 2548 to its upright position 2549. When the user leans forward or moves upwardly, lifting a significant portion of the user's weight slightly off the seat 2570, the rear frame portion 2522 pivots about the pivot point 2509 to its upright position 2549. The support 2500 is retained in this configuration by the elastic member 2810.

Figure 81:
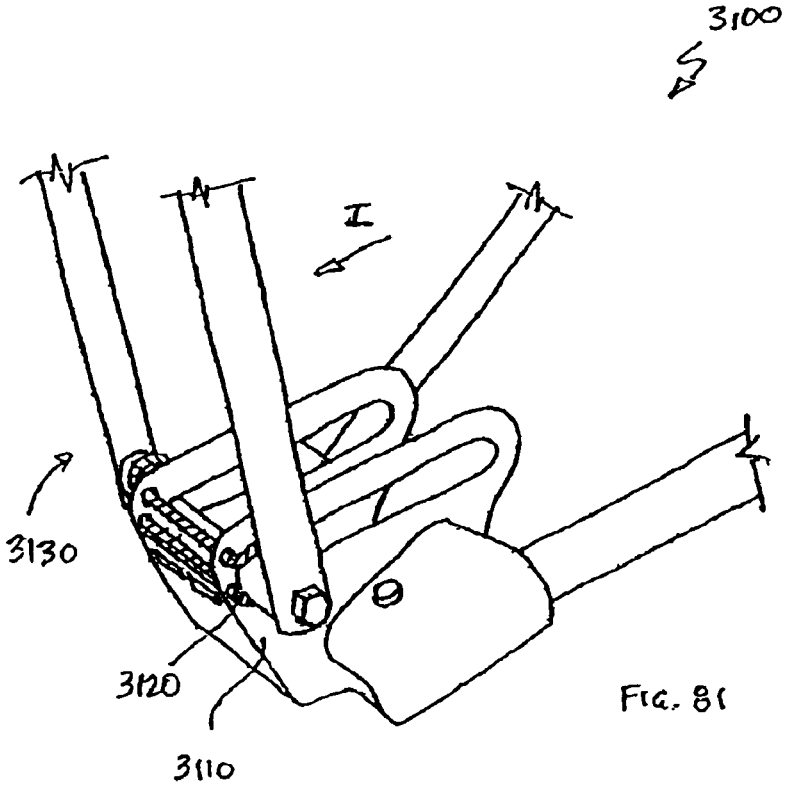
FIG. 81 illustrates a rear perspective view of some components of a support in an uptight configuration.
Figure 82:
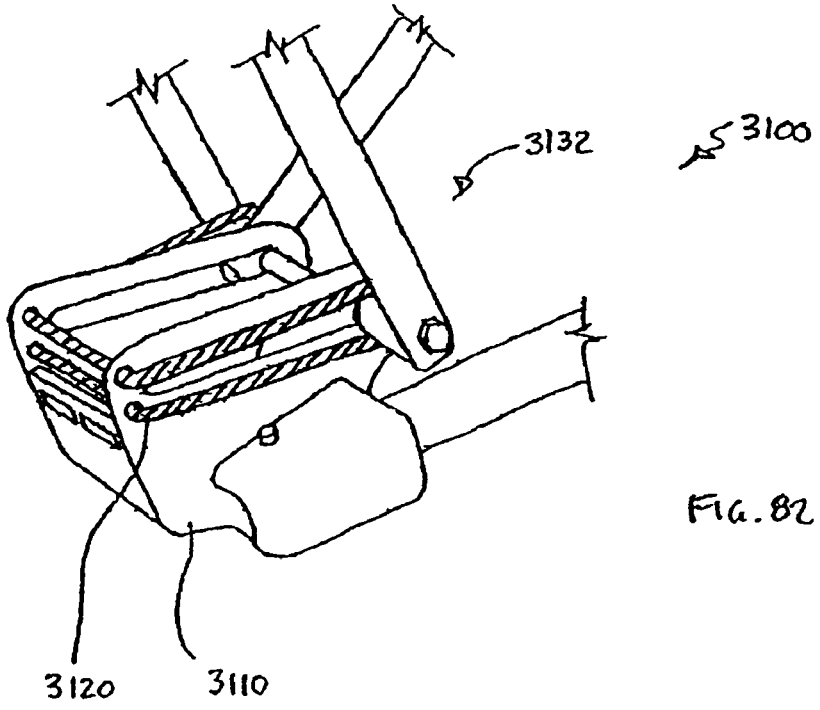
FIG. 82 illustrates a rear perspective view of the components of the support of FIG. 81 in a reclined configuration.

An alternative embodiment of a recline mechanism is illustrated in FIGS. 81 and 82. In this embodiment, the recline mechanism 3100 includes a biasing mechanism 3120 that is coupled to the base 3110. In one embodiment, the biasing mechanism 3120 is a continuous loop that extends through sets of holes in the base 3110. In alternative embodiment, the biasing mechanism 3120 is a not a continuous loop. The biasing mechanism 3120 applies a biasing force on the rear frame portion along the direction of arrow "I." The biasing force biases the rear frame portion into an upright configuration 3130. The rear frame portion can be disposed in a reclined configuration 3132 in which the rearwardly biasing force is applied to the rear frame portion as well.

Figure 83:
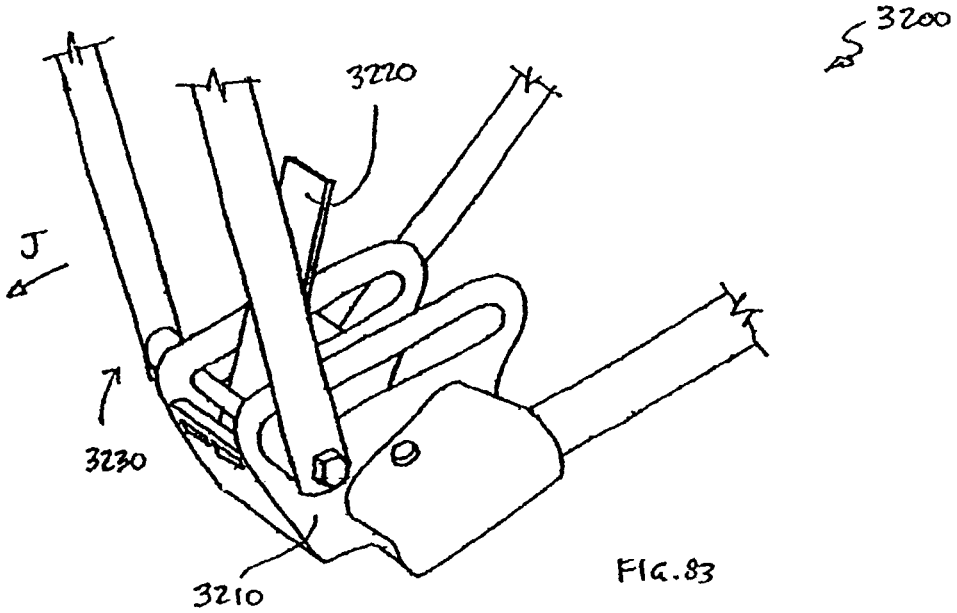
FIG. 83 illustrates a rear perspective view of some components of a support in an upright configuration.
Figure 84:
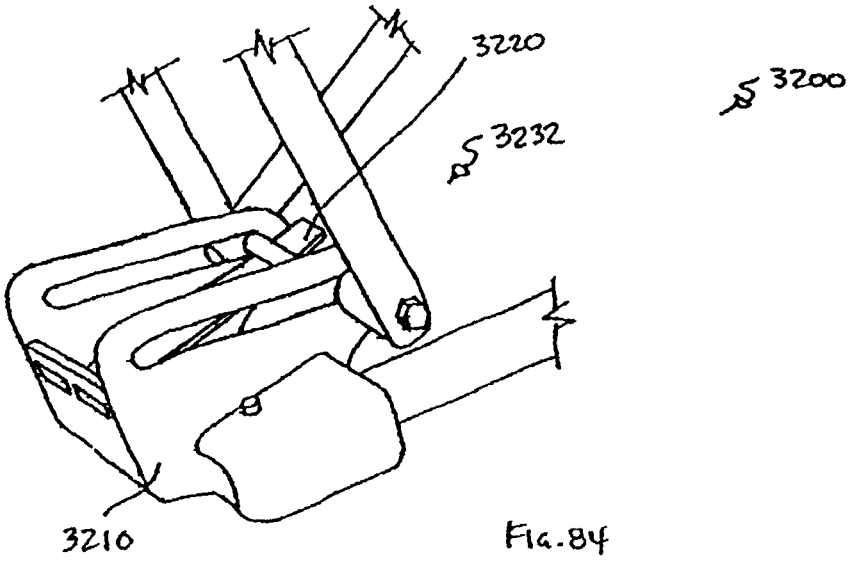
FIG. 84 illustrates a rear perspective view of the components of the support of FIG. 83 in a reclined configuration.

An alternative embodiment of a recline mechanism is illustrated in FIGS. 83 and 84. In this embodiment, the recline mechanism 3200 includes a biasing mechanism 3220 that is coupled to the base 3210. The biasing mechanism 3220 is a flexible plate like member. The biasing mechanism 3220 can be coupled to or integrally formed with the base 3210. The biasing mechanism 3220 applies a biasing force on the rear frame portion along the direction of arrow "J." The biasing force biases the rear frame portion into an upright configuration 3230. The rear frame portion can be disposed in a reclined configuration 3232 in which the rearwardly biasing force is applied to the rear frame portion as well.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A support, comprising:

a frame, the frame including a front frame portion and a rear frame portion, the frame having a collapsed configuration and an expanded configuration;

a seat membrane, the seat membrane having a first end portion being coupled to the rear frame portion and a second end portion coupled to the front frame portion, the second end portion of the seat membrane being larger in length than the first end portion of the seat membrane; and a tension member having a first end portion coupled to the rear frame portion and a second end portion, the second end portion of the tension member being configured to be removably coupled to the front frame portion when the frame is in its expanded configuration, the second end portion of the tension member being [configured to be] removably coupled to the rear frame portion when the frame is in its collapsed configuration.

2. The support of claim 1, wherein the first end portion of the tension member is pivotally coupled to the rear frame portion.

3. The support of claim 1, wherein the second end portion of the seat membrane is coupled to the front frame portion at a first location and at a second location.

4. The support of claim 1, wherein the second end portion of the seat membrane is slideably coupled to the front frame portion at a first location and is slideably coupled to the front frame portion at a second location.

5. The support of claim 1, wherein the second end portion of the seat membrane includes a first opening and a second opening, a first portion of the front frame portion extending through first opening of the second end portion of the seat membrane, a second portion of the front frame portion extending through the second opening of the second end portion of the seat membrane.

6. The support of claim 1, wherein the second end portion of the tension member includes an opening configured to removably receive a portion of the front frame portion.

7. The support of claim 1, wherein the second end portion of the tension member includes a first coupler, the rear frame portion includes a second coupler, the first and second couplers being configured to engage to removably couple the second end portion of the tension member to the rear frame portion.

8. The support of claim 1, further comprising:

a shade member coupled to the support.

9. The support of claim 8, further comprising:

a cushion coupled to the seat member and configured to help support a head of a user.

10. The support of claim 1, wherein the front frame portion includes a first support member pivotally coupled to a second support member.

11. The support of claim 1, wherein the frame includes a first front foot, a second front foot, and a rear foot, a first support of the front frame portion is pivotally coupled to the first foot, a second support of the front frame portion is pivotally coupled to the second front foot, a first rear support member and a second rear support member being pivotally coupled to the rear foot.

12. The support of claim 1, wherein the second end portion of the tension member is configured to be removably coupled to a rear foot, a first support member of the rear frame portion and a second support member of the rear frame portion being pivotally coupled to the rear foot.

13. A support, comprising:

a frame, the frame including a front frame portion and a rear frame portion, the frame having a collapsed configuration and an expanded configuration, the frame including a first front foot, a second front foot, and a rear foot, a first support of the front frame portion being pivotally coupled to the first foot, a second support of the front frame portion being pivotally coupled to the second front foot, a first rear support member and a second rear support member of the frame being pivotally coupled to the rear foot;

a seat membrane, the seat membrane having a first end portion being coupled to the rear frame portion and a second end portion coupled to the front frame portion; and a tension member having a first end portion coupled to the rear frame portion and a second end portion, the second end portion of the tension member being configured to be removably coupled to the front frame portion when the frame is in its expanded configuration, the second end portion of the tension member being [configured to be] removably coupled to the rear frame portion when the frame is in its collapsed configuration.

14. The support of claim 13, wherein the second end portion of the tension member is configured to be removably coupled to the rear foot, a first support member of the rear frame portion and a second support member of the rear frame portion being pivotally coupled to the rear foot.

15. The support of claim 13, wherein the second end portion of the tension member includes an opening configured to removably receive a portion of the front frame portion.

16. The support of claim 13, wherein the second end portion of the tension member includes a first coupler, the rear frame portion includes a second coupler, the first and second couplers being configured to engage to removably couple the second end portion of the tension member to the rear frame portion.

17. The support of claim 13, further comprising:

a shade member coupled to the support.

18. The support of claim 17, further comprising:

a cushion coupled to the seat member and configured to help support a head of a user.

19. The support of claim 13, wherein the front frame portion includes a first support member pivotally coupled to a second support member.

20. A support, comprising:

a frame, the frame including a front frame portion and a rear frame portion, the frame having a collapsed configuration and an expanded configuration;

a seat membrane, the seat membrane having a first end portion being coupled to the rear frame portion and a second end portion coupled to the front frame portion, the second end portion of the seat membrane including a first opening and a second opening, a first portion of the front frame portion extending through *the* first opening of the second end portion of the seat membrane, a second portion of the front frame portion extending through the second opening of the second end portion of the seat membrane; and a tension member having a first end portion coupled to the rear frame portion and a second end portion, the second end portion of the tension member being configured to be removably coupled to the front frame portion when the frame is in its expanded configuration, the second end portion of the tension member being [configured to be] removably coupled to the rear frame portion when the frame is in its collapsed configuration.

21. The support of claim 20, wherein the second end portion of the tension member includes a first coupler, the rear frame portion includes a second coupler, the first and second couplers being configured to engage to removably couple the second end portion of the tension member to the rear frame portion.

*22. The support of claim 13, wherein the retainer includes a first retainer portion and a second retainer portion, the first retainer portion configured to releasably couple to the second retainer portion to retain the frame in its collapsed configuration.*

*23. The support of claim 13, wherein the retainer includes one of a hook, a clip or a buckle.*

*24. The support of claim 13, wherein the retainer is coupled to at least one of the frame and the seat membrane.*

*25. The support of claim 13, wherein the retainer includes at least one of a flap, an elongate member, a cord, a rope, a string, a strap and an elastic member.*

*26. The support of claim 13, wherein the retainer has a body portion, a first side portion and a second side portion, the retainer includes a coupling mechanism configured to releasably couple the first side portion of the retainer to the second side portion of the retainer.*

*27. The support of claim 13, wherein the tension member is a first tension member, the first tension member being configured to support a first arm of a user when the frame is in its expanded configuration, the support further comprising:*

*a second tension member coupled to the front frame portion and the rear frame portion, the second tension member configured to support a second arm of the user when the frame is in its expanded configuration.*

*28. The support of claim 13, wherein the first support member of the front frame portion is pivotally coupled to the second support member of the front frame portion,*

*the frame including a side frame portion, the side frame portion including a first support member and a second support member, the first support member of the side frame portion being pivotally coupled to the second support member of the side frame portion.*

*29. The support of claim 13, wherein the first support member of the front frame portion is pivotally coupled to the second support member of the front frame portion,*

*the frame including a first side frame portion and a second side frame portion, the first side frame portion including a first support member and a second support member, the first support member of the first side frame portion being pivotally coupled to the second support member of the first side frame portion, the second side frame portion including a first support member and a second support member, the first support member of the second side frame portion being pivotally coupled to the second support member of the second side frame portion.*

*30. The support of claim 13, wherein the first support member of the front frame portion is pivotally coupled to the second support member of the front frame portion, the first support member of the front frame portion and the second support member of the front frame portion collectively forming a substantially X-shape when the frame is in its expanded configuration,*

*the frame including a first side frame portion and a second side frame portion, the first side frame portion including a first support member and a second support member, the first support member of the first side frame portion being pivotally coupled to the second support member of the first side frame portion, the first support member of the first side frame portion and the second support member of the second side frame portion collectively forming a substantially X-shape when the frame is in its expanded configuration, the second side frame portion including a first support member and a second support member, the first support member of the second side frame portion being pivotally coupled to the second support member of the second side frame portion, the first support member of the second side frame portion and the second support member of the second side frame portion collectively forming a substantially X-shape when the frame is in its expanded configuration.*

*31. The support of claim 13, wherein:*

*the retainer includes a first retainer portion and a second retainer portion, the first retainer portion configured to releasably couple to the second retainer portion to retain the frame in its collapsed configuration;*

*the first support member of the front frame portion being pivotally coupled to the second support member of the front frame portion, the first support member of the front frame portion and the second support member of the front frame portion collectively forming a substantially X-shape when the frame is in its expanded configuration,*

*the frame including a first side frame portion and a second side frame portion, the first side frame portion including a first support member and a second support member, the first support member of the first side frame portion being pivotally coupled to the second support member of the first side frame portion, the first support member of the first side frame portion and the second support member of the second side frame portion collectively forming a substantially X-shape when the frame is in its expanded configuration, the second side frame portion including a first support member and a second support member, the first support member of the second side frame portion being pivotally coupled to the second support member of the second side frame portion, the first support member of the second side frame portion and the second support member of the second side frame portion collectively forming a substantially X-shape when the frame is in its expanded configuration; and*

*the tension member is a first tension member, the first tension member being configured to support a first arm of a user when the frame is in its expanded configuration, the support further comprising:*

*a second tension member coupled to the front frame portion and the rear frame portion, the second tension member configured to support a second arm of the user when the frame is in its expanded configuration.*

*32. The support of claim 13, wherein the rear frame portion has a height when the frame is in its expanded configuration, the front frame portion having a height when the frame is in its expanded configuration, the height of the rear frame portion when the frame is in its expanded configuration being larger than the height of the front frame portion when the frame is in its expanded configuration.*

*33. The support of claim 20, wherein the retainer includes a first retainer portion and a second retainer portion, the first retainer portion being configured to engage the second retainer portion such that the retainer retains the frame in its collapsed configuration.*

*34. The support of claim 20, wherein the retainer includes one of a hook, a clip or a buckle.*

*35. The support of claim 20, wherein the retainer is coupled to at least one of the frame and the seat membrane.*

*36. The support of claim 20, wherein the retainer includes at least one of a flap, an elongate member, a cord, a rope, a string, a strap and an elastic member.*

*37. The support of claim 20, wherein the retainer has a body portion, a first side portion and a second side portion, the retainer includes a coupling mechanism configured to releasably couple the first side portion of the retainer to the second side portion of the retainer.*

*38. The support of claim 20, wherein the tension member is a first tension member, the support further comprising:*

*a second tension member coupled to the front frame portion and the rear frame portion, the second tension member configured to support a second arm of the user when the frame is in its expanded configuration.*

*39. The support of claim 20, wherein the front frame portion includes a first support member and a second support member, the first support member of the front frame portion being pivotally coupled to the second support member of the front frame portion,*

*the frame including a side frame portion, the side frame portion including a first support member and a second support member, the first support member of the side frame portion being pivotally coupled to the second support member of the side frame portion.*

*40. The support of claim 20, wherein the front frame portion includes a first support member and a second support member, the first support member of the front frame portion being pivotally coupled to the second support member of the front frame portion,*

*the frame including a first side frame portion and a second side frame portion, the first side frame portion including a first support member and a second support member, the first support member of the first side frame portion being pivotally coupled to the second support member of the first side frame portion, the second side frame portion including a first support member and a second support member, the first support member of the second side frame portion being pivotally coupled to the second support member of the second side frame portion.*

*41. The support of claim 20, wherein the front frame portion includes a first support member and a second support member, the first support member of the front frame portion being pivotally coupled to the second support member of the front frame portion,*

*the frame including a first side frame portion and a second side frame portion, the first side frame portion including a first support member and a second support member, the first support member of the first side frame portion being pivotally coupled to the second support member of the first side frame portion, the second side frame portion including a first support member and a second support member, the first support member of the second side frame portion being pivotally coupled to the second support member of the second side frame portion,*

*the rear frame portion including a first support member and a second support member, the first support member of the rear frame portion being substantially parallel to the second support member of the rear frame portion.*

*42. The support of claim 20, wherein the front frame portion includes a first support member and a second support member, the first support member of the front frame portion being pivotally coupled to the second support member of the front frame portion, the first support member of the front*

*frame portion and the second support member of the front frame portion collectively forming a substantially X-shape when the frame is in its expanded configuration,*

*the frame including a first side frame portion and a second side frame portion, the first side frame portion including a first support member and a second support member, the first support member of the first side frame portion being pivotally coupled to the second support member of the first side frame portion, the first support member of the first side frame portion and the second support member of the second side frame portion collectively forming a substantially X-shape when the frame is in its expanded configuration, the second side frame portion including a first support member and a second support member, the first support member of the second side frame portion being pivotally coupled to the second support member of the second side frame portion, the first support member of the second side frame portion and the second support member of the second side frame portion collectively forming a substantially X-shape when the frame is in its expanded configuration,*

*the rear frame portion including a first support member and a second support member, the first support member of the rear frame portion being substantially parallel to the second support member of the rear frame portion.*

*43. The support of claim 20, wherein the first end portion of the seat membrane defines a first opening and a second opening, a first portion of the rear frame portion extending through the first opening of the first end portion of the seat membrane, a second portion of the rear frame portion extending through the second opening of the first end portion of the seat membrane.*

*44. The support of claim 20, wherein:*

*the retainer includes a first retainer portion and a second retainer portion, the first retainer portion configured to releasably couple to the second retainer portion to retain the frame in its collapsed configuration,*

*the first end portion of the seat membrane defines a first opening and a second opening, a first portion of the rear frame portion extending through the first opening of the first end portion of the seat membrane, a second portion of the rear frame portion extending through the second opening of the first end portion of the seat membrane,*

*the front frame portion includes a first support member and a second support member, the first support member of the front frame portion being pivotally coupled to the second support member of the front frame portion, the first support member of the front frame portion and the second support member of the front frame portion collectively forming a substantially X-shape when the frame is in its expanded configuration, the rear frame portion including a first support member and a second support member, the first support member of the rear frame portion being substantially parallel to the second support member of the rear frame portion,*

*the frame including a first side frame portion and a second side frame portion, the first side frame portion including a first support member and a second support member, the first support member of the first side frame portion being pivotally coupled to the second support member of the first side frame portion, the first support member of the first side frame portion and the second support member of the second side frame portion collectively forming a substantially X-shape when the frame is in its expanded configuration, the second side frame portion including a first support member and a second support member, the first support member of the second side frame portion being pivotally coupled to the second support member of the second side frame portion, the first support member of the second side frame portion and the second support member of the second side frame portion collectively forming a substantially X-shape when the frame is in its expanded configuration; and*

*the tension member is a first tension member, the support further comprising:*

*a second tension member coupled to the front frame portion and the rear frame portion, the second tension member configured to support a second arm of the user when the frame is in its expanded configuration.*

*45. The support of claim 20, wherein the rear frame portion has a height when the frame is in its expanded configuration, the front frame portion has a height when the frame is in its expanded configuration, the height of the rear frame portion when the frame is in its expanded configuration is larger than the height of the front frame portion when the frame is in its expanded configuration.*

*46. The support of claim 1, wherein at least one of (1) the first end portion of the tension member is coupled to the rear frame portion, (2) the second end portion of the tension member is removably coupled to the front frame portion in the expanded configuration, or (3) the second end portion of the tension member is removably coupled to the rear frame portion in the collapsed configuration, independently of the seat membrane.*

* * * * *